(12) United States Patent
Slater et al.

(10) Patent No.: US 7,822,862 B2
(45) Date of Patent: Oct. 26, 2010

(54) METHOD OF SATISFYING A DEMAND ON A NETWORK FOR A NETWORK RESOURCE

(75) Inventors: Alastair Michael Slater, Malmesbury (GB); Mark Robert Watkins, Bristol (GB); Andrew Michael Sparkes, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1879 days.

(21) Appl. No.: 10/457,021

(22) Filed: Jun. 9, 2003

(65) Prior Publication Data

US 2004/0010544 A1    Jan. 15, 2004

(30) Foreign Application Priority Data

Jun. 7, 2002    (GB) ................. 0213085.4

(51) Int. Cl.
*G06F 15/16* (2006.01)
(52) U.S. Cl. .................. 709/229; 709/203; 709/226
(58) Field of Classification Search .......... 709/203, 709/224, 229, 239, 223, 226
See application file for complete search history.

(56) References Cited

U.S. PATENT DOCUMENTS

| | | | | |
|---|---|---|---|---|
| 5,978,577 A | * | 11/1999 | Rierden et al. ........... | 707/10 |
| 6,092,178 A | * | 7/2000 | Jindal et al. ........... | 712/27 |
| 6,691,765 B2 | * | 2/2004 | Sparks et al. ........... | 164/5 |
| 2002/0023139 A1 | | 2/2002 | Hultgren | |
| 2002/0198883 A1 | * | 12/2002 | Nishizawa et al. ........... | 707/10 |
| 2003/0005116 A1 | * | 1/2003 | Chase et al. ........... | 709/225 |
| 2003/0065711 A1 | * | 4/2003 | Acharya et al. ........... | 709/203 |
| 2003/0097429 A1 | * | 5/2003 | Wu et al. ........... | 709/220 |
| 2003/0105655 A1 | * | 6/2003 | Kimbrel et al. ........... | 705/8 |
| 2003/0105868 A1 | * | 6/2003 | Kimbrel et al. ........... | 709/226 |

FOREIGN PATENT DOCUMENTS

| | | |
|---|---|---|
| EP | 0 384 339 | 8/1990 |
| EP | 0 570 683 | 11/1993 |
| EP | 1061710 A2 | 2/2000 |
| WO | WO 96/30847 | 10/1996 |
| WO | WO 01/33687 | 5/2001 |
| WO | WO 01/90943 | 11/2001 |

* cited by examiner

*Primary Examiner*—Ario Etienne
*Assistant Examiner*—El Hadji Sall

(57) ABSTRACT

A demand on a server farm or local area network for a farm or network resource is satisfied. The farm or network has a demand director server, a first resource server having a first resource, and a second resource server having a second, different, resource. The director server is aware of what resources are held on the first and second resource servers. In response to a request for one of the first and second resources, one of the first and second resource servers is selected to serve out the requested resource and direct the request to the selected one of the first and second resource servers. The demand server selects an appropriate one of the resource servers to receive the request using its knowledge of where the requested resource is located.

18 Claims, 25 Drawing Sheets

METHOD OF SATISFYING A DEMAND ON A NETWORK FOR A NETWORK RESOURCE

FIELD OF THE INVENTION

The invention relates to a method of satisfying a demand on a network for a network resource, a method of sharing the demand for resources between a plurality of networked resource servers, a server network, a demand director server, a networked data library, a method of network resource management, a method of satisfying a demand on an Internet network for a network resource, a tier of resource serving servers, a network, a demand director, a metropolitan video serving network, a computer readable memory device encoded with a data structure for managing networked resources, a method of making available computer network resources to users of a network, a data structure for managing the automatic transfer of data between a server program and a further server program and software for controlling allocation of a request for a specific resource.

BACKGROUND ART

The invention arose from a consideration of Internet Web Servers and it is convenient to discuss it in that context, but the invention has wider applicability to other networks. Current web server systems, for example e-commerce systems, application servers or any other web accessible system, intended as web-servers for connection to the Internet typically comprise a web-tier, an application tier and a storage tier, see for example FIG. 1. The web-tier is typically highly replicated and homogeneous having a large number of web servers which have data and applications highly distributed over them in a homogenous manner: the servers all do the same thing. Each of these web-servers will serve the same data for a given service provider (e.g. xSP Internet, application or storage) in order to spread the accessibility of the data to thousands of users. The data content of each server in the web tier is therefore identical across all of the servers. This results in a massive utilisation of disc space, in which some of the data content is not heavily accessed. This leads to a large amount of often redundant storage: a lot of data content and application may be not be being served out at all frequently.

Load balancing (directing a specific request for a specific resource to be served out to a specific chosen sever on the web tier) can be used to attempt to provide a better, faster, service to users of the World Wide Web. For example "IP Virtual Server" software exists for Linux. Current web-based load balancing techniques for balancing the load between web tier servers are rudimentary and in one known version of load balancing involve a principal server, router, or director server, distributing requests for data to a series of identical data content servers sequentially in turn until a server capable of servicing the request is found. What the director server is looking for is a server with the processing power free to service the request for data. It does this by asking a series of servers in "Round-Robin" until it finds one capable. An alternative load-balancing technique for web tier servers is to have the director server (or router) send an investigatory signal to the web tier servers and assess which server had the quickest response time, and to direct the request to be serviced to the web tier data content server which replied fastest. This technique of measuring response time is primarily a measure of the telecommunications links to the web tier servers: the capacity of the telecoms links is the major factor in response time. Depending upon whether the data content web tier server has a dedicated IC (interface card) or not, the response time may be influenced slightly by how busy the CPU of the web tier server is, but telecoms factors far outweigh this usually.

Application servers (i.e. servers in a network serving to the network particular applications—often different applications on different networked servers) have a problem of scalability if demand for a particular application rises. Clustering is one answer to problems of providing greater access to data and functionality, but it is expensive to replicate data content and functionality, and it is difficult to expand the capacity of a cluster of services horizontally by the addition of more resources in real time whilst the system is operational.

Clusters are not easily scaled horizontally by the addition of more network attached storage (NAS) at the web-tier level. NAS typically does not scale well horizontally as it is attached via a network interface card (NIC) to the network and there is a limit on the number of network connections allowed by the NIC. A NIC has a capacity to handle a limited number of connections. Cards are typically rated at 10 Mbits$^-$1/100 Mbits$^{-1}$/1000 Mbits$^{-1}$. Clusters typically require the purchase of expensive, cluster certified disc arrays and fibre channel, to support shared data between clustered servers.

Clustered systems typically fall into either a 'shared everything' class:—where fibre channel, storage and switches etc. are shared by the clustered machines, or a 'shared nothing' class:—where each machine on the cluster has its own storage, fibre channel and switches etc. It is difficult to configure the cluster. The 'shared nothing' arrangement is very expensive with high end disc arrays costing around $300 k per TeraByte (TB), and also as each disc cluster will contain similar data content at each server, or node, the expenditure on storage, and other peripherals, rapidly escalates.

A further problem with current web tier servers is that it is difficult and expensive to add extra data. For example, in the field of Internet Video Serving (serving out video movies over the Internet) a video website may have, say, ten web tier servers each having a copy of the one hundred most popular video films on them. A director server, or router, receives a request for a specific video and directs it to a chosen one of the ten servers either on the basis of "Round-Robin", or by assessing telecoms response time. The chosen server serves out the selected video. However, let us imagine that a new video is to be added to the available videos. The new video is loaded into the memories of each of the ten web tier servers and added to the available videos deliverable in the directory of the director server. It will probably be necessary to delete a video from the available number of videos to make room in the memories of the web tier servers.

A lot of the memory of each web tier server is not actively used in any given period of time: a lot of it is redundant most of the time, but is needed in case there is a request for a less frequently requested video.

There are difficulties in horizontally scaling. Adding another web tier server means updating the director server and copying the data content of the other web tier servers to the new web tier server, so that they are the same.

If it is desired to increase the number of video titles available at that website it is necessary to increase the memory capacity (e.g. disc capacity) of each of the web tier servers so that they can accommodate more videos.

Currently collections of servers that deliver content, e.g. streaming of videos, to a user are unaware of their storage capacity, connection capacity and bandwidth usage. A central management tool, typically a management protocol such as simple network management protocol (SNMP), loaded on an overseer machine, can in known systems assume a wide scale, low level monitoring responsibility that will typically include tripping an alert on a monitoring station if a server, or other network element, fails or if network traffic exceeds a threshold value. An attendant problem with this arrangement is that at the time that an alert is registered it may be too late for a network administrator (person) to introduce a replacement server, or other additional network element, prior to a catastrophic system failure. Also, there may not be a network administrator present at all times to react to a warning message.

An example, the wide variations in demand for web-sites, for example an increased demand for information, or live video feed during major sporting events, has resulted in websites crashing as the systems administrator cannot establish the rate of change of requests quickly enough in order to add resources quickly enough to cope with the fluctuations in demand. A known solution to this problem is to massively over provide for the availability of data to users: to have much more data-serving capacity than is normally needed. This is expensive and inefficient as at times of low data demand it results in large amounts of storage devices lying idle. High end disc arrays typically cost $300 k per Tera Byte (TB).

It is possible to provide clusters of servers in order to accommodate fluctuations in demand for data. However, as mentioned, clusters typically require the purchase of expensive, cluster certified disc arrays and network infrastructure, typically fibre channel, to support shared data between network nodes. Additionally, clusters tend to be built in advance of demand and are not readily horizontally scaleable, for example by the addition of network attached storage (NAS) or by the addition of direct attached storage (DAS) to servers.

Video serving over the Internet is currently not very popular because it is so expensive to do, for the reasons discussed.

SUMMARY OF THE INVENTION

According to a first aspect the invention comprises a method of satisfying a demand on a network for a network resource, the method comprising providing the network with a demand director server, a first resource server having a first resource thereon, and a second resource server having a second, different, resource thereon; and the method further comprising having said director server be aware of what resources are held on said first and second resource servers and upon receipt of a request for one of said first and second resources selecting one of said first and second resource servers to serve out said requested resource and directing said request to said selected one of said first and second resource servers, said demand server selecting an appropriate one of said first and second resource servers to receive said request using its knowledge of where the requested resource is located.

Previously in world-wide web-based networks there has been no differentiation in resources provided on web-tier servers: the data content and applications deliverable have been homogenous between web-tier resource servers. Furthermore, even in other, non-Internet/world wide web environments, networked servers capable of serving out the same kind of resource (e.g. videos) have all had identical content: not different content per server.

In the above invention the demand director is aware of where different resources are stored so as to be able to direct a request for resources to the appropriate server that actually has the requested resource stored on it, but the demand director is not necessarily aware of the current demand/load on each resource server—but it might be.

According to another aspect the invention comprises a method of satisfying a demand on a network for a network resource, the method comprising providing the network with a demand director server, a first resource server having a first resource thereon, and a second resource server having a second resource thereon; and the method further comprises having said director server be aware of unused resource-serving capacity of said first resource server and of unused resource-serving capacity of said second resource-server, and said director server upon receipt of a request for a requested resource which is present on both said first resource server and said second resource server selecting a selected one of said first and second resource servers to be the resource server that serves said requested resource, said director server selecting said selected one of said resource servers using a knowledge of whether or not said first and second resource servers have unused resource-serving capacity capable of serving said requested resource.

In this aspect of the invention the director server is usage-aware (usage of the server, as well as or instead of telecommunications availability to the server), and the content, or resources, of the resource server may or may not be dissimilar.

According to a third aspect the invention comprises a method of sharing the demand for resources between a plurality of networked resource servers comprising providing dissimilar resource content on at least some different resource servers, having a knowledge of what resource is available for serving out from which of said networked resources servers, having a knowledge of said resource servers' current capacity to satisfy a request for resources that they are capable of serving, and allocating a request for a requested resource to a selected resource server chosen with the knowledge that it has said requested resource available for serving and that it has the capacity to serve out said requested resource satisfactorily.

This aspect of the invention combines the first and second aspects.

The director unit may also comprise a resource server (e.g. it may also serve out resources such as videos). The data may be rich media files, which typically include real time (RT) video and/or audio files and/or MPEG files, and/or Real Networks format video data or Windows Media format data or any other file based format.

Each resource server may store dissimilar data content thereupon. By dissimilar we mean either (i) that the data, or resources, accessible by an external user is not directly mirrored and completely replicated across all of the resource servers units (whereas the operating system, etc. can be the same for all of the resource servers); or (ii) that the data, or resources, accessible by an external user is very substantially different between at least some of the resource servers; or (iii) that the data, or resources, externally accessible by a user is wholly different, or nearly so, between at least some of the resource servers, or (iv) that there is a great deal of data content, or resource, difference between different resource servers some of which may or may not have any shared, common, deliverable-to-the-user resource. At one extreme each resource server could have entirely different, or nearly so, resource content—but it is not intended to avoid this patent simply by duplicating some content between some or all resource servers.

The director server may have a database therein which may detail which resource server has any given resource thereupon and may detail any one, or combination of the following for any given resource: access figures, statistics, metrics on utilisation, number of clients, or users, currently accessing the data, time periods of frequent access number of clients, or users, historically served.

The resource servers may have data storage units associated therewith. The data storage units will typically be disc arrays but may include tape drives. The data storage units may be internal of the resource servers and/or they may be external of resource servers, for example network attached storage (NAS).

The director server may be arranged to load balance data access and/or the distribution of data across the server network, or across a server farm. The concept of moving data, or resources, around the network automatically to improve network performance is interesting and novel.

A request may be serviced by whichever resource server is adjudged to be the most able to serve out said requested resource. This concept of being aware of capability capacity to serve out, and making decisions relating to resource management and availability based upon such knowledge constitutes a separate invention.

A requested selected resource server may serve up a reply to a request for resource in such a way that said reply appears to a requester who made said request to be coming from said demand director. The demand director server may be arranged to forward a packet of a request to a chosen resource server The chosen resource server re-writes the packed header. The resource server may have first and second network interface cards (NIC'S). The second NIC may be configured to enable communications with an external network. The demand director server may have an interface, which may be arranged to specify input/output ports for an application and/or resource servers. The first NIC may be configured to enable intra-farm, or intra-network communication, typically with the demand director server. Having two subnets serves to restrict communications with outside users and movement of data within the farm or network to alter its availability to serve: thus one subnet may exist for each function so as not to congest either subnet.

The resource server may be arranged to rewrite the packet headers of outgoing data such that they appear to be transmitted from the demand director server. This will typically involve writing a network address of the director unit, usually a transmission control protocol/Internet protocol (TCP/IP) address, with the packet header.

The director may provide an ephemeral means to access the data e.g. via the use of a file systems symbolic link which is typically time limited and is removed after the expiry of a pre-determined length of time, usually after a client, or user, has already started accessing resources (e.g. content). The removal of the symbolic link does not typically alter the client's consumption of the data but will usually prevent reaccess of the data without requesting a new session through the director.

The demand director server may be arranged to configure and/or start and/or stop resources (or applications) upon the resource servers and/or add, and/or remove, at least one resource server from the network, or farm, in response to variations in the number of requests for data. Alternatively, the director unit may be arranged to recommend to an administrator (e.g. a person) the addition/removal of at least one resource server to/from the farm (or network) in response to variations in the number of requests for resources. The demand director server may be arranged to distribute data over the resource servers of the network/web tier/farm.

A copied resource may be created by copying resource from a said resource server onto another said resource server, and having said demand director be aware that said copied resource exists on said another resource server. The copying of said copied resource may increase the availability of said copied resource available for serving out from said resource servers. Resource may be deleted from a selected resource server, thereby freeing-up resource server capabilities for use to serve up a different resource. It is in some embodiments desirable to dynamically distribute servable resources between available resource servers dependent upon demand for said resources, and to vary the capacity of said resource servers collectively to serve out demand for a particular resource dependent upon the demand for said particular resource. The demand director server may be capable of communicating with an additional resource server that previously was not making its resources available for serving requests received by said demand director server, and of arranging for said additional resource server to make its resources available for serving requests received by said demand director server.

In some embodiments the invention provides horizontally scaleable, distributed data storage arranged to be connected to a network, typically for use with audio or video data.

The concept of copying, or migrating, data dynamically to expand overall network capacity to serve out a particular kind of resource can apply to the prior art arrangements where all web tier servers have the same content/resources. It is still possible to add a server (with the same content) to the network in response to demand. It is still possible to increase the capacity of all servers together to serve out a specific resource that is in demand (e.g. a further copy of the most popular movie could be added to each content server in response to demand, possibly at the expense of over-writing a copy of a less popular movie. It is not absolutely essential to use different, asymmetrically distributed, resources/content to use the "migration/copying of content" invention.

There may be more than one demand director server. This increases fault tolerance.

According to another aspect of the present invention there is provided a demand director server comprising a processor and a data storage device, the demand director server being arranged to manage asymmetric distribution of data across a plurality of data storage devices and mediate requests for access to said data so as to load balance the requests for data received by each of the data storage devices.

The demand director may copy data to different memory locations itself, or it may initiate a data copying process that is actually performed by another machine. The management of the data across the plurality of storage devices improves the efficiency of data storage. The load balancing of the requests for data improves the efficiency of usage of the storage devices and aims to ensure a high degree of reliability to the supply of the files to a user.

The processor may be arranged to facilitate the uploading of data from tape media, a DVD or audio CD to the storage devices. Alternatively, the processor may be arranged to facilitate the downloading of data from a network, typically the Internet.

The processor may be arranged to update a data (or resource, or content) location database, for example whenever any one, or more, of the following occurs: the number of storage devices is increased or decreased, data is copied to or deleted from a storage device, data is uploaded, or downloaded, to a storage device, an application, or resource, resident upon a data storage device is started up or shut down.

The demand director server may be arranged to act as a Level 7 switch. High level network switches are aware of the types of request being made within a data packet and can deal with the contents of the packet dependent upon the type of request. Level 7 switches are described in the Open Systems Level model of network information systems.

According to another aspect of the present invention there is provided a method of data storage management of data in a network comprising the steps of:
(i) monitoring the usage of a servable resource;
(ii) determining if the usage of said resource has increased or decreased;
(iiia) introducing an additional resourcer server to the network and/or starting up a resource-serving application on a resource server if the usage has increased; and/or
(iiib) removing said resource from a resource server and/or shutting down a resource-serving application on a resource server if the usage has decreased.

In many embodiments, especially those with asymmetrically distributed resources/content over the resource servers, the method will also update a database containing details of which resource servers have which particular resources thereupon.

The method may include removing a resource server from the network as part of step (iiib). The method may include copying a resource to the additional resource server as part of step (iiia). The resource may be a data file, such as a video.

According to a fourth aspect the invention comprises a server network comprising a demand director server, a first resource server having a first resource on it, and a second resource server having a second resource on it, different from said first resource, said director server being aware of where said first and second resources are located, and being capable of receiving a request for a selected one of said first or second resource to be served out, and of directing said request to whichever said resource server is determined to have said requested resource.

The request may originate from outside of said network, and the resource may be served out of said network.

According to another aspect the invention comprises a server network comprising a demand director server, a first resourcer server having a first resource thereon, and a second resource server having a second resource thereon; said demand director server being adapted to be aware of unused resource-serving capacity of said first resource server and of said second resource server, and said director server being capable, upon receipt of a demand for a requested resource that is present on both said first and said second resource servers, of selecting a selected one of said first or second resource servers to serve out said requested resource and causing said selected one of said first or second resource servers to serve out said requested resource, said demand director being adapted to use a knowledge of said unused resource-serving capacities for said selected resource of said first and second resource servers when selecting which resource server is to be said selected resource server and serve out said selected resource.

According to another aspect the invention comprises a demand director server adapted for use with a plurality of resource-serving resource servers having resources distributed between them, said demand director being capable of monitoring and managing distribution of resources across said resource servers, and of mediating requests for resources to be served out by said resource servers so as to direct a request for resource-serving to a chosen resource server chosen by said demand director using a knowledge of which resource servers are capable of serving out the requested resource.

According to another aspect the invention comprises a method of network resource management comprising, in a network having a demand director and resource serving servers, the steps of:—

(i) receiving at a demand director unit a request for a resource from a requester;
(ii) determining the availability of resource serving servers that are capable of serving said requested resource;
(iii) selecting a resource server that is capable of serving said requested resource and sending said request to the selected resource server;
(iv) establishing a connection between said requester and said selected resource server;
(v) serving out said selected resource from said selected resource server to said requester.

According to another aspect the invention comprises a method of satisfying a demand on an Internet network for a network resource, the method comprising providing the network with a demand director server, a first resource server having a first resource comprising one of a video file and a data file thereon, and a second resource server having a second, different, resource comprising one of a video file and a data file thereon; and the method further comprising having said director server be aware of what resources are held on said first and second resource servers and upon receipt of a request for one of said first and second resources selecting one of said first and second resource servers to serve out said requested resource and directing said request to said selected one of said first and second resource servers, said demand server selecting an appropriate one of said first and second resource servers to receive said request using its knowledge of where the requested resource is located.

According to another aspect the invention comprises a method of satisfying a demand on an Internet network for a network resource, the method comprising providing the network with a demand director server, a first resource server having a first resource comprising one of a video file and a data file thereon, and a second resource server having a second resource comprising one of a video file and a data file thereon; and the method further comprising having said director server be aware of unused resource-serving capacity of said first resource server and of unused resource-serving capacity of said second resource-server, and said director server upon receipt of a request for a requested resource which is present on both said first resource server and said second resource server selecting a selected one of said first and second resource servers to be the resource server that serves said requested resource, said director server selecting said selected one of said resource servers using a knowledge of whether or not said first and second resource servers have unused resource-serving capacity capable of serving said requested resource.

Whilst envisaged primarily for use with video files, the invention can be used with other files (termed "data files" for convenience).

In one embodiment the invention comprises a web tier of resource serving servers comprising a plurality of resource servers at least some of which have different servable resource content, thereby enabling a specific resource to be served out of one resource server but not another.

In a further embodiment the invention may comprise a tier of resource serving servers comprising a plurality of resource servers at least some of which have different servable resource content of the same kind or class, thereby enabling a specific resource of a kind or class to be served out of one resource server but not another, both resource servers having resources of said some kind or class.

There is usually also a demand director server which is aware of which resources are servable out of which resource servers, and which is capable of receiving a request for a particular resource and directing said request to a resource server capable of satisfying said request.

The demand director may be thought of as part of the resource-serving web tier, or as sitting above the resource serving web tier as a demand director server/router: i.e. a level 7 switch.

According to an aspect of the present invention there is provided a network having a plurality of networked resource servers having dissimilar resource content, and a demand director, said demand director being aware of what resources are potentially available on which of said resource servers, and being capable of determining current capacity of each of said resource servers to serve out each of said resources that they are capable of serving out, said demand director being adapted to allocate a request for a specific resource to a resource server that it selects using its knowledge of what servers, and their capacity to serve out said requested resource.

According to an aspect of the prevent invention there is provided a demand director for use in a network of resource servers, said demand director having information associating specific resources available for serving out from specific resource servers, and being adapted to ascertain the capability of said resource servers to serve out their potentially servable resources, and being adapted to allocate a demand for a specific resource to a selected resource server using said information and said capability.

According to another aspect of the present invention there is provided a demand director for use in a network of resource servers having resources that are potentially servable-out, said demand director having the capability of ascertaining the capability of said resource servers to serve out their potentially servable-out resources and of using a knowledge of the capability of said resource servers to serve out a specific resource in determining to which resource server a request for said specific resource is directed.

According to an aspect of the present invention there is provided a network having a plurality of content servers capable of serving out content of a particular kind stored upon them, and demand manager means adapted to allocate a request for specific content to an appropriate content server for serving said request, said content servers having dissimilar servable content of said particular kind stored upon themselves and said demand manager means having mapping means mapping specific content with specific content servers such that said demand manager is adapted to receive a request for specific content and to allocate said request to an appropriate content server having said specific content upon it, using said mapping means.

According to an aspect of the present invention there is provided a network having a plurality of content servers capable of serving out content of a particular kind, and content server monitor means adapted to monitor capacity of said content servers to serve out specific resources, said content server monitor being adapted to allocate a request for requested specific content to a content server chosen by said content server monitor means using a knowledge of said capacity of each of said content servers to serve out said requested specific content.

According to an aspect of the present invention there is provided a metropolitan area video serving network comprising a plurality of video servers having at least some different videos on at least some of said video servers, and a demand director having a location map correlating the address of which of said video servers has which of said videos available for serving, said demand director being adapted to direct demands for a specific video to an appropriate said video server for serving out said specific said video, using said location map to select said appropriate video server.

According to an aspect of the present invention there is provided a metropolitan area video serving network comprising a plurality of video servers having videos available for serving out, and a video server monitor and demand director adapted to establish the capacity of said video servers to serve out additional videos, beyond their current activity, and to direct a request for a specific video to a video server that said video server monitor and demand director has established has said particular video and is capable of serving out said video satisfactorily.

According to an-aspect of the present invention there is provided a method of satisfying a demand on a network for a network resource, the method comprising providing the network with a demand director server, a first resource server having a first resource thereon, and a second resource server having a second, different, resource thereon; and the method further comprising having said director server be aware of what resources are held on said first and second resource servers and upon receipt of a request for one of said first and second resources selecting one of said first and second resource servers to serve out said requested resource and directing said request to said selected one of said first and second resource servers, said demand server selecting an appropriate one of said first and second resource servers to receive said request using its knowledge of where the requested resource is located, and further comprising dynamically distributing servable resources between available resource servers dependent upon demand for said resources, and varying the capacity of said resource servers collectively to serve out demand for a particular resource dependent upon the demand for said particular resource.

According to an aspect of the present invention there is provided a method of satisfying a demand on a network for a network resource, the method comprising providing the network with a demand director server, a first resource server having a first resource thereon, and a second resource server having a second resource thereon; and the method further comprising having said director server be aware of unused resource-serving capacity of said first resource server and of unused resource-serving capacity of said second resource-server, and said director server upon receipt of a request for a requested resource which is present on both said first resource server and said second resource server selecting a selected one of said first and second resource servers to be the resource server that serves said requested resource, said director server selecting said selected one of said resource servers using a knowledge of whether or not said first and second resource servers have unused resource-serving capacity capable of serving said requested resource, and further comprising dynamically distributing servable resources between available resource servers dependent upon demand for said resources, and varying the capacity of said resource servers collectively to serve out demand for a particular resource dependent upon the demand for said particular resource.

According to an aspect of the present invention there is provided a method of sharing the demand for resources between a plurality of networked resource servers comprising providing dissimilar resource content on at least some different resource servers, having a knowledge of what resource is available for serving out from which of said networked resources servers, having a knowledge of said resource servers' current capacity to satisfy a request for resources that they are capable of serving, and allocating a request for a requested resource to a selected resource server chosen with the knowledge that it has said requested resource available for serving and that it has the capacity to serve out said requested resource satisfactorily, and further comprising dynamically distributing servable resources between available resource servers dependent upon demand for said resources, and varying the capacity of said resource servers collectively to serve out demand for a particular resource dependent upon the demand for said particular resource.

According to an aspect of the present invention there is provided a computer readable memory device encoded with a data structure for managing networked resources held on a plurality of resource servers connected to a network, the resource servers having a plurality of server programs running thereupon; in respect to a change in network traffic the data structure having entries, each entry containing:
- a network address associated with a resource that is servable out; and
- resource server-utilisation information or statistics.

According to an aspect of the present invention there is provided a method of making available computer network resources to users of a network comprising having a plurality of resource servers capable of serving out a resource of a common kind, monitoring the demand for a particular resource of said common kind automatically using a computer, and modifying overall capacity of said network to serve out said particular resource automatically in response to monitored or predicted demand.

According to an aspect of the present invention there is provided a data structure for managing the automatic transfer of data between a server program and a further server program in response to a change in traffic on a network, said data structure being arranged to manage the distribution of the data over said server program and said further server program, said data structure having entries, each entry containing:
- a locator associated with said server program;
- an identifier associated with at least a portion of said data; and
- traffic statistics associated with network traffic to said server program.

According to an aspect of the present invention there is provided software for controlling allocation of a request for a specific resource on a network of resource servers to a selected resource server, the software comprising a director adapted to direct said request to said selected resource server, said director being adapted to receive a map input derived from a resource locator map adapted to provide network addresses at which specific resources are available for serving out, and said director being adapted to use said input to select an appropriate resource server that has said specific resource available on it for serving out and to direct said request to said appropriate resource server.

According to an aspect of the present invention there is profided software for controlling allocation of a request for a specific resource on a network of resource servers to a selected resource server, said software comprising a director adapted to direct said request to said selected resource server, said director being adapted to receive a capacity input derived from an evaluation of capacities of each of said resource servers to serve out said specific resource, and said director being adapted to select said selected resource server using said capacity input to establish that said selected resource server has capacity to serve out said requested specific resource.

According to another aspect the invention comprises a method of increasing the number of different resources servable out from a web tier comprising having a web tier in accordance with the previous aspect of the invention and adding an additional resource server to said web tier, said additional resource server having additional resources not previously servable by said web tier.

A resource server's capacity to serve out a resource that it has may be dependent upon:
- whether there is unused application software capable of serving out the requested search;
- the amount of unused CPU processing power there is available;
- the bandwidth available for serving out that resource from the resource server (which may be dependent upon which part, or parts, of the server can support the serving out of the requested resource).

The demand director may use information relating to one or more (or any combination of) the above in order to select which resource server will be chosen to serve out a demanded resource.

Information on what activity a resource serve is currently performing, and possibly when it expects to be freed of that burden, is useful to the demand director to enable it to evaluate the unused capacity of the resource server available to serve out additional resources. An alternative to having the demand director evaluate the unused capacity of a resource server to serve out additional resources is for the resource server to evaluate that itself and inform the demand director of its unused capacity (instead of its used capacity).

Preferably network traffic associated with each resource server is monitored by the demand director. Preferably the demand director has traffic capacity limits for each type of resource available on each resource director and uses these limits, along with a knowledge of current traffic for each resource server, to select which resource server will satisfy a particular demand for resources.

The method may include polling a resource server (or non-master server) by the demand director (or master server). The method may include replying to the polling, by the resource server with information relating to any one or combination of the following: network address associated with the resource server, bandwidth utilisation of the resource server, resource served out by the resource server (either/or, or both, currently and since the last polling), a network address to which the resource is being/has been sent, a price associated with the resource served.

The method may include generating billing information for a user by the demand director server. The method may include checking to see whether a bill is due, by the demand director server. The method may include billing the user.

The demand director may evaluate whether usage and/or network capacity information is within a predetermined limit. It may be determined whether a sever or server farm has spare data serving capacity and may include copying a file thereto. A demand director resource-location directory or database may be updated, typically with the network address of the resource server with spare data serving capacity, and an identifier associated with what resource is available for serving.

A further server may be connected to the network by the demand director, which may communicate, e.g. multicast, details of the new resource available and/or available bandwidth over the network. The method may include the storing of said details upon the demand director, or master, server and/or some or all other servers. The method may include directing a request for the resource content of the further server to the further server by the demand director server. The method may include varying the resource (e.g. data) content of the further resource server or by the demand director server dependent upon demand for said resource content.

The method may include self-monitoring of the bandwidth utilisation of a resource server and may include determining if the bandwidth utilisation of the resource server is within a predetermined limit. The method may include passing an alarm message from the resource server to the master server, demand director, if the bandwidth utilisation is outside of the predetermined limit. The self-monitoring of a resource server/content server may constitute a separate invention, not necessarily linked with the previous invention(s).

The method may include self-monitoring of an input-output (IO) port traffic by a resource server. The method may include transmitting the results of the monitoring to the demand director, master server. The results of the monitoring may be compared to a statistical model, and it may be determined if additional resource serving servers need to be connected to the network, by the demand director, master, server. The method may include connecting an additional resource serving resource server to the network.

The method may include having a server farm (a "farm" is defined later) and designating one of the servers of the server farm as a master, or demand director, server. The method may include storing on the master, or demand director, server a database containing details of any one, or combination, of the following: a list of federated server farms and the network address of the demand director and/or resource servers participating therein, resources potentially available on each server, network address of each resource server, current and/or historical usage statistics relating to each resource that can be served out, current network traffic through an input-output (IO) device of each resource server, the cost of accessing each resource, an identifier of users who have accessed any given resource.

The method may include setting a threshold level of network traffic through each (IO) device. The setting of a threshold means that problems such as when the network, or an individual server, is approaching its capacity can be determined early and extra resources or processing capacity added before the situation becomes critical. Typically, the IO device is a network interface card (NIC) or it may be an IO port, possibly of an NIC. The extra resources or processing capacity may be added automatically by the demand director without human intervention, or human intervention may be necessary.

The method may include resource servers informing the master server, or demand director, when the threshold level is passed. The method may include using the demand director's (or master server's) database to determine if there is an additional resource serving resource available within the network, or server farm, able to service a request for the resource being served by the IO device.

The method may include generating a bill based upon a user's aggregate access of resources. The method may include providing a central register of resources (e.g. data content) on a server farm, or farms. This allows digital rights management to be centrally tracked thereby limiting the opportunities for piracy.

According to another aspect of the present invention there is provided a computer readable memory device encoded with a data structure for managing networked resources held on a plurality of resource servers connected to a network, the resource servers having a plurality of server programs running thereupon; in respect to a change in network traffic the data structure having entries, each entry containing:

a network address associated with at least one server resource program;

an identifier associated with a resource that is servable out;

resource server-utilisation information or statistics.

The utilisation information or statistics may be associated with network traffic through an input-output (IO) device associated with the resource servers.

The data structure may be arranged to facilitate the addition of further entries relating to an additional resource server, those entries containing one or more of: an additional network address, identifier and resource-server utilisation statistics thereto. The resource server-utilisation statistics entries in the data structure may include entries relating to any one, or combination, of the following: usage of resources, access patterns for the resources, access times for the resources, outgoing bit rates. The data structure may be arranged to facilitate a deletion of an existing entry therefrom. The data structure may contain an entry containing a port identifier associated with each resource. The port identifier may be a sub-set of the network address entry.

The data structure may contain an entry relating to a threshold level of network traffic associated with a particular resource on a particular resource server. The data structure may contain entries relating to upper and lower threshold levels of network traffic for particular resources on particular resource servers. Typically, these threshold levels will be expressed as a ratio of the theoretical to actual deliverable capacity of an input-output (IO) device, typically a network interface card (NIC).

Another thing that it is possible to do when there is a tier or network of servers with different resources (e.g. data content) of the same kind on them or associated with them, for example different videos, is to modify the capacity of the network to serve out a specific resource by replicating the resource and making it available from different, or more, servers on the network, or from different, or more ports on a server. This may make available different telecommunications bandwidth/routes, as well as increasing the overall capacity of processing power capable of serving out the specific resource. The original resource may still be present and functional on its original server, or it may be removed therefrom during the migration of data/resource operation. Thus, typically (but not always) in response to an increased demand for a particular resource (e.g. a specific video) the resource may be made more available on the network. Since the demand director allocates request for a specific resource to a selected one of those servers capable of serving out the selected resource, it will be usual to update the demand director's load balancing data to associate the addresses and capabilities of the server(s), or ports, to which the specific resource has been migrated, or copied, to the places at which the specific resource can be found on the network—so that the demand director can take into account the fact that it has an increased range of options post-resource-migration.

According to another aspect the invention comprises a method of making available computer network resources to users of a network comprising having a plurality of resource servers capable of serving out a resource of a common kind, monitoring the demand for a particular resource of said common kind automatically using a computer, and modifying overall capacity of said network to serve out said particular resource automatically in response to monitored or predicted demand.

Preferably, the method comprises having a demand monitor server monitor the demand for particular resources of said common kind, said demand monitor being aware of the capacity of each of said resource servers to serve out additional servings, beyond a current level of resource serving, of said particular resources. The demand monitor may be aware of the capacity of each of said resource servers to serve out additional servings of each of a plurality of user-selectable resources potentially available for serving out from each of said resource servers. The demand monitor may also comprise a resource server.

Thus, the demand monitor is "others aware"—it knows the capabilities of other servers (and of itself) to satisfy future requests for the serving out of each of different selectable resources of said same kind (e.g. different video movies).

The demand monitor may automatically cause additional capacity to serve out a specific resource to be created on said network, probably in response to monitored demand for said specific resource. However, said additional capacity may be created in advance of actual demand for it—in response to predicted future demand. The demand monitor may remove from said network capacity to serve out a specific resource, possibly to free-up serving capacity for a more popular resource.

The demand monitor may itself monitor what resources are being served out by what resource servers, possibly by monitoring traffic on input/output ports of other servers, or a resource server may monitor its own resource-serving activities and provide information to said demand monitor regarding what it is serving and/or its capacity to serve out additional resources, preferably information indicative of its ability to serve out each specific resource of said common kind available on it for serving out.

According to another aspect the invention comprises a method of monitoring network traffic on a computer network comprising having a network of computers, or servers, and enabling the individual computers or servers to monitor their telecommunication activity on their input/output ports and report on their telecommunication activity to a network traffic monitor.

Thus resource, or content, servers may self-monitor their network activities and/or their capability to contribute further to serving out particular resources.

The network traffic monitor may take an action automatically if network traffic for a computer or server is determined to be outside of permissible parameters. For example, if network traffic to a computer drops to too low a level an automatic alarm may be raised. Alternatively, or additionally, resources potentially available for serving from the computer/sever with a reported drop in telecommunications activity may be automatically made available for serving from one or more other servers in the network. For example such "missing" resources may be made available by automatically migrating content/resources from the server that is experiencing a drop in serving-out abilities, or by obtaining the "missing" resources from other places in the network (a record of what resources are available on what servers is typically kept on a demand director server). If the resources are kept on at least two different servers then a back-up copy should be available to be the "seed" for copying to a new server, to compensate for the degradation in service from the "missing", or impaired server.

According to another aspect the invention comprises a network comprising a plurality of content servers and a monitor server, said monitor server being capable of monitoring the network traffic to and/or from each content server, wherein said monitor server compares monitored network traffic to a threshold level and upon traffic levels meeting said threshold level said monitor server is adapted to take an action.

Said action may be to increase the capability of the network to serve out content that is in demand.

Said threshold may comprise a level of capability of serving out content from a particular content server, and wherein upon a monitored level of content serving reaching said threshold level, said monitor server takes said predetermined action which comprises causing the capability of said network to serve out said content to increase. Said monitor server may be adapted to copy said content to another networked server. Said servers may have telecommunication ports and said monitor server may cause there to be an increase in the number of telecommunication ports made available to a particular content of a content server. Said threshold level may comprise a minimum activity threshold level and wherein said action comprises performing a diagnostic check to ensure that said content servers are properly operational and/or communicated with said monitor server. Said minimum threshold level may be assessed in many different ways, for example, a threshold for a particular resource, a threshold for overall network traffic to a specific server, a threshold for all resources from a particular port, a threshold for a specified resource from a particular port, or any other identified subset of measurable activity of said servers.

According to another aspect the invention comprises a server having a processor, a memory, and a self-monitoring software program capable of being run by the processor, said monitoring program when run monitoring levels of usage on applications servable out of said server and being capable of identifying when the level of usage of said applications reach a threshold level and in response thereto causing said server to take an action which increases availability of said application to a requester who may request said application to be served to them.

Said action may comprise copying said application to another server.

When said server has a plurality of output ports and said application is available on less than all of said output ports, said action may comprise increasing the number of output ports of said server that are capable of serving out said application.

According to the present invention there is provided a data content server comprising a processor, a storage device and an input-output (IO) device (IO), the storage device having data content stored thereupon and the processor being arranged to execute a monitor application that is stored upon the storage device, the processor being further arranged to monitor the IO device when running the monitor application and to automatically determine whether a trigger condition has been met, and if so automatically to produce a control signal responsive thereto.

Said control signal may comprise a replicate signal adapted to cause at least part of the data content of the data content server to be copied to a further server or made available at a further IO port on said server.

This arrangement allows the data content server to self manage and distribute content based upon the visibility of content use and its ability to deliver the data content. The data content server becomes 'self-aware' for the purposes of application serving, typically based upon bandwidth usage, and can replicate data content to further servers in order to provide scaleable serving. The further server may be a server application that runs upon the data content server or it may be a further data content server.

According to another aspect of the present invention there is provided a data management system comprising a monitor unit and at least one data content server, the monitor unit including a processor and a storage device, the server including an input-output device, and the processor being arranged to run a monitor application that is stored upon the storage device, and in which the processor is further arranged to monitor the data content server's IO device when running the monitor application and to execute an action in response to a trigger condition associated with the IO device.

The monitor may itself be a resource server.

The data content server may have a processor arranged to monitor it's own IO device.

Typically the data stored on the servers will be file based data that is readily partitioned and for which access patterns are known or is predictable, for example video or audio data. Alternatively the data stored on the servers may be block based, for example a section of a database stored across several compute units can be copied when one of the compute units is heavily accessed and the network configuration may be altered appropriately.

The monitor unit may be arranged to monitor the server for faults. Alternatively, or additionally, the server may be arranged to self-monitor for faults. The monitor unit may be arranged to monitor the server ports and/or it may be arranged to monitor a client server network connection. The monitor unit may be arranged to spawn an appropriate server application either on a further port of the server or on a further server. The monitor unit may be arranged to facilitate the replication of the part of the data content of the server serviced by a failing port to a further server. This aims to ensure the continued and reliable supply of data to users. The monitor unit may update load balancing/routing tables which may be stored on the monitor unit. The monitor unit may also comprise a director server of other aspects of the invention, or indeed a resource server.

According to another aspect of the present invention there is provided a method of data management comprising the steps of:
(i) monitoring traffic on at least one data content server on a network;
(ii) either or both of:
  (a) starting up or shutting down an appropriate data serving application automatically upon a further server on the network in response to network traffic;
  (b) copying at least part of the data content of the data content server to the further server;
(iii) updating routing/load balancing tables associated with the network of resource servers; and
(iv) directing a portion of the network traffic to the further server.

The method may include providing the server as a server application upon the data content server or providing the server as a further data content server.

The method may include copying the at least part of the data content from either of the data content server or an original data source, for example a CD, DVD or tape media. This allows the data to be copied to the server even if the data content server has failed. The method may include executing steps (ii), (iii) and (iv) of the method in response to a change in network traffic due to any one of the following: application server failure, application server overload, insufficient nodes present upon a server based upon a statistical model. The method may include executing steps (ii), (iii) and (iv) of the method in response to a change in the number of active connections to a given port on the director unit. The method may include connecting or disconnecting a further server to/from a server farm in response to a variation in network traffic. The method may include configuring the further server within the network environment.

According to another aspect of the present invention there is provided a data structure for managing the automatic transfer of data between a server program and a further server program in response to a change in traffic on a network, the data structure being arranged to manage the distribution of the data over the server program and the further server program, the data structure having entries, each entry containing:
a locator associated with the server program;
an identifier associated with at least a portion of the data; and
statistics associated with network traffic between the server programs and the further server program.

The data structure may be arranged to distribute the data between the server program in response to the statistics, typically to improve the reliability of transfer of the data between the server program and the client program. The data structure may be arranged to facilitate the addition of further entries containing an additional locator, identifier and statistics thereto. The addition may occur in response to the statistical entries in the data structure. The statistics entries in the data structure may include entries relating to any one, or combination, of the following: usage of data, access patterns, access times, outgoing bit rates, accessed locations. The data structure may be arranged to facilitate to deletion of an existing entry therefrom. The deletion may occur in response to the statistical entries in the data structure.

The data structure may contain an entry containing a port identifier associated with each portion of the data, the port identifier may be a sub-set of the network address entry. The data structure may be arranged to copy the portion of the data associated with a port identifier from a first server program to a second program in response to a variation in the statistics relating to the network traffic. In the most preferred embodiments there is a port per video being served.

By "port" is meant a part of a logical network address (e.g. port 10020 from IP address 15.144.117.245). "Port" does not mean the network cabling connector of the NIC card.

The data structure may contain an entry relating to a threshold level of network traffic. The data structure may contain entries relating to upper and lower threshold levels of network traffic. Typically these threshold levels may be expressed as a ratio of the theoretical to actual deliverable capacity of an input-output (IO) device, typically a network interface card (NIC).

The server program and the further server program may be resident upon the same network element. There may be a plurality of server programs.

It will be appreciated that in many aspects of the present invention it is intended that the data is managed with minimal, preferably no, human intervention.

According to another aspect of the present invention there is provided a method of billing for access to data comprising the steps of:
(i) logging a request for data;
(ii) logging the origin of the request;
(iii) generating a bill from data stored on a database;
(iv) issuing the bill.

The method may include marking data at a given price for use and/or type of use. The method may include logging a user's identifier.

According to another aspect of the present invention there is provided a method of data rental comprising the steps of:
providing a server farm according to another aspect of the present invention either as a stand alone or as part of a library;
servicing a request for data from a user of the farm; and
charging the user for the supply of data.

According to an aspect of the present invention there is provided a method of maintaining availability of requested network resources comprises having a network of servers each having associated network-servable resources of a specific kind, and dynamically distributing servable resources between said resource servers dependent upon demand for said resources, thereby varying capability of said network as a whole to serve out a particular resource dependent upon the level of demand for said particular resource.

According to an aspect of the present invention there is provided a method of data management comprising the steps of:—

(i) monitoring traffic on at least one data content server on a network and/or software application response time for an application software running on at least one data content server on a network and (ii) starting up or shutting down an appropriate data serving application automatically upon said server or upon a further server on the network in response to network traffic and/or application response time.

According to an aspect of the present invention there is provided a network of resource servers each having deliverable resource of a specific kind available for serving out, and a resource manager adapted to receive a demand indicator input indicative of demand for a particular one of said deliverable resources of said specific kind and to output a resource-varying output adapted to vary capability of said network as a whole to serve out said particular one resource.

According to an aspect of the present invention there is provided a network comprising a plurality of resource servers adapted to serve out servable resources of a specific kind;
a usage monitor; and
a resource manager;

said usage monitor being adapted to monitor usage of said servable resources and to determine if a usage level of a particular said resource has changed significantly and to communicate such changes in usage level to said resource manager, said resource manager being adapted to introduce an additional server to said network and/or start up a resource serving application on a networked resource server if usage of said servable resources has increased significantly; and/or said resource manager being adapted to remove said specific resource from a networked resource server and/or shut down a resource-serving application on a networked resource server if said usage of said servable resources has decreased.

According to an aspect of the present invention there is provided a resource management server adapted for use with a plurality of resource servers having resources of the same particular kind available for serving out, said resource management server being adapted to evaluate demand for a particular one of said resources of said specific kind, in use, in order to vary capacity of said network to serve out said particular one resource responsive to changes in demand for said particular one resource.

According to an aspect of the present invention there is provided a content management server adapted for use with a content server network, said content management server comprising a servable content monitor adapted to monitor levels of usage of servable content of a specific kind, and a content availability manager adapted to change the availability of specific servable content depending upon demand for said specific servable content; said content management server being adapted to introduce an additional resource server to a network and/or start up a content serving application on a content server if levels of usage of a particular content have increased significantly, and/or being adapted to remove content from a networked content server and/or shut down a content serving application on a content server if levels of usage of a particular content have decreased significantly.

According to an aspect of the present invention there is provided a resource management server adapted for use with a plurality of resource servers having resources of a common particular kind available for serving out, said resource management server having demand evaluation means adapted to evaluate demand for a particular one of said servable out resources of said specific kind, and capacity modifying means adapted to modify capacity of said network to serve out said particular one resource, said capacity modifying means being responsive to evaluated demand signals from said demand evaluation means.

According to an aspect of the present invention there is provided a network of video servers each having videos available for serving out, at least one of said video servers comprising a video migration manager adapted to receive video demand-indicative signals indicative of the level of demand on said network for said videos available for serving, and to cause either: (i) activation of video serving application software on a video server which has a copy of said particular video available, thereby making said particular video available for serving from said video server; or (ii) a particular video for which said demand is sufficiently high to be copied from a first video server where it is available for serving to a second, different, video server and to make said particular video available for serving from said second video server so as to increase the capacity of said network to serve out said particular video, or (iii) to cause a particular video for which said demand is sufficiently high to be servable out from an increased number of port addresses of a said video server where said particular video resides, thereby increasing capacity of said video server to serve out said particular video; or (iv) to be able to cause both any one of (i), (ii), or (iii) to occur, or any combination of (i), (ii) or (iii) to occur; and wherein said video migration manager is adapted to operate automatically without human intervention so as to dynamically distribute video serving capabilities over said video servers of said network, responsive to demand for said videos.

According to an aspect of the present invention there is provided a video server for use with a network of video servers each having videos available for serving out, said video server being capable of having videos available for serving out and further comprising a video migration manager adapted to receive video demand-indicative signals indicative of the level of demand on said network for said videos available for serving, and to cause either: (i) activation of video serving application software for a particular video, for which demand is sufficiently high, upon a video server that has said particular video in memory; or (ii) a particular video for which said demand is sufficiently high to be copied from a first video server where it is available for serving to a second, different, video server and to make available for serving from said second video server so as to increase the capacity of said network to serve out said particular video, or (iii) to cause a particular video for which said demand is sufficiently high to be servable out from an increased number of port addresses of a said video server where said particular video resides, thereby increasing capacity of said video server to serve out said particular video; or (iv) to be able to cause any one of, or any combination of, (i), (ii) or (iii) to occur; and wherein said video migration manager is adapted to operate automatically without human intervention so as to dynamically distribute video serving capabilities over said video servers of said network, responsive to demand for said videos.

According to an aspect of the present invention there is provided software for controlling the distribution of network resources over resource servers of a network, the software comprising a demand evaluation operative capable of establishing levels of demand for particular resources available on said network, and a resource allocation operative adapted to receive input from said demand evaluation operative and to cause: (i) resources to be copied from one resource server of said network to another resource server of said network thereby to increase capacity of said network to serve out said resource; or (ii) cause a specific resource to be started up and made servable out from at least one additional port address of a resource server that already has said specific resource in memory so as to increase capacity of said resource server to serve out said specific resource; or (iii) cause an additional server, not previously part of said network, to be co-opted into said network so as to increase capacity to serve out resources; or (iv) cause any one of, or combination of, (i), (ii) or (iii) to occur.

According to an aspect of the present invention there is provided a network of video servers each having videos available for serving out, at least one of said video servers comprising a video demand manager adapted to receive video demand-indicative signals indicative of the level of demand on said network for said videos available for serving, and to cause either: (i) deactivation of video serving application software on a video server which has a copy of said particular video available, thereby making said particular video unavailable for serving from said video server; or (ii) to cause a particular video for which said demand is sufficiently low to be servable out from a decreased number of port addresses of a said video server where said particular video resides, thereby decreasing capacity of said video server to serve out said particular video; or (iii) deleting from memory of a video server a video; or (iv) to be able to cause any one of (i), (ii), or (iii) to occur, or any combination of (i), (ii) or (iii) to occur; and wherein said video demand manager is adapted to operate automatically without human intervention so as to dynamically distribute video serving capabilities over said video servers of said network, responsive to demand for said videos.

According to an aspect of the present invention there is provided a video server for use with a network of video servers each having videos available for serving out, said video server being capable of having videos available for serving out and further comprising a video demand manager adapted to receive video demand-indicative signals indicative of the level of demand on said network for said videos available for serving, and to cause either: (i) deactivation of video serving application software for a particular video, for which demand is sufficiently low, upon a video server that has said particular video in memory; or (ii) deletion from a memory of a video server of a particular video for which said demand is sufficiently low so as to decrease the capacity of said network to serve out said particular video, or (iii) to cause a particular video for which said demand is sufficiently low to be servable out from a decreased number of port addresses of a said video server where said particular video resides, thereby decreasing capacity of said video server to serve out said particular video; or (iv) to be able to cause any one of, or any combination of, (i), (ii) or (iii) to occur; and wherein said video demand manager is adapted to operate automatically without human intervention so as to dynamically distribute video serving capabilities over said video servers of said network, responsive to demand for said videos.

According to an aspect of the present invention there is provided software for controlling the distribution of network resources over resource servers of a network, the software comprising a demand evaluation operative capable of establishing levels of demand for particular resources available on said network, and a resource allocation operative adapted to receive input from said demand evaluation operative and to cause modification of capacity of said network to serve out particular resources, said modification comprising an increase in capacity or a decrease in capacity to serve out a particular resource.

According to an aspect of the present invention there is provided a method of serving out video over a network of video servers comprising evaluating a capacity of said network as a whole to serve out specific video items by establishing for each video server in said network an established ability of each said server to serve out such said specific items that are potentially servable from said each video server; using said established abilities of each said video server to evaluate an overall capability of said network as whole to serve out each of said specific video items; and taking steps triggered by said overall capability of said network to vary said overall capability to serve out at least a selected one of said specific video items.

According to an aspect of the present invention there is provided a video server monitor for use with a network of video servers each of which having video items, said monitor comprising an input adapted to receive inputs, an output, adapted to output outputs, and a processor adapted to process said inputs and generate said outputs, said inputs being representative of capabilities of each of said video servers to serve out video items potentially servable from respective said video servers; and said processor, in use, being capable of evaluating an overall capacity of said network from said inputs representative of each individual video server's capacity to serve out each said video item, and said processor being capable of using its evaluation of said overall capacity of said network to control output of said outputs, said outputs being adapted to vary said overall capacity of said network to serve out a selected one of said video items.

According to an aspect of the present invention there is provided a network of video servers having video items available for serving, and a video server monitor, said monitor comprising an input adapted to receive inputs, an output adapted to output outputs, and a processor adapted to process said inputs and generate said outputs, said inputs being representative of capabilities of each of said video servers to serve out video items potentially servable from respective said video servers; and said processor, in use, being capable of evaluating an overall capacity of said network from said inputs representative of each individual video server's capacity for each video item, and said processor being capable of using its evaluation of said overall capacity of said network to control said outputs, said outputs being adapted to vary said overall capacity of said network to serve out a selected one of said video items.

According to an aspect of the present invention there is provided a network of video servers wherein each video server is aware of its own capability to serve out videos that it has, and is aware of a capability of each other networked video server to serve out videos that they have, and wherein one of said video servers assumes a role of master video serving capacity controller and assesses a future capability of said network as a whole to serve out an additional copy of each video that is potentially servable in said network, and compares this assessed future capability for each video with threshold capabilities for each video and upon said assessed capability reaching said threshold capabilities said controller takes pre-programmed action automatically.

According to an aspect of the present invention there is provided a video server comprising processor means, memory means, and telecommunication means; said memory means having, or being adapted to have, video items for serving out of said video server; and said processor means being adapted to cause a said video item to be located in said memory means and served out of said telecommunication means to a network; and wherein said video server has input means for inputting to said processor inputs indicative of an ability of other video servers networked to said video server to serve out video items held on said other video servers, said processor monitoring an ability of said video server to serve out those of said video items held on said video server and being adapted to monitor, from said inputs, abilities of said other networked video servers to serve out video items held on said other video servers; said video server thereby being adapted to monitor an ability of said network to serve out particular said video items, and said processor having output means and being adapted to output outputs via said output means for causing said network to have an increased or reduced capacity to serve out at least a specific selected video item.

According to an aspect of the present invention there is provided software for running on a processor of a video server, said video server having a memory containing video items, an input port, a control output port, and a video streaming port, said software comprising a monitor routine adapted to process signals received by said input port from other video servers networked to said video server so as to establish a network-wide usage level of a plurality of videos items, or to establish a capacity of said network as a whole to serve out an additional copy of each of said video items potentially servable by said network; and said software having a video item availability-controlling routine which, pursuant to having established said usage level for each video item, causes actions to be taken to increase or decrease an ability of said network as a whole to serve out at least one specific video item.

According to an aspect of the present invention there is provided a method of modifying availability of video items on a network of video servers comprising providing a network of video servers wherein each video server is aware of its own capability to serve out videos that it has, and is aware of a capability of each other networked video server to serve out videos that they have, and wherein one of said video servers assumes a role of master video serving capacity controller and assesses a future capability of said network as a whole to serve out an additional copy of each video that is potentially servable in said network, and compares this assessed future capability for each video with threshold capabilities for each video, and upon said assessed capability reaching said threshold capabilities said controller takes preprogrammed action automatically.

According to an aspect of the present invention there is provided a video serving system comprising a monitor unit and at least one video content server, said monitor unit including a processor and a storage device having a monitor application stored upon it, said server including an input-output device, and said processor being arranged to run said monitor application, and in which said processor is further arranged to monitor said input/output device when running said monitor application and to execute an action in response to a trigger condition being met associated with said input/output device.

According to an aspect of the present invention there is provided a method of modifying availability of video items on a network of video servers comprising providing a network of video servers wherein each video server is aware of its own capability to serve out videos that it has, and an assessment of an aggregate capability of said network is made by aggregating individual video server capabilities, and modifying availabilities of videos on specific video servers so as to modify capability of said network as a whole to serve out specific particular video items.

According to another aspect of the present invention there is provided a method of satisfying a demand on a network for a network resource, the method comprising providing the network with a demand director server, a first resource server having a first resource thereon, and a second resource server having a second, different, resource thereon; and the method further comprising having said director server be aware of what resources are held on said first and second resource servers and upon receipt of a request for one of said first and second resources selecting one of said first and second resource servers to serve out said requested resource and directing said request to said selected one of said first and second resource servers, said demand server selecting an appropriate one of said first and second resource servers to receive said request using its knowledge of where the requested resource is located; and wherein said first and second resources comprise resource data that is in a resource data memory of said first and second resource servers and that is served out by the first and second servers, and wherein prior to directing a request for resources to a selected one of said resource serves said demand director determines whether said selected resource server has running on it an available for use appropriate resource serving application software capable of serving out the demanded resource in a format or protocol required by the request for resources, as well as determining that available for use appropriate resource data is available to said selected server, and wherein in order to increase the capacity of a specific resource server to be able to serve out additional resource of a specific kind an assessment is made as to whether said specific server has (i) resource data available to it for said specific resource; (ii) whether it has resource serving application software appropriate for said specific resource running upon it to enable it to serve out said specific resource; (iii) whether it has said application software installed on it but not running; (iv) whether it has application installation software installed able to install and run said application software; and wherein whichever of said resource data, application software, application installation software, or command to run installed application software or to install and run application software from installed application installation software, is necessary to cause said server to have the capability of serving out additional specific resource is transmitted to said specific server, the choice of which of (i) to (iv) is transmitted to said specific server being influenced by whichever of (i) to (iv) involves the transmission of the smallest amount of data consistent with the desired result of enabling said specific server to be capable of serving out additional specific resource.

According to another aspect of the present invention there is provided a method of satisfying a demand on a network for a network resource, the method comprising providing the network with a demand director server, a first resource server having a first resource thereon, and a second resource server having a second resource thereon; and the method further comprising having said director server be aware of unused resource-serving capacity of said first resource server and of unused resource-serving capacity of said second resource-server, and said director server upon receipt of a request for a requested resource which is present on both said first resource server and said second resource server selecting a selected one of said first and second resource servers to be the resource server that serves said requested resource, said director server selecting said selected one of said resource servers using a knowledge of whether or not said first and second resource servers have unused resource-serving capacity capable of serving said requested resource; and wherein said first and second resources comprise resource data that is in a resource data memory of said first and second resource servers and that is served out by the first and second servers, and wherein prior to directing a request for resources to a selected one of said resource serves said demand director determines whether said selected resource server has running on it an available for use appropriate resource serving application software capable of serving out the demanded resource in a format or protocol required by the request for resources, as well as determining that available for use appropriate resource data is available to said selected server, and wherein in order to increase the capacity of a specific resource server to be able to serve out additional resource of a specific kind an assessment is made as to whether said specific server has (i) resource data available to it for said specific resource; (ii) whether it has resource serving application software appropriate for said specific resource running upon it to enable it to serve out said specific resource; (iii) whether it has said application software installed on it but not running; (iv) whether it has application installation software installed able to install and run said application software; and wherein whichever of said resource data, application software, application installation software, or command to run installed application software or to install and run application software from installed application installation software, is necessary to cause said server to have the capability of serving out additional specific resource is transmitted to said specific server the choice of which of (i) to (iv) is transmitted to said specific server being influenced by whichever of (i) to (iv) involves the transmission of the smallest amount of data consistent with the desired result of enabling said specific server to be capable of serving out additional specific resource.

According to another aspect of the present invention there is provided a method of supplying a rich media resource of a specific kind in a network of resource servers having resource data in memory servable out by an appropriate one of a plurality of resource-serving application software running on said servers, a selected said resource data being capable of being served out in different ways by different said application software to satisfy different protocol/format requirements of different client demands for said selected resource, the method comprising running on a specific resource server selected to serve out specific resource data in a specific protocol/format associated application software adapted to serve out said resource data in the required protocol/format; and the method further comprising directing requests for specific resource to be supplied in particular protocol/format to a resource server which is assessed to have not only appropriate resource data available for serving, but also an appropriate application software running, or available for running, to serve out said appropriate resource data in the required protocol/format, the application software used to serve out the rich media resource data being tailored to how the rich media resource data is to be supplied to satisfy a client demand.

According to another aspect of the present invention there is provided a method of supplying a plurality of rich media resources of different kinds in a network of resource servers having a plurality of different resource data in memory servable out by an appropriate one of a plurality of resource-serving application software running on said servers, a selected one of said plurality of resource data being capable of being served out in different ways by different said application software to satisfy different protocol/format requirements of different client demands for different selected resources, the method comprising running on a specific resource server selected to serve out a selected specific resource data of a specific kind in a specific protocol/format associated application software adapted to serve out said selected resource data in the required protocol/format; and the method further comprising directing requests for specific resource of a selected kind to be supplied in a particular protocol/format to a resource server which is assessed to have not only appropriate said selected resource data of a selected kind available for serving, but also an appropriate application software available for running to serve out said appropriate selected resource data in the required protocol/format for resource of that selected kind, the application software used being tailored to how the selected kind of rich media resource is to be supplied.

Preferably, said rich media resource comprise video and wherein said plurality of application software comprises a plurality of different protocol/formats of video serving software.

Preferably, the method further comprises creating additional capacity to serve out resource by copying application software, or application-installing software, either from a said resource server onto another said resource server, or within a single said server, and having said demand director be aware that said copied application software or application-installing software exists and its location.

Preferably, the method further comprises the step of deleting, stopping running, or uninstalling, application software from a selected resource server, thereby freeing-up resource server capabilities for use in running other application software.

According to another aspect of the present invention there is provided a server network comprising a demand director server, a first resource server having first resource data thereon and first resource serving application software thereon, and a second resource server having second resource data thereon and second resource serving application software thereon; said demand director server being adapted to be aware of unused resource-serving capacity for each resource data and each appropriate software of said first resource server and of said second resource server, and said director server being capable, upon receipt of a demand for a requested resource that is present on both said first and said second resource servers, of selecting a selected one of said first or second resource servers to serve out said requested resource and causing said selected one of said first or second resource servers- to serve out said requested resource, said demand director being adapted to use a knowledge of said unused resource-serving capacities of said application software and availability of appropriate resource data for said selected resource of said first and second resource servers when selecting which resource server is to be said selected resource server and serve out said selected resource.

Preferably, said first resource server and said director server comprise the same server.

Preferably, said demand director server is adapted to perform or initiate the performance of
(i) copying of application software or application-installing software from a resource server to another resource server, or copying of application software or application-installing software within a single server;
(ii) deletion or uninstalling of resource application software or application-installing software, from a resource server and/or replacement of said resource application software or application-installation software with a different application software or application-installing software;
(iii) both activity (i) and activity (ii).

According to another aspect of the present invention there is provided a demand director server capable of performing the method of any preceeding aspect of the invention and which is capable of performing or causing to be performed at least one of the operations:
(i) copying resource from one resource server to another;
(ii) copying resource within a resource server so as to make said resource more available for serving;
(iii) deleting resource from a resource server and/or replacing it with different resource;
(iv) bring up or down resource-serving application software on a resource server;
(v) copying resource-serving application software within a resource server or from one resource server to another;
(vi) activating resource-serving application installation software in a resource server;
(vii) copying resource serving application installing software in a resource server.

According to another aspect of the present invention there is provided a network having a plurality of networked resource servers each having different resource content and each having different resource-serving application software, and a demand director, said demand director being aware of what resource content and what application software is potentially available on which of said resource servers, and being capable of determining current capacity of each of said resource servers to serve out each of said resources that they are capable of serving out resource content are capable of serving out/to be served out in a specific way, said demand director being adapted to allocate a request for a specific resource to be served out taking into account the availability of both resource content on the server in question and the availability of application software on the server in question to serve out the resource content in a specific way to a selected resource server that it selects using its knowledge of both the resource content and the application software available on each server, and the capacity of each server to serve out said requested resource in the requested specific way.

According to another aspect of the present invention there is provided a demand director for use in a network of resource servers, said demand director having information associating specific resources available for serving out from specific resource servers, and being adapted to ascertain the unused capability of resource-serving application software present on said servers to serve out their potentially servable resources, and being adapted to allocate a demand for a specific resource to a selected resource server using said information and said used application software capability.

According to another aspect of the present invention there is provided a network having a plurality of content servers capable of serving out content of a particular kind using a selected one of content-serving application software each tailored to be suitable for serving out content of different kinds, and content server monitor means adapted to monitor capacity of said content servers to serve out specific resources by evaluating the level of available for future use application software that is tailored for the specifically requested resource that is running or could be brought up to run on each server, and said content server monitor being adapted to allocate a request for requested specific content to a content server chosen by said content server monitor means using a knowledge of said available capacity of the appropriate application software of each of said content servers to serve out said requested specific content.

According to another aspect of the present invention there is provided a method of satisfying a demand on a network for a network resource, the method comprising providing the network with a demand director server, a first resource server having a first resource thereon, and a second resource server having a second, different, resource thereon; and the method further comprising having said director server be aware of what resources are held on said first and second resource servers and upon receipt of a request for one of said first and second resources selecting one of said first and second resource servers to serve out said requested resource and directing said request to said selected one of said first and second resource servers, said demand server selecting an appropriate one of said first and second resource servers to receive said request using its knowledge of where the requested resource is located, and further comprising dynamically distributing resource-serving application software and/or resource-serving application installation software between available resource servers dependent upon demand for said resources and upon whether or not said servers already have such software available for future use, and varying the capacity of said resource servers collectively to serve out demand for a particular resource dependent upon the demand for said particular resource.

According to another aspect of the present invention there is provided a method of satisfying a demand on a network for a network resource, the method comprising providing the network with a demand director server, a first resource server having a first resource thereon, and a second resource server having a second, different, resource thereon; and the method further comprising having said director server be aware of what resources are held on said first and second resource servers and upon receipt of a request for one of said first and second resources selecting one of said first and second resource servers to serve out said requested resource and directing said request to said selected one of said first and second resource servers, said demand server selecting an appropriate one of said first and second resource servers to receive said request using its knowledge of where the requested resource is located; and wherein a requested said selected resource server serves up a reply to said request in such a way that said reply appears to a requestor who made said request to be coming from said demand director.

According to another aspect of the present invention there is provided a method of satisfying a demand on a network for a network resource, the method comprising providing the network with a demand director server, a first resource server having a first resource thereon, and a second resource server having a second resource thereon; and the method further comprising having said director server be aware of unused resource-serving capacity of said first resource server and of unused resource-serving capacity of said second resource-server, and said director server upon receipt of a request for a requested resource which is present on both said first resource server and said second resource server selecting a selected one of said first and second resource servers to be the resource server that serves said requested resource, said director server selecting said selected one of said resource servers using a knowledge of whether or not said first and second resource servers have unused resource-serving capacity capable of serving said requested resource; and wherein a requested said selected resource server serves up a reply to said request in such a way that said reply appears to a requestor who made said request to be coming from said demand director.

According to another aspect of the present invention there is provided a server network comprising a demand director server, a first resource server having a first resource on it, and a second resource server having a second resource on it, different from said first resource, said director server being aware of where said first and second resources are located, and being capable of receiving a request for a selected one of said first or second resource to be served out of said network, and of directing said request to whichever said resource server is determined to have said requested resource; and wherein said resource servers are adapted to serve out requested resource by including an address in the resource served out that is the address of the demand director and withholding their own address from a requesting client server.

According to another aspect of the present invention there is provided a server network comprising a demand director server, a first resource server having a first resource thereon, and a second resource server having a second resource thereon; said demand director server being adapted to be aware of unused resource-serving capacity of said first resource server and of said second resource server, and said director server being capable, upon receipt of a demand for a requested resource that is present on both said first and said second resource servers, of selecting a selected one of said first or second resource servers to serve out said requested resource and causing said selected one of said first or second resource servers to serve out said requested resource, said demand director being adapted to use a knowledge of said unused resource-serving capacities for said selected resource of said first and second resource servers when selecting which resource server is to be said selected resource server and serve out said selected resource; and wherein said resource servers are adapted to serve out requested resource by including an address in the resource served out that is the address of the demand director and withholding their own address from a requesting client server.

According to another aspect of the present invention there is provided a method of satisfying a demand on a local area network for a network resource, the method comprising providing the network with a demand director server, a first resource server having a first resource thereon, and a second resource server having a second, different, resource thereon; and the method further comprising having said director server be aware of what resources are held on said first and second resource servers and upon receipt of a request for one of said first and second resources selecting one of said first and second resource servers to serve out said requested resource and directing said request to said selected one of said first and second resource servers, said demand server selecting an appropriate one of said first and second resource servers to receive said request using its knowledge of where the requested resource is located, and wherein said demand director server is capable of communicating with an additional resource server that previously was not making its resources available for serving requests received by said demand director server, and arranging for said additional resource server to make its resources available for serving requests received by said demand director server.

According to another aspect of the present invention there is provided a demand director server adapted for use with a plurality of resource-serving resource servers having resources distributed between them, said demand director being capable of monitoring and managing distribution of resources across said resource servers, and of mediating requests for resources to be served out by said resource servers so as to direct a request for resource-serving to a chosen resource server chosen by said demand director using a knowledge of which resource servers are capable of serving out the requested resource; and wherein information relating to both telecommunications availability and resource server processing availability is a factor in determining which resource servers are capable of serving out said requested resource.

According to another aspect of the present invention there is provided a method of supplying from a video farm a plurality of video resources of different kinds in a video farm of video servers, each video server having a plurality of different video resource data in memory servable out by an appropriate one of a plurality of video-serving application software capable of running on said servers, a selected one of said plurality of video resource data being capable of being served out in different ways by different said video-serving application software to satisfy different protocol/format requirements of different client demands for different selected video resources, the method comprising running on a specific farm video server selected to serve out a selected specific video resource data of a specific kind in a specific video protocol/format associated video-serving application software adapted to serve out said selected video resource data in the required protocol/format; and the method further comprising directing requests for specific video resource of a selected kind to be supplied in a particular protocol/format to a farm video resource server which is assessed to have not only appropriate said selected video resource data of a selected kind available for serving, but also an appropriate video-serving application software available for running to serve out said appropriate selected resource data in the required protocol/format for resource of that selected kind, the video-serving application software used to serve out said video resource being tailored to how the selected kind of video resource is to be supplied; and serving said video resource out from said selected farm video server to a client request or external of said farm, said video resource being served out by said selected video server in a manner such that said video resource appears to said client request or to come from the same video farm address irrespective of which specific video farm server actually served out said video resource.

It will be understood that references to video both hereinbefore and hereinafter are taken to encompass video (visual), audio and any other streamed performances.

BRIEF DESCRIPTION OF THE DRAWINGS

The invention will now be described, by way of example, with reference to the accompanying drawings, in which.

DETAILED DESCRIPTION OF THE DRAWINGS

Figure 1:
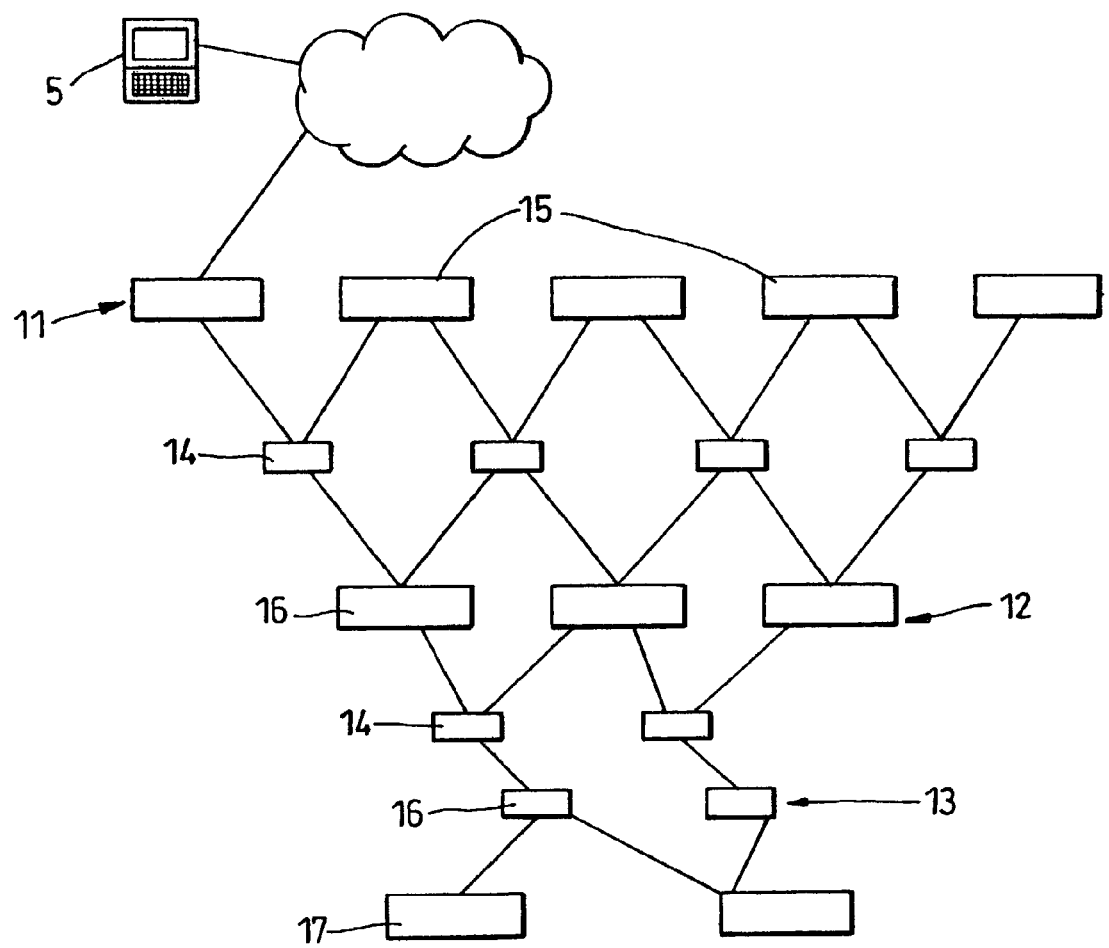
FIG. 1 is a diagram of a prior art data storage system.

FIG. 1 is a diagram of a typical prior art arrangement for infrastructure for an Internet service provider, for example an on-line retailer. The infrastructure typically comprises three layers, a web-tier 11, an application tier 12, and a database tier 13 connected by switches 14. The web-tier has a large number typically, 100 or 200 of highly distributed servers 15 each with a small amount of attached storage (e.g. 100 GB) each having the same data content replicated thereupon to ensure that a large number of external users can access the data (i.e. the same data can be accessed on a large number of servers 15, using an even larger number of telecoms routes). The data upon the web-tier 11 is usually is the form of static hypertext mark up language (HTML) pages. The HTML pages do not require a great deal of memory. The application tier 12 has fewer servers 16 than the web-tier 11 and runs the applications. A network switch, or router, 14 that sits above the web-tier 15 directs external users to the web-tier server 15 that is next in line for a request, load balancing the user request for data over the servers 15 in a crude way. The database tier 13 has a very small number, typically only 1 or 2, large capacity servers 16 connected to, high end large capacity e.g. hundreds of GB to tens of TB, consolidated storage elements 17 that are typically very expensive, e.g. $100 k high end disc arrays. The storage elements 17 contain data relating to, for example user details, user profiles, stock and auction details for the retailer. A user, referenced 5, accesses the data on the web-tier 11 via the web-tier 11, the application tier 12, and particularly via the switches or routers 14. The switches or routers are typically level 2, level 3, or perhaps level 4, switches.

Each tier of the infrastructure processes the data as best it can and the passes the data down to the tier below it. One problem with this approach is the increasing cost of the lower tier devices coupled with the need to replicate the devices at least once in order to build fault tolerance into the system.

Systems in which placement of network attached storage (NAS) at the web-tier are used are not particularly efficient as the web-tier servers do not have sufficient network connections to satisfy the information demands placed upon them by users in such architectures (see for example FIG. 2) and, NAS boxes have relatively few network connections. The cost of placing high end disc arrays, fibre channel and switches in the web-tier is prohibitive due to the large number of servers and the cost of Fibre channel adapter cards and disc arrays for the web tier is simply uneconomic.

Each content, or resource, 15 server has identical content capable of being served out to the user 5. This reduces the data management burden on the router/switches 14, allowing "dumber" switches to be used.

In at least one embodiment of at least an aspect of the present invention the following definitions can be applied:

Server farm:—a collection of servers acting together to provide a given application type (for example video streaming). In many embodiments of the invention a server farm will provide a load balanced delivery of content to users requesting use of that content from the farm. The user will, potentially, be able to access content on all servers of the farm using a single web address, so far as the user is concerned.

Demand Director:—a server acting as a management and co-ordinating station within a server farm for determining the location of content across the servers of the farm, and capable of directing a request for a specific resource to an appropriate resource server that contains that resource.

Resource Server:—a server device capable of serving out a resource which can be requested by a user. Typically a general purpose PC type hardware with some storage associated, e.g. internal disc, external disc array, in order to house the content, or resource, to be delivered.

Figure 2:
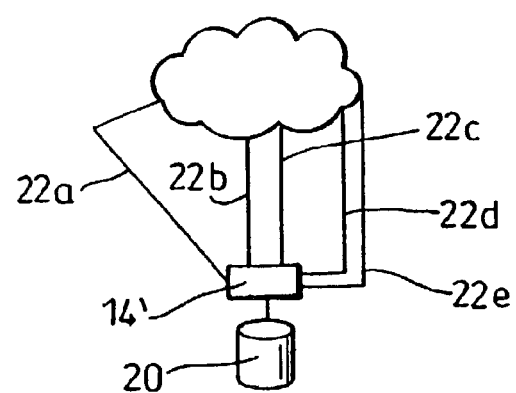
FIG. 2 is a block diagram of a network including a plurality of telecommunications routes.

FIG. 2 illustrates a server 20 connected to a router 14 which is in turn connected to the Internet by a plurality of different telecommunications links 22a, 22b, 22c, 22d, 22e.

Figure 3:
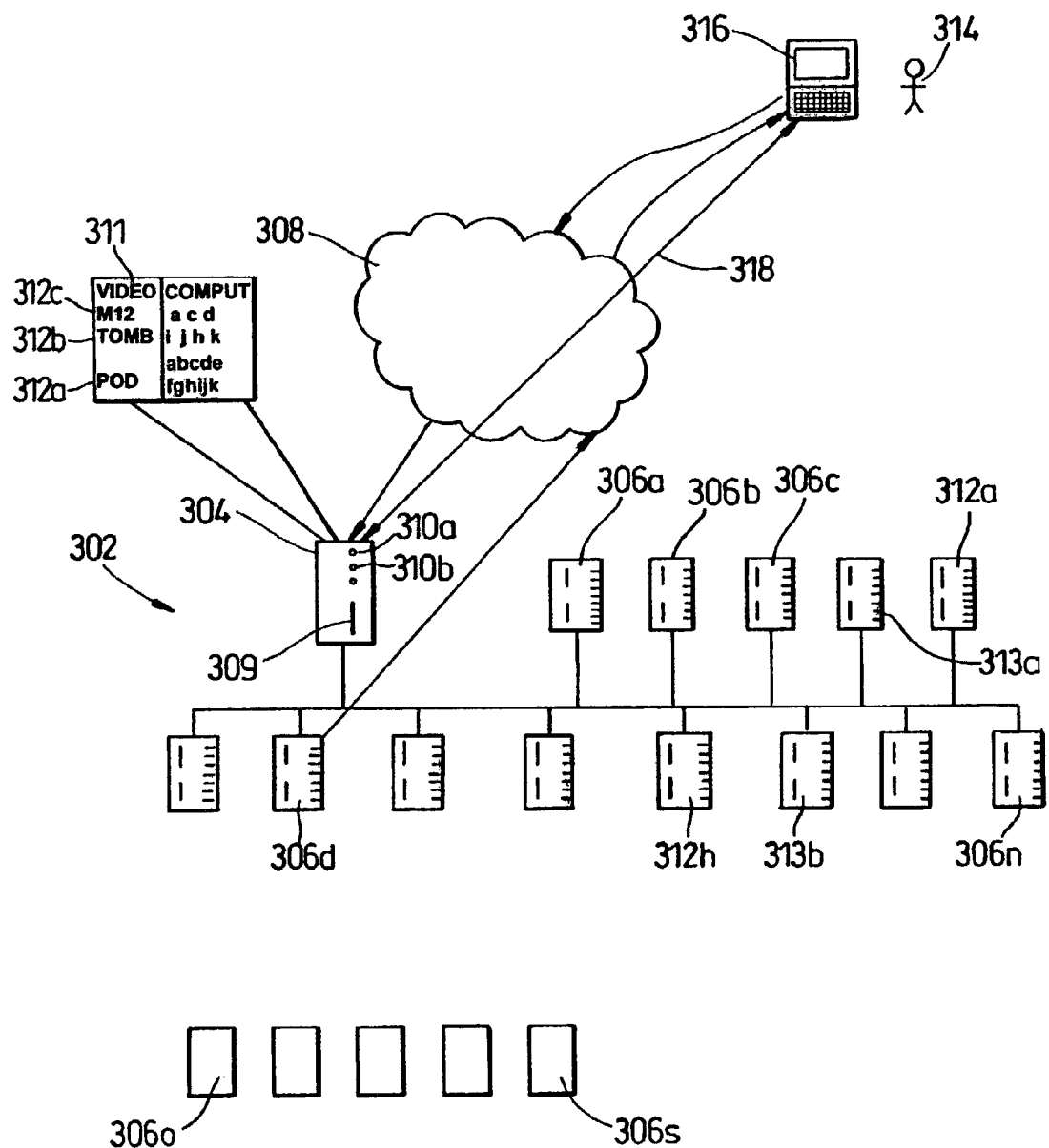
FIG. 3 is a schematic representation of a data storage system according to at least one aspect of the present invention.

FIG. 3 shows a networked video server farm 302, in accordance with at least part of an aspect of the present invention, comprising a director unit 304 and a plurality of resource servers 306a-n. Instead of "farm", the reader could read "network". A farm is a sub-class of a network, characterised by the servers all being "local" in the sense of local in telecommunications terms: i.e. they can communicate easily with the requesting demand director. Often this is because they are truly geographically local—e.g. in the same room or building, but "local" can mean "bandwidth/telecoms" local—i.e. good telecoms links between the server and the demand director. The farm 302 is connected to an external network 308, typically the Internet or a MAN (Metropolitan Area Network).

A typical server farm, say for serving out video movies, may comprise around forty content, or resource, servers and a demand director in a nineteen-inch wide rack. The typical farm will be able to store up to seven thousand feature length videos, each video being about 2 GigaBytes (GB) in size.

The director unit 304 has an interface 309 thereupon which specifies upon which ports 310*a-c* a resource-serving application is listening and which of the resource servers 306*a-n* are able to participate in serving out that application resource. For example two resource servers 306*b*, 306*a* are able to serve port 10045 requests for hypertext transfer protocol (HTTP) type application data (a resource capable of being served out), and all of the resource servers 306*a-n* are able to serve requests for real time streaming protocol (RTSP) application data. Other ports may be able to serve file transfer protocol (FTP) requests. Thus there may be different categories of servable resources, and each resource server may not be able to serve out all categories (or perhaps they can).

The video data can be partitioned into groups that are located on a per resource server basis. Serving the videos on a per resource server 306*a-n* basis allows a video to be tracked and a determination made as to how busy/popular any given video is.

The director unit 304 contains a database 311 which, in the current embodiment, contains details of real time videos 312*a-h* and upon which of the compute units 306-*n* the videos 312*a-h* are stored. The database 311 can determine which resource server 306*a-n* has a port suitable for serving new content as it is introduced onto the farm 302. Typically, a video will stick to a specified port. Video operates in a predictable manner and is deterministic in nature, i.e. the input/output (10) requirements are well understood. For example, —if a video is read back from a disc subsystem it is highly likely that the video will be read sequentially from the disc during playback. Thus, the capacity per resource server can be readily estimated. It will be appreciated that the data stored on the resource servers need not be video data: it may be audio data or any other data set where data access patterns are predictable and the data is readily partitioned, as the data is already divided into objects—the files e.g. NAS devices that serve files can also be implemented using this scheme in order to provide greater scalability than is currently available.

Each resource server 306*a-n* has two network interface cards (NIC) 313*a-b*, one for communication with the demand director unit 304 and one for outputting data to the network 308.

A user 314 connected to the network 308 requests a video 312*a* that is stored on the farm 302. The request is passed from a user's terminal 316 via the network 308 to the demand director unit 304. The director unit 304 compares the request to the contents of the database 311 to ascertain if the requested video (requested resource) is present on the farm 302. If the requested video is not present on the farm the demand director unit 304 returns an error message to the user 314.

Should the requested video be present on the farm 302 the demand director unit 304 accesses the database 311 in order to find a resource server 306*d* that has the video stored upon it. If more than resource server 306*d*, 306*j* has the requested video upon it the demand director unit 304 checks to see which of the resource servers 306*d*, 306*j* is best placed to serve out the requested video. This load balancing is typically achieved by monitoring one or more of the bandwidth available to a resource server, whether the resource server is currently being accessed either for the request severing out the same resource or for serving out another video, or possibly even projected access requirements based upon previous access demands placed upon a resource server. This load balancing is more sophisticated than the prior art "Round-Robin" or "response time" based approaches.

For example, resource server 306*f* may have the most popular video 312*b* stored upon it along with all of the other resource servers 306*a-e*, 306*g-n* in the farm 302. The server 306*f* may also have a previously unpopular video 312*c* stored upon it. The previously unpopular video 312*c* may increase in popularity, with the increase in access being recorded at the director unit 304. Thus, when the next request for the most popular video 312*b* is received by the demand director unit 304 it knows that the computer unit 306*f* is likely to be accessed for the video that is increasing in popularity 312*c*, and will therefore use one of the other compute units 306*a-e*,*g-n* to service this request for the most popular video 312*b* (assuming that they have available unused serving-out capacity).

Figure 4:
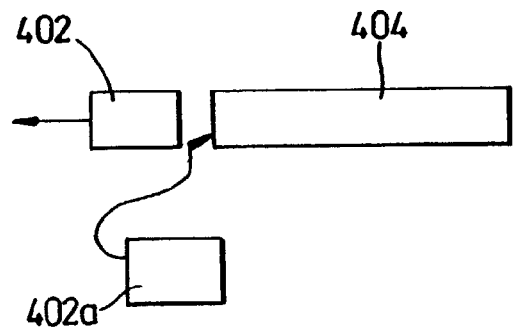
FIG. 4 is a schematic representation of a request data packet.

Once the demand director unit 304 has established which of the resource servers 306*a-n* for example 306*d*, it intends to service the request for the video 312*a* it strips TCP/IP address information 402 from a data packet 404 containing the request, as shown in FIG. 4, and splices a replacement TCP/IP header 402*a* containing the network address of the resource server 306*d* to the payload of the data packet 404, as is known from standard routing techniques. The request data packet 404 is forwarded to the compute unit 304, typically via an Ethernet link.

Figure 5:
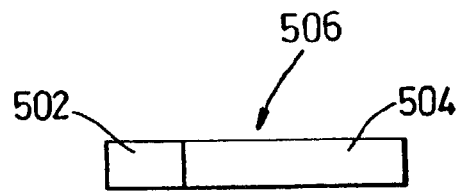
FIG. 5 is a schematic representation of a video data packet.

The resource server 306*d* will have the desired video file available for serving out to the user. As shown in FIG. 5, prior to streaming the requested video directly to the user 316 the resource server 306*d* rewrites a TCP/IP header 502 corresponding to the network address of the demand director unit 304 to the payload 504 of each outgoing data packet 506 containing the streamed video data. The video data will typically be in real time format, although it may be MPEG, Real Networks format or Windows Media format. The direct nature of the streaming bypasses the demand director unit 304 resulting in the removal of a potential bottleneck in the data transfer. The data is usually streamed via a telecommunication network.

The effect of placing the network address of the demand director unit 304 in the header 502 is to create a one time virtual connection 318 between the user terminal 316 and the demand director unit 304. This hides the network address of the resource server 306*d* whilst allowing the user 314 to play the video multiple times whilst the virtual connection 318 is maintained, in a manner similar to the rental of video cassettes. However, once the ephemeral virtual connection 318 is broken the user 314 has no means of re-accessing the video without accessing the demand director unit 304, as they do not know the network address of the resource server 306*d* that served the data to them. This arrangement limits the opportunities for a user to copy the data, or view it again at a later time, as the serving protocols are not the same as those used by a NAS that serves out data as raw files.

One of the resource servers 306*a-n*, or the demand director 304, can act as a billing unit 306*c*. The user may be required to provide details such as their e-mail address, address, telephone number and bank details before they are allowed full access to the farm 302. The billing unit 306*c* receives information from the director unit relating to the users details, the video that the user has requested and the cost of viewing the video. Thus, the billing unit 306c can automatically produce and issue bills to users of the farm 302 based upon their viewing habits. Where the users bank account details are retained by the billing unit 306c payment for viewed videos can be taken from a users bank account. Typically billing occurs three days or so after viewing the video or on a regular basis, for example monthly, and any subscription fee for the use of the service can be billed at the same time.

It will be appreciated that video clips can be provided as a 'free trial' service for potential users of the video farm.

As the demand for a particular video increases the demand director 304 writes the popular video data to additional resource servers 306d-n that are within the server farm 302. Should the demand for a video increase so much that there are not sufficient resource servers 306 within the farm 302 the demand director 304 co-opts additional resource servers 306o-s to the server farm 302. These additional compute units may be on other server farms connected to a MAN, as detailed hereinafter. Alternatively, they may be additional, non-utilised, resource servers associated with the farm 302.

The non-utilised compute resources are typically added to the server farm 302 as demand begins to increase. The horizontal scalability of compute resources allows an xSP (e.g. SSP, ASP, ISP, or FSP) to start with a small amount of relatively cheap infrastructure and increase their access provision in line with demand.

As will be appreciated, because there is asymmetric, different, data on the web tier resource servers 306, it is easy to add extra new, different resources, (e.g. videos). A new video, or other resource is provided on a networked resource server 306 and the demand director 304 is updated to be aware of the existence of the new resource capable of being served out, and of its location on the network (so that it can accept a request for the newly available resource and direct requests to the correct resource server).

Similarly, it is straightforward to add additional serving capacity. A new resource server is simply connected to the network and the demand director informed of its existence/presence on the network and what resources it has for serving out.

By way of example, new releases of video movies could simply be loaded into a new video server and the new server connected to the network. Alternatively or additionally, old, unused, videos could be overwritten with more popular videos, or newer videos. So long as the demand director knows what is on the network capable of being served out, and where it is, the demand director can communicate a user with requested resource.

Altering the content servable out from a resource server may be done with human intervention/manually, or a computer such as the demand director, may automatically redistribute resources over the network in order to be able better to serve out often-requested resources. This may involve automatically copying resources either to provide multiple copies of the resource with a resource server, or copies on an additional, or different, server.

Once one is freed from the conventional straightjacket of having all web tier servers have the same serverable content, things become much easier to change. There is, of course, an increase in the overhead in managing the knowledge of what resource is where, and this requires a smarter demand director than the prior art. The decision to go against the conventional mantra that all resource servers capable of serving a particular kind of resource (e.g. videos) have the same variety of and number of available resources of that specific kind of resource, has very significant advantages.

Returning to FIG. 3, as demand for a particular video decreases the demand director unit 304 removes this video data from some of the resource servers 306k-n within the farm 302. Alternatively, the demand director 304 stops the unpopular application serving on the resource servers 306k-n and leaves the content in situ. Should the overall demand for videos drop to a low enough level the director unit 304 retires resource servers from the server farm 302. Those resource servers that are retired can be recalled to the server farm 302 should the demand increase again, or co-opted to other farms on a MAN, see hereinafter. Alternatively, or additionally, typically in the case of a chronic shortage of disc space, the demand director unit 304 may overwrite unpopular video files, as determined by a statistical analysis that it may perform on the existing resource servers 306a-n with more popular video files. Thus is it possible that any one of the resource servers 306a-n may have more than one copy of a video on it at any given time. More likely, however, is to have one copy of a specific video file on a video server and run more serving processes on the video server to serve out to different users, using the same video file. An advantage of having more than copy of a video file on the same server is so as not to overly tax the disc on which that video file is housed.

Thus, the server farm 302 is horizontally scaleable and dynamically expandable. This enables the provision of content level granularity. The amount of resource-serving capacity dedicated to a particular resource (e.g. video) can be dynamically changed depending upon demand.

Figure 3A:
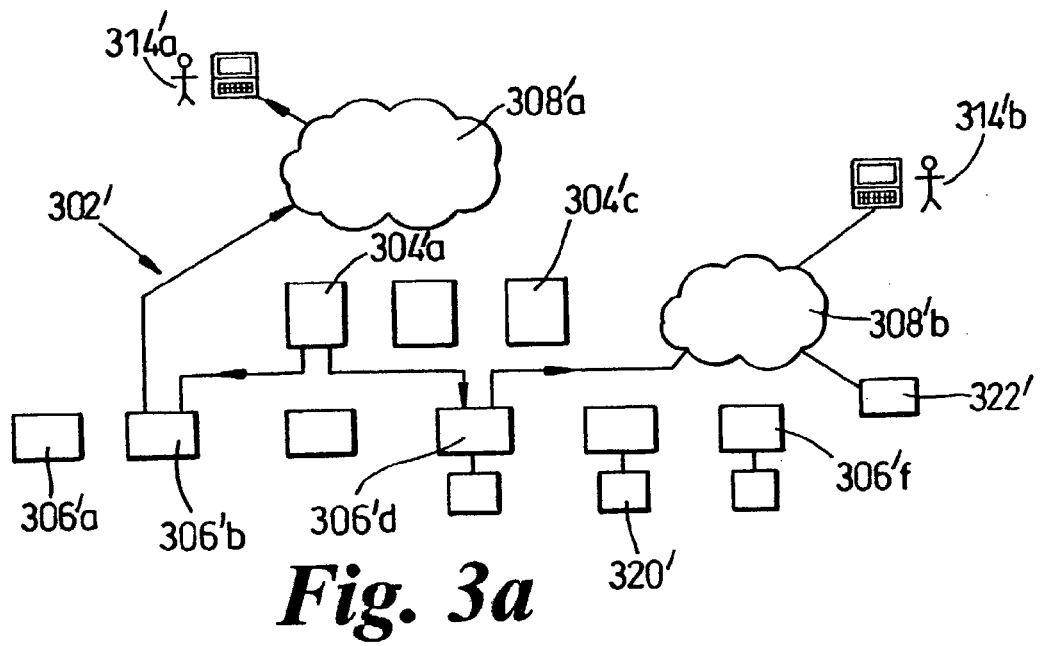
FIG. 3a is a schematic representation of a modified version of the data storage system of FIG. 3.

FIG. 3a shows a modified version of a server farm 302' similar to the server farm 302 of FIG. 3 in which three demand director 304'a-c are provided in order to build fault tolerance into the system 302'.

Additionally, some of the resource servers 306'd-f have additional storage associated with them either in the form of DAS 320' or NAS 322'. The DAS is typically connected to the units 306'd-f by a SCSI or Ethernet link. Thus, the horizontal scalability of this arrangement is evident.

The demand director 304'a is shown servicing two requests for data to two users 314'a,b via respective resource servers 306'b,d. The data is transferred to the users 314'a,b via respective networks 308'a,b in the manner described hereinbefore. The users 314'a,b start their session by connecting to the resource servers 306'b,d via the demand director unit 304'a. Thereafter the users 314'a,b are connected directly to the resource servers 306'b,d.

Figure 6:
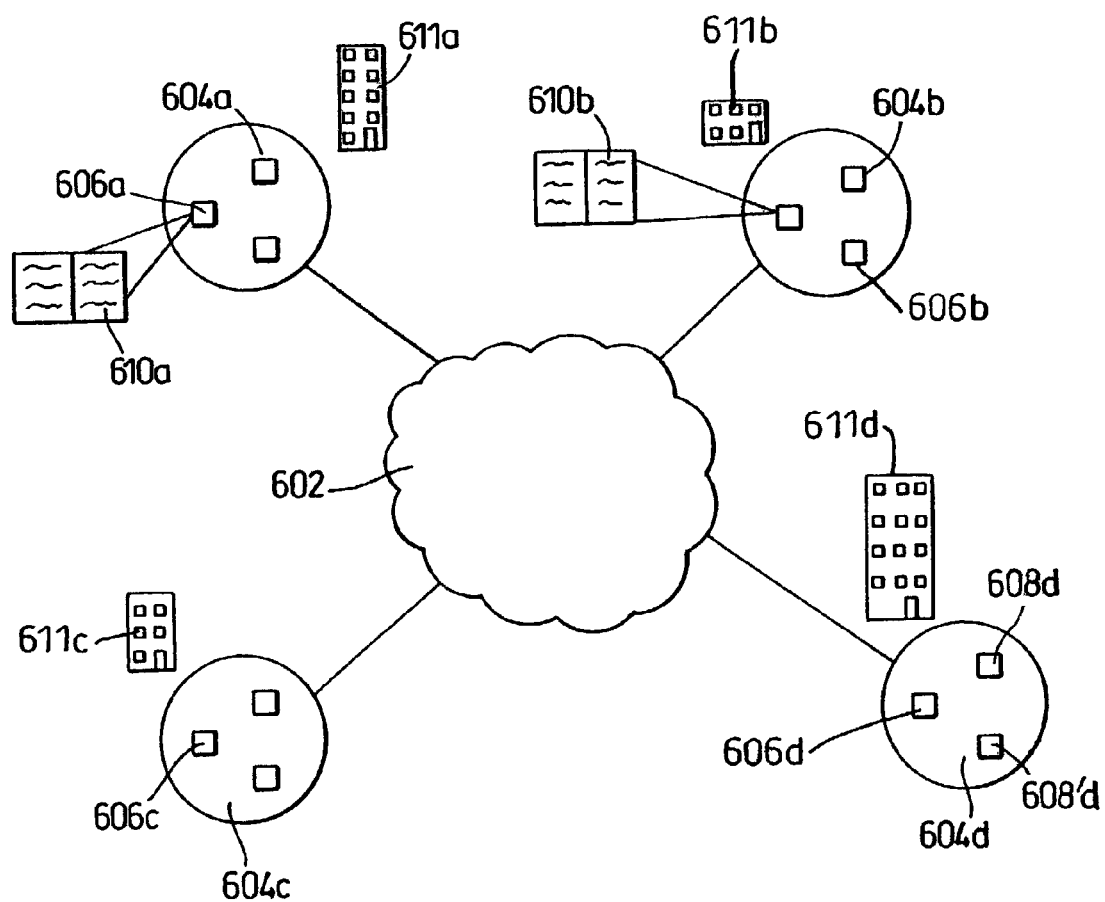
FIG. 6 is a schematic representation of a networked video library.

FIG. 6, shows a MAN 602 having several server farms 604a-d connected thereto. Each of the farms 604a-d has its own demand director 606a-d and resource servers 608a-d, 608'a-d thereupon. Each of the demand directors 606a-d has a database 610a-d that contains details of the video content of each of resource servers 608a-d, 608'a-d. The farms 604a-d are typically situated in multiple occupancy dwellings 611a-d such as condominiums or apartment blocks, usually in the basement or service area. When one of the demand directors 606a receives a request for a particular video it accesses database 610a which is stored thereupon to see which, if any, of the resource servers 608a-d, 608'a-d has the required video data stored upon it. If none of the resource servers 608a-d, 608'a-d has the video data the demand director 604a issues a notification of that fact to the user who requested the video. There may be multiple databases, for example, each dwelling 611a-d may have a self-contained farm and does not need to go outside its own farm to find content (videos). However, a dwelling's farm may extract content from other dwellings' farms, as necessary.

If at least one of the resource servers 608a-d, 608'a-d has the required video data upon it the demand director unit 604a uses the database 610a to decide which of the resource servers 608c, 608b is best placed to serve out the data; i.e. which resource server 608c, 608'b has the most available output bandwidth, which has its CPU not currently being over-used etc.

Once the decisions as to which resource server 608c is accessed in order to fulfil the request for the data the databases 610a-d are updated to show the resource server 608c as being utilised.

The packet headers sent between the demand director 606a and the resource server 608c, and between the compute unit resource server 608c and a requester 612 are re-written such that a virtual connection 614 between the demand director unit 606a and the user, and between the resource server and the user, is established as described hereinbefore. The packets appear to the recipient user to have come from the demand director, which is where the user was expecting them to come from.

The arrangement allows data content to be further distributed over the server farms 604a-d forming a library without each farm having to maintain the full data content of the library. For example a first set of 100 different videos could be stored in one server and a second different, set of 100 videos (different from each other and from that of the first set) could be stored on a second server.

Data can be added to, or removed from each farm and additional resource servers added or removed from the farms as described hereinbefore.

Additionally, one of the demand director units 606c can operate as a central billing facility where all requests for video, wherever that request originates e.g. apartment building 611a and whichever farm 604a-d services the request, are logged and billed. This central billing facility bills users of the system in the same manner as the billing unit 306c for the single server 302.

In both the individual farm, or the MAN connected library of farms, the content is loaded onto the resource servers from a variety of sources. For example the content can be loaded directly from a video cassette or DVD. Alternatively, the content may be downloaded onto the resource servers over a network, typically the Internet from other resource servers, or via a network (typically the Internet), from a film studio or film archive, or from a tape library connected to the server farm 302, or via a satellite download.

Figure 7:
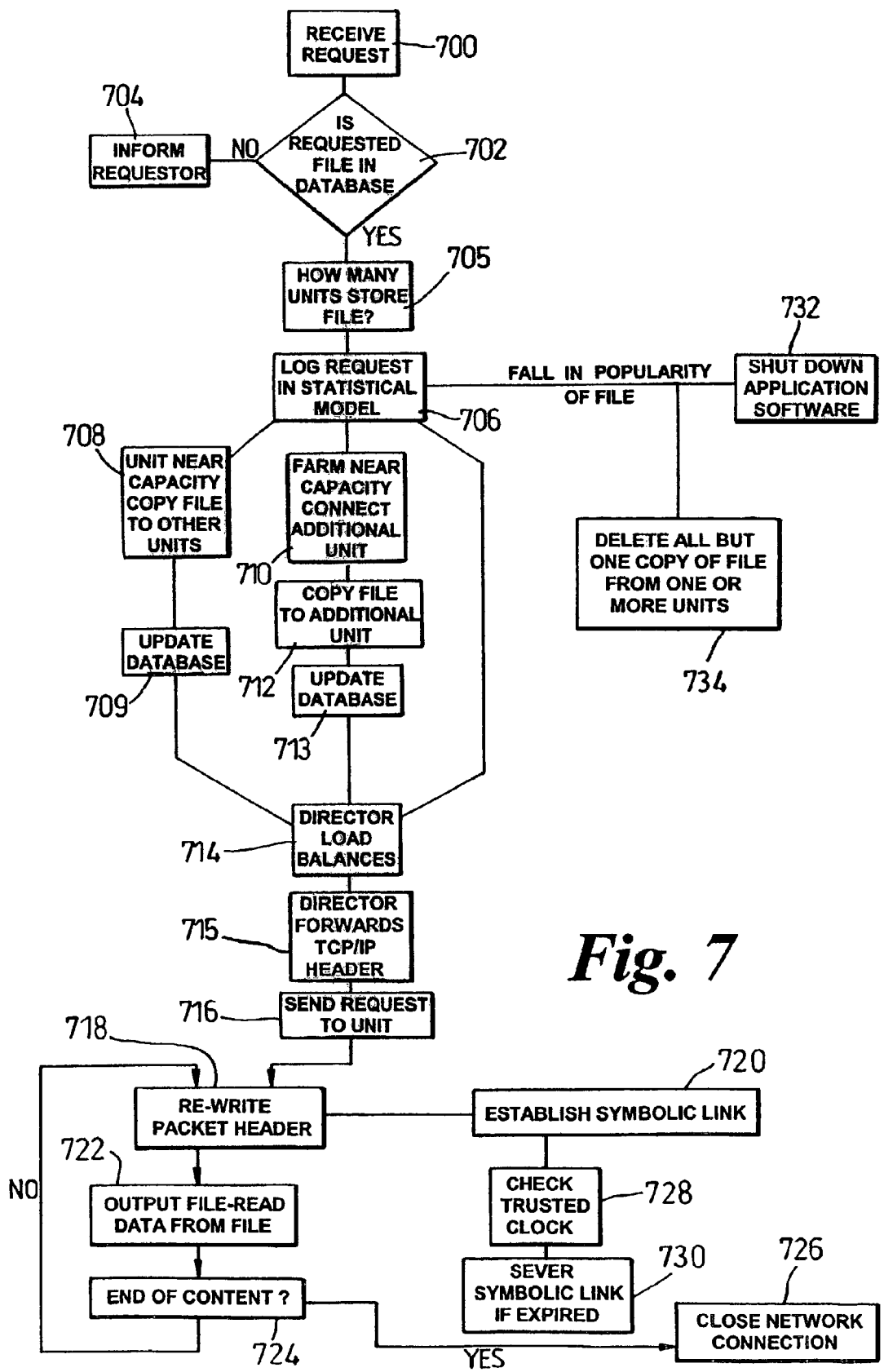
FIG. 7 is a flow chart detailing a method of data management according to an aspect of the present invention.

FIG. 7 is a flowchart detailing the methodology used in a server farm. The director unit 304 receives a request for a file (e.g. video or audio) from a user (step 700), typically the user will be presented with a selection of videos from which to choose. The demand director 304 accesses the database 311 in order to ascertain if the file is stored on the farm (step 702). If the file is not stored on the farm the demand director 304 sends a notice to that effect to the user 314 (step 704).

If the file is stored on the farm the demand director 304 accesses the database to check how many of the resource servers 306a-n are available to service the request for the file (step 705) and logs the request in a statistical model (step 706. Resource server 306f has the requested file stored upon it. There are a number of options available to the demand director unit 304.

If the statistical model has calculated an increase in the number of requests for the file and there is a possibility that the resource server 306f may not be able to serve all of the requests for the file. The demand director 304 can copy the file to an additional resource server(s) 306g-n the (step 708) and update its database 311 (step 709). Also, if the other resource servers 306a-e, 306g-n within the farm are near their capacity the demand director unit 304 can connect to additional resource servers, possibly having been previously retired from the farm, in order to use their storage and connection capacity (step 710), and can copy the requested file to one of them (step 712) and update its database 311 (step 713). Alternatively the director unit 304 can start up additional service providing applications on the resource servers 306f.

Should the demand director unit 304 establish that there is more than one resource server 306f, 306i capable of serving a request for a file the demand director unit 304 executes a load balancing routine (step 714) to ascertain which of the resource servers 306f, 306i is best placed to serve out the requested resource, for example by looking at the database in order to determine the current server activity, or by using the statistical model, or it may use a simple round-robin scheme.

If there is no reason why the resource server 306f is incapable of dealing with the request the demand director unit forwards a TCP/IP packet of the request for the file (step 715) to a first, inward, NIC 313a of the resource server 306f (step 716). Prior to outputting the file the resource unit 306f writes the TCP/IP header of the output data packets such that it appears to the user's machine that they issue from the demand director unit 304 (step 718) thus establishing the one time virtual connection 318 between the demand director unit and the user's machine 316. The symbolic link creation is referenced as 720. Step 722 outputs the file from the resource server 306 to the user via a suitable port of the second, outward, NIC 313b, over the network 308. The resource server 306 checks periodically, referenced 724, to see if some of the requested content is still to be served out. If there is still remaining content the server 306 continues to re-write packet headers (718). If there is more content to serve out the network connection of the server 306 is closed down (referenced 726).

Once a resource server 306f is found that can service the request the file is sent via the network 308 to the user 314 as described previously (steps 714-720). The user is free to view the file for as long as the symbolic link is maintained on the file system and as long as the resource application being run on the resource server has a free resource to service the client's request. The symbolic link may have a time limit. The demand director unit 304 may include a trusted clock which is checked periodically to see if the symbolic link has expired (step 728). If the time limit for the link has expired the demand director unit 304 issues an instruction to the resource server 306f to sever the link (step 730), i.e. remove the file system's symbolic link to the content or drop support for the resource application being run on the resource server, typically by disabling the resource server's packet rewriting ability. Alternatively or additionally, the resource server may by default remove the link after a predetermined time.

As a particular file becomes less popular the database will record less requests for it until at a threshold value, for example no requests within a week, two weeks or a month, the demand director 304 will issue an instruction to a resource server 306d which contains the file to delete all but a single copy of the file (step 732) and which leaves the content of the last copy of the video file of a server in situ on the server and shut down (step 734) the resource application running on the resource server 306f. This process will continue repeatedly over a period of time until all of the copies of the file have been disabled from all of the resource servers 306d, 306k, 306j that had the file stored upon them (if demand falls off to the extent to justify that). Alternatively, the threshold can be set such that all of the copies of the file are disabled from any resource server once the threshold is passed. It is possible to delete a file from a resource server if it is unpopular, and this may be a preferred option sometimes, but since it is expensive in I/O telecoms to re-load a file to a server, it is usually preferred to de-select the file by closing the serving out application for that file running on the server.

Figure 8:
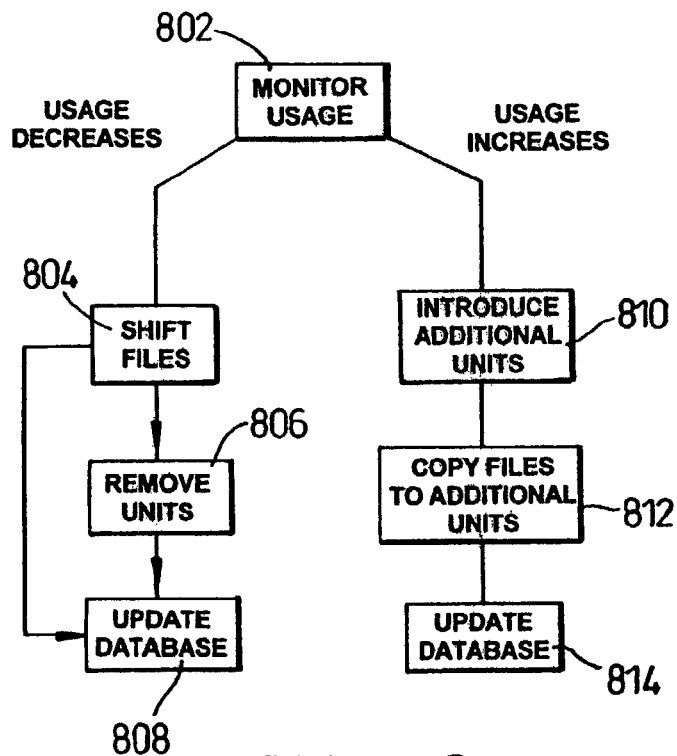
FIG. 8 is a flow chart detailing a method of data storage management according to an aspect of the present invention.

Referring now to FIG. 8, the demand director 304 also monitors the total usage of the farm as the usage varies (step 802). As the total number of requests for files decreases the director unit 304 moves files between resource servers 306 to minimise the number of resource servers 306 required to service the estimated number of requests for the files (step 804). This enables redundant resource servers 306 to be retired from the farm 302 (step 806). The demand director unit 304 updates the database to reflect the redistribution of files and the retired resource servers (step 808).

As usage of the farm increases toward the capacity of the existing resource servers 306a-n the director unit 304 introduces additional resource servers 306o-s into the farm 302 (step 810) and copies some of the files to these additional resource servers 306o-s (step 812). The files copied to these additional resource servers 306o-s will typically be the most popular files. The demand director also starts up appropriate resource application serving programs on the resource servers 306o-s upon their addition to the farm. However, this may not be the case. If, for example, the additional resource servers 306o-s have a lower specification that those already in the farm 306a-n the demand director may copy less frequently requested files to the additional resource servers 306o-s to enable it to cause more copies of the most popular files to be created on the high specification resource servers 306o-s, in order to guarantee high quality access to the more popular files. Once the additional resource servers 306o-s have been introduced into the farm 302, their content and application serving capabilities are uploaded into the demand director's database 311 (step 814).

Figure 9:
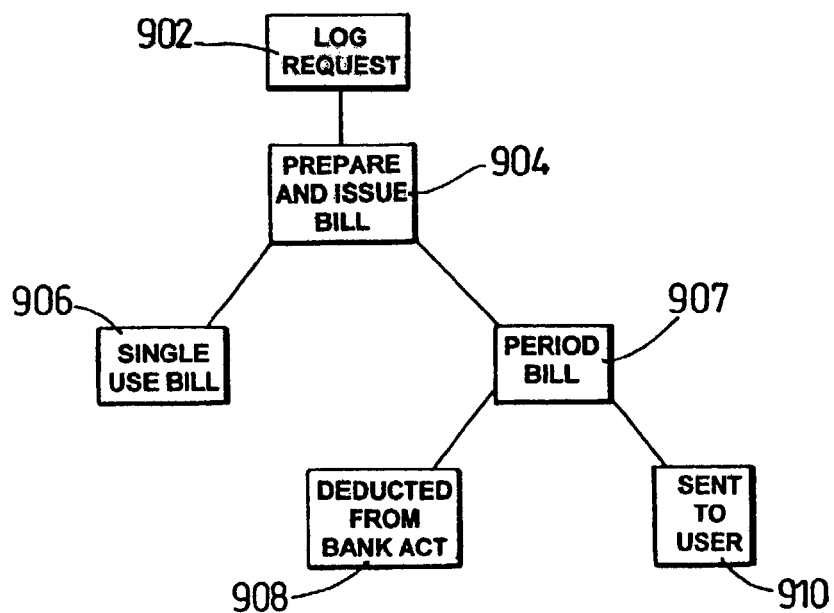
FIG. 9 is a flow chart detailing a method of credit management for data access according to an aspect of the present invention.

Referring now to FIG. 9, one of the resource servers 306c, or the demand director 304, can act as a billing unit. The billing unit logs an incoming request for a file (step 902) including the network address of the requestors computer and the requesters identification. The billing unit then causes bills to be issued to the user (step 904). The bill can be for access to individual file (step 906) typically billed by direct debit in three working days from a users bank account, the bank account details being held on a database. Alternatively, the billing unit can produce a bill for the billing period (step 907) typically a day, or a week, or a month, and the bill can include a subscription charge, if one is levied. This 'period' bill can be automatically deducted from a bank account (step 908) or sent to the user for manual payment (step 910).

Figure 10:
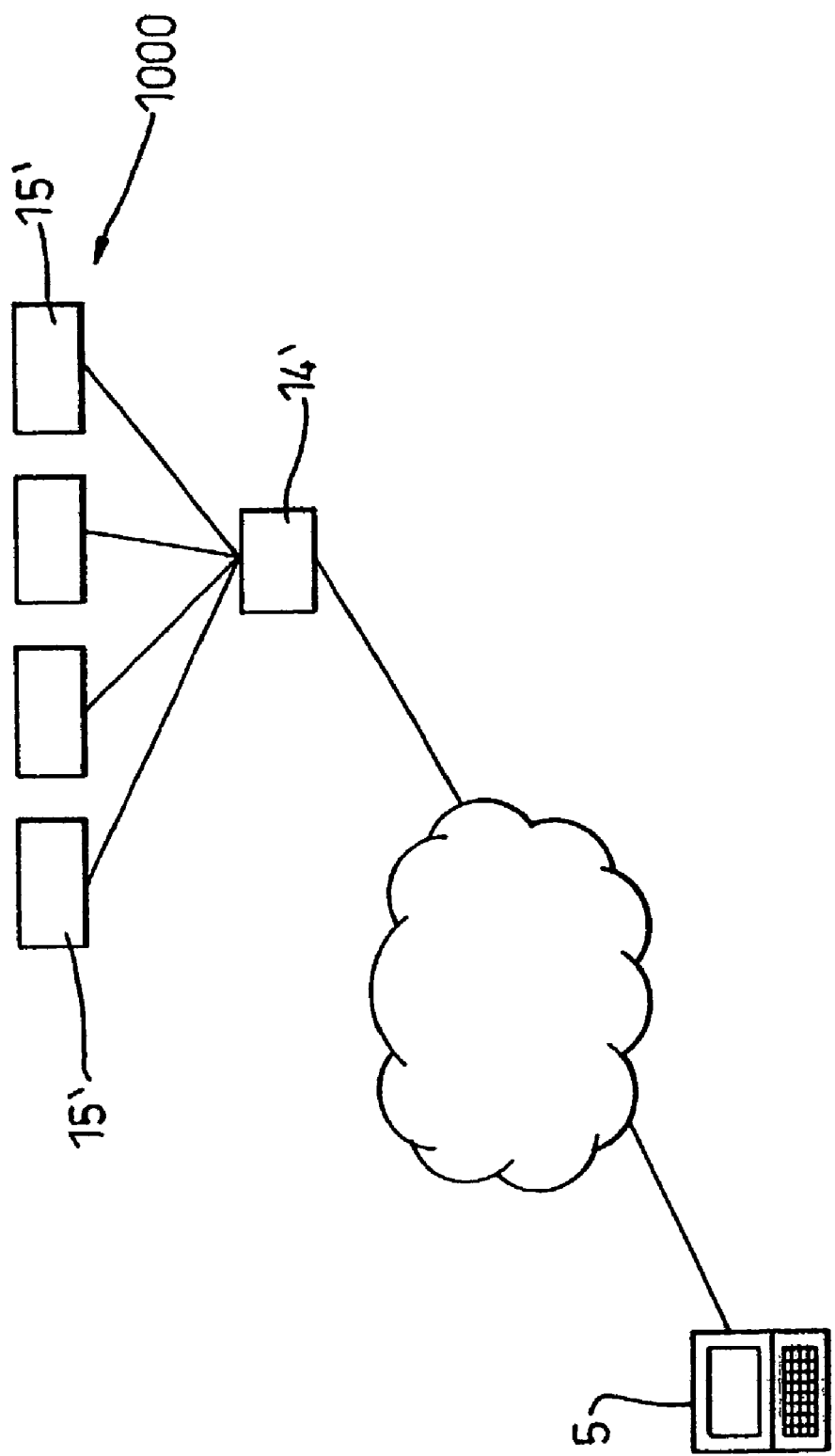
FIG. 10 is a schematic diagram of a web tier of Resource Servers in accordance with one aspect of the present invention.

FIG. 10 shows a new web tier, referenced 1000, with resource servers 15' and a demand director 14', as discussed, with different resources of the same kind on the web tier servers 15', and the demand director having a "map" of where to find requested resources.

It will be appreciated that it is new in a web tier of an Application Service Provider to have a demand director know where different resources are non-homogeneously distributed over a plurality of web tier servers, each of which has the same type of resource available for serving (e.g. videos, audio, data records, streamed media products), but which have different resource content, all accessible to a user by inputting the same www address. This model is more flexible than the previously sacrosanct "all content-servers have the same content" model when it comes to expanding the available resources/content (e.g. increasing the number of videos). It is not necessary to modify existing web tier servers in order to add another with different content. However, it may be desirable to do so to remove unwanted content from either being available for serving out—e.g. by stopping running the software necessary to serve out that unwanted resource, or removing it from the available resource database in the demand director, or by deleting or overwriting the resource/content with more desirable content. This avoids an increasing amount of infrequently accessed content/resource—which is wasteful in memory and/or processing capacity of the web tier servers.

It is known to have different web tier servers (accessible by the same address as seen by the user) have different content/resources in the sense of a first web tier server may have one category of resource available for serving (e.g. music) and another may have a different category of resource (e.g. car prices) but there has previously been a prejudice against having dissimilar source-category content/resource on different web tier servers of the same ASP.

There may be a plurality of farms connected to a MAN. Each farm may have a portion of data stored thereupon; the sum of the data stored on the farms may be a library.

FIG. 10 also illustrates, in principle, and in comparison with FIG. 3, using similar reference numerals, how simple the new arrangement is in comparison with the prior art of FIG. 3. The web tier 11, application tier 12, and database tier 13, and their associated switches, have been replaced by the single tier, web tier 1000, and the relatively dumb level 2, 3, 4 switches 14 have been replaced by a demand director, effectively level 7 switch 14'.

This makes it much easier for new companies to set up a web tier. They need to buy some resource servers (which could be practically PC's or PC-like), and buy a demand director (which could also be a PC), install the appropriate control software, and install appropriate resources (e.g. videos). This is much easier, and cheaper, than establishing the complex and expensive infrastructure of FIG. 3. An ASP could now be set up in a garage provided appropriate telecoms to the www were available.

It will be appreciated that in practice it may be desirable to build in some redundancy to the demand director: perhaps have more than one demand director, with one acting as a slave to the other until the master develops a fault, at which point the slave, with mirror records and functionality, takes over. It may be desirable to have a copy of each resource on at least two resource servers (Raid 1 files in case a resource server develops a fault).

Partitioning the available resources onto different resource servers works well with partitionable content/resources. Each resource/content has an identify distinct from others in its class, and this facilitates partitioning. A large integrated database may be difficult to partition between different resource servers—but perhaps it could be done. Files are readily partitionable. The fact that in video serving the resource is a datastream of content also makes it worthwhile to increase the complexity and overhead of finding the video on the web-tier, because once a user is connected to the video resource they will stay connected for a significant time whilst the video content is streamed to them. If the content were of small size, and the user—web tier server connection time were small, the increase in data content management may not be worthwhile. In a typical example a user may stay connected to a web-tier video steaming server for of the order of 10 minutes, 20 minutes, 30 minutes, 60 minutes, 90 minutes, depending upon the bandwidth of the telecoms and the size of buffer/memory available at the user's end into which the video can be stored. As technology improves this time may be shorter.

The invention works well for read-only access to the resource servers.

Whilst serving of video moves has been the main example it is also envisaged that the invention can have significant uses in other areas. As an example there is e-learning. Streaming a rich media product (e.g. video, audio, multi-media performance, etc.) using the invention can be used for teaching or training. Schools could use the invention, as could companies for corporate training/education. Tailored training packages can be easily added to a website using the present invention— it is easier to change resource content with the present invention. A user could receive an educational video; or an interactive session with streamed rich media coming to him (e.g. video clips, pictures, questions, forms, music, games, etc.); or a non-interactive, read-only, session with the above. In a structured learning programme the ASP could make different modules available at different times (e.g. add more complex/ higher level training after more basic training). The speed and ease at which served out data content can be changed could be very useful.

There now follows a consideration in more detail of how the serving out of videos may be implemented in a Metropolitan Area Network (MAN).

Figure 11:
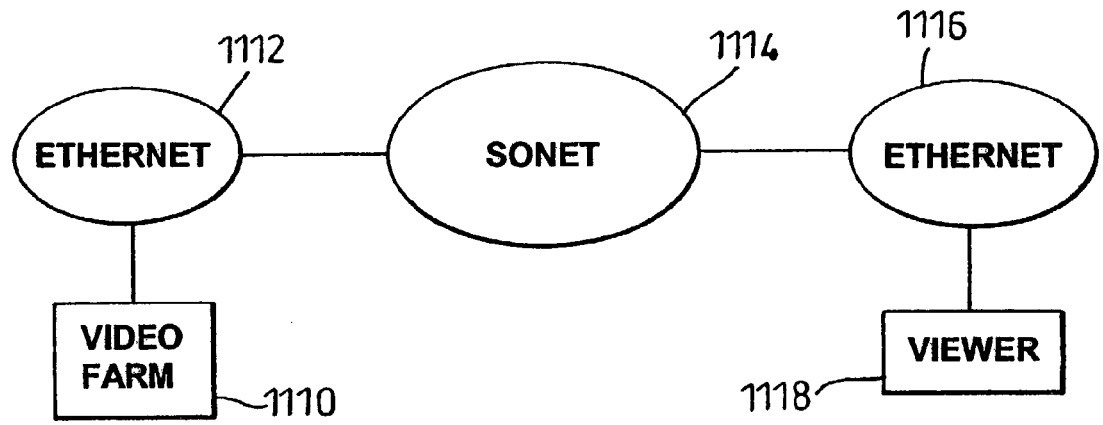
FIG. 11 is a schematic representation of a prior art long haul video serving arrangement.

Referring now to FIG. 11 which shows a prior art arrangement, a long haul video serving arrangement comprises a video farm 1110, a server local area network (LAN) 1112, typically an Ethernet, long haul infrastructure 1114 typically a switched frame relay system, e.g. using ATM, such as SONET, a client LAN 1116 and a client machine 1118, or user 1118.

The client machine 1118 issues a request for a video stored on the video farm 1110. This request is passed over the client LAN 1116, the long haul infrastructure 1116, the server LAN 1112 to the video farm 1110 where the request is serviced, i.e. the requested video file is accessed. The file is transmitted from the video farm 1110 via the server LAN 1112 to the long haul infrastructure 1114 where it is placed into cells for transmission via the fast frame switched network to the client LAN 1116. The transmitted data is reassembled at the interface between the infrastructure 1114 and the LAN 1116. The client views the video on the client machine 1118.

This arrangement has the problem that the long haul infrastructure 1114 is costly to install and maintain. Also the cellularisation of the data introduces a point at which transcription errors can occur or data be lost.

Typically, long haul networks typically consist of networks that are owned by telecommunication carriers. Data passes between these carriers' networks through peering relationships that are not actively managed and hence can cause quality issues such as packet loss.

Figure 12:
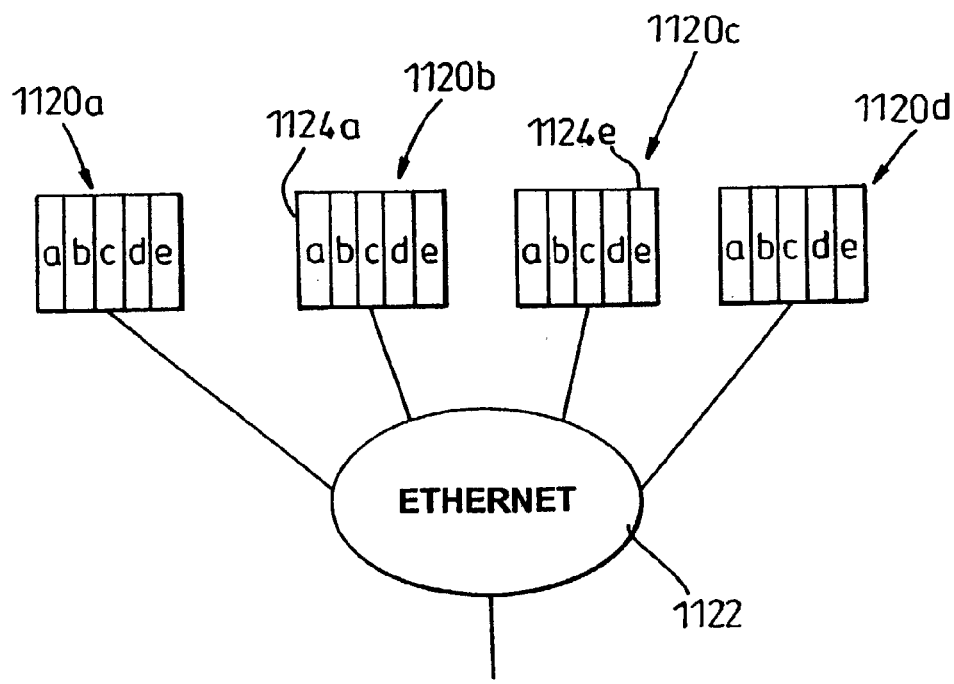
FIG. 12 is a schematic representation of a prior art Ethernet enabled video serving arrangement.

Referring now to FIG. 12, another prior art arrangement, a number of video servers 1120a-d (resource servers) are connected to a LAN 1122, typically an Ethernet. All of the servers 1120a-d have the same video content 1124a-e thereupon (in the prior art) and there is no awareness of load being placed upon any single server or file. This is the current nature of video serving on LAN's, metropolitan area networks (MAN) and the Internet; massive over-provision of capacity in order to ensure the availability of data to a client.

Figure 13:
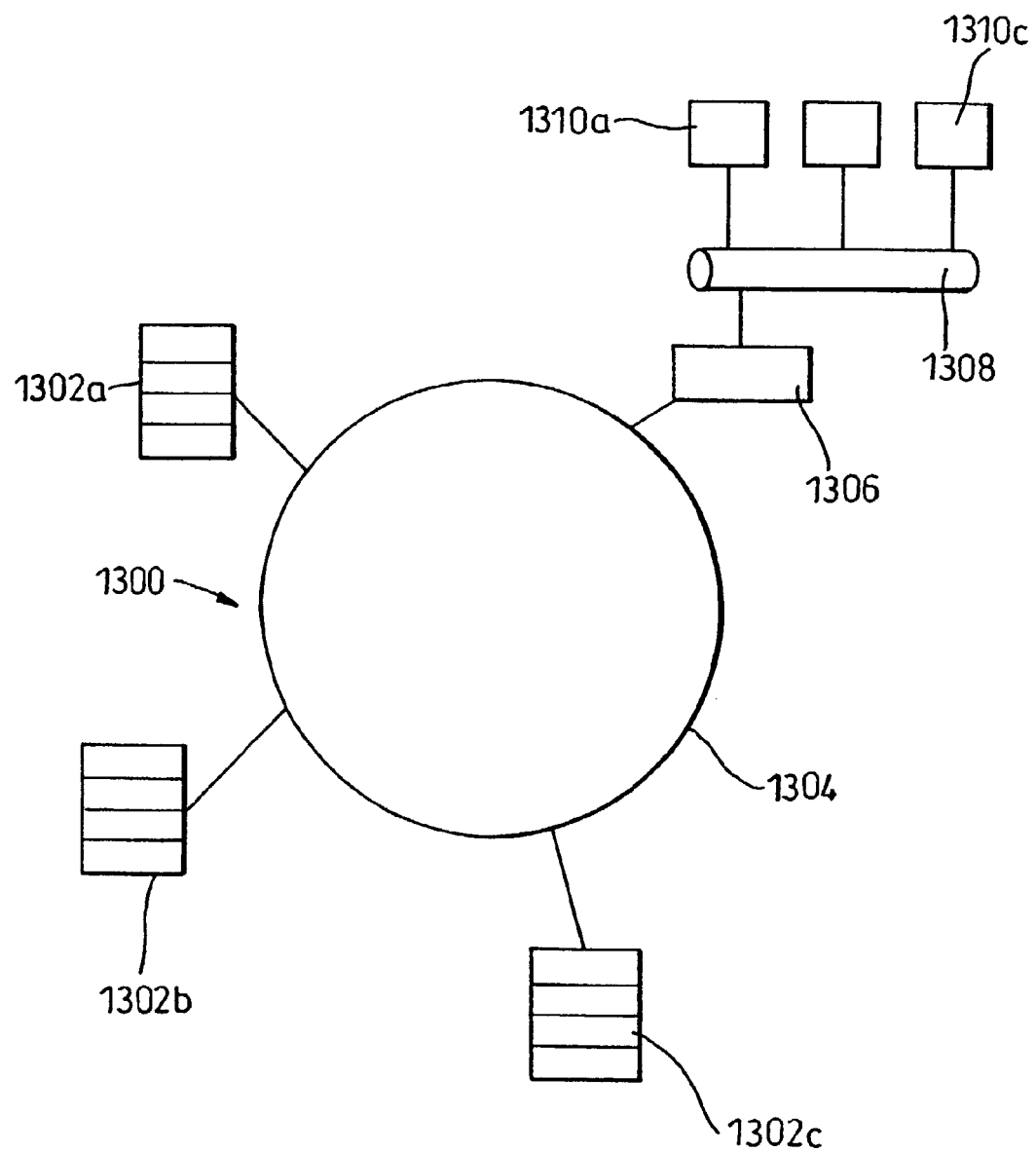
FIG. 13 is a schematic representation of an embodiment of a video serving arrangement according to an aspect of the present invention.

Referring now to FIG. 13, an embodiment of the present invention, a federated video serving arrangement 1300 comprises a plurality of distributed video servers, 1302a-c, connected to a MAN 1304, a gateway 1306 to the MAN 304 which is connected to a LAN 1308 having client workstations (users) 1310a-c attached thereto.

A user on one of the workstations 1310b requests a video. The request is transmitted over the LAN 1308, typically an Ethernet, to the MAN 1304 via the gateway 1306. The MAN 1304, which is also typically an Ethernet, has the distributed video servers 1302a-c connected thereto. One of the servers 1302b acts as a master server, or demand director server, and the request for the video is forwarded by the gateway to this master demand director server 1302b.

Figure 14:
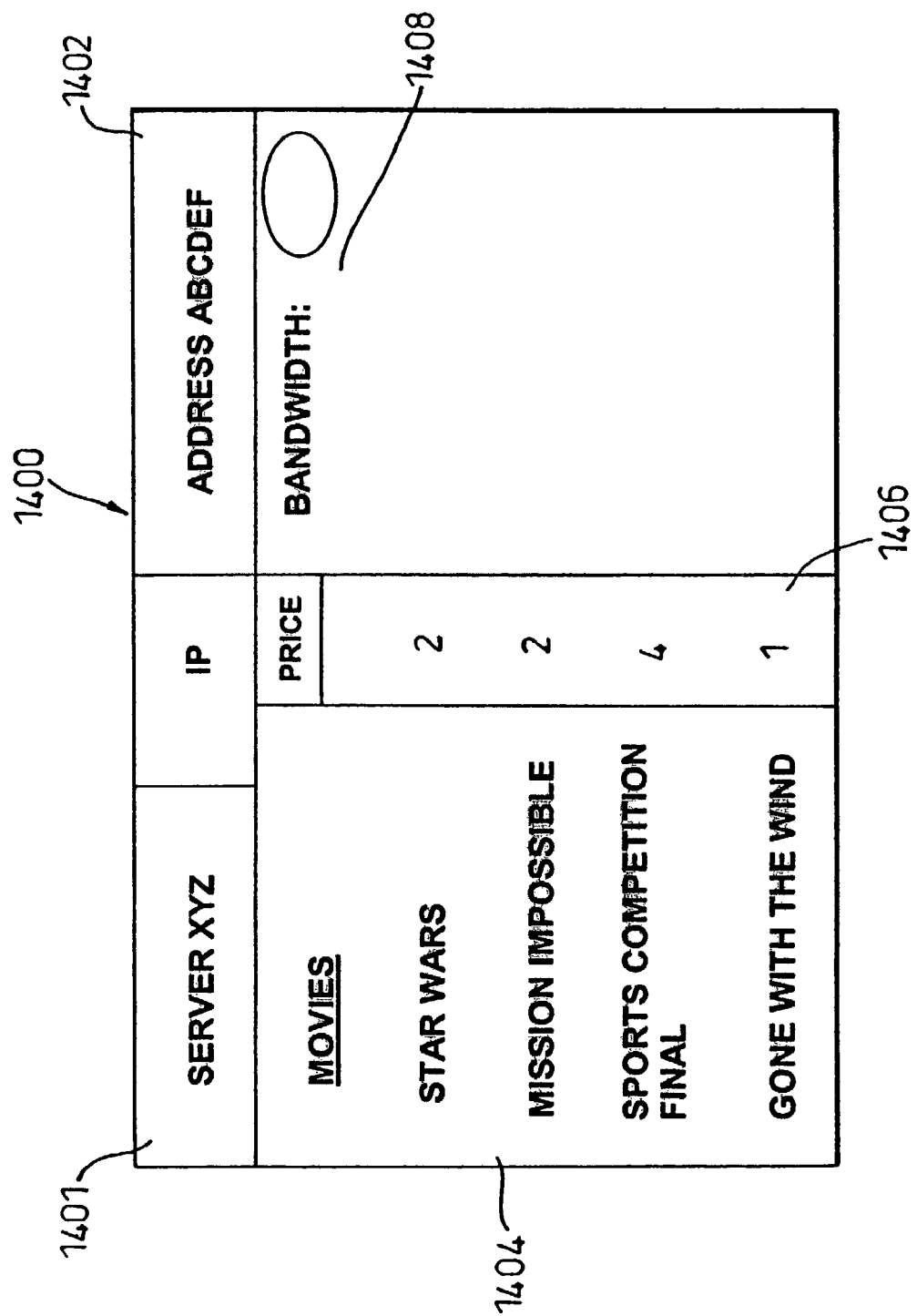
FIG. 14 is a representation of a routing/pricing table according to an aspect of the present invention.

The demand director master server 1302b stores a table 1400, as shown in FIG. 14, having entries relating to a resource server identifier 1401 a network address 1402 associated with each resource server, typically an Internet protocol (IP) address, each resource server's data content 1404, pricing information for each data file 1406, and the current bandwidth usage 1408 associated with each resource server. The demand director master server 1302b interrogates the table 1400 in order to ascertain which resource server 1302a-c is best placed to service a request for data.

The resource servers 1302a-c do not necessarily have the same data content upon each of them. Indeed, it is usual that each server 1302a-c will have at least partially dissimilar content to any other of the servers in order to maximise the data content available over the MAN. In many instances different servers will have wholly dissimilar content thereupon, or at least substantially so. The MAN will typically cover a conurbation and each of the resource servers will usually be situated in a separate building. The building is typically a multiple occupancy dwelling, such as a condominium or an apartment building. Alternatively, the building may be a service provider's office or a designated server building.

The demand director master server 1302b and the 'slave' servers 1302ac (resource servers) use an Internet video streaming protocol (IVSP), that will be detailed hereinafter, in order to monitor the usage and manage the data content distributed over the servers 1302a-c.

The master server 1302b ascertains which of the servers 1302a-c is best placed to service the demand and the video data is transmitted via the MAN and Ethernet to the client machine 1118 using a packet based transmission protocol such as, for example, carrier sense multiple access with collision detection (CSMA/CD) or user datagram protocol (UDP).

The master server 1304b updates the table 1400 in order to account for the request being serviced should a new request for data be made. The table 1400 is updated using the protocol that is described hereinafter.

Should the master server 1302b fail or become disconnected from the MAN 1304 the slave servers 1302a,c will detect this, as they will not receive a reply to a request or response (that they periodically send out), and the first of the slave servers 1302a to detect the failure of the master server 1302b will assume the role of master, demand director, server. The new master, demand director, server 1302a builds a table that is analogous to that held by the failed master server 1302b by interrogating the remaining servers, in this example there is only the one remaining server 1302c although there may be a plurality of other slave, resource-providing, servers.

The master server 1306b can act as a centralised billing unit that correlates a clients access to data with the cost of the data and generates a bill. The bill can be either sent to the client via E-mail or conventional mail, deducted directly from a client's bank account, or added to the user's service provider's, or cable operator's, bill.

For example, a client's bill may be made up of 20% access to server A, 5% to server B and 75% to server C. The master server 1306b aggregates this server usages to produce the client's bill.

In order to fulfil the billing role the master server 1306b must log which video data the client accesses, the cost of accessing the data and the clients network address, typically their IP address. If the master server 1306b is to send a bill to the client via conventional mail it must retain the client's address and if it is to deduct the bill directly from an account it must retain the client's bank details.

Figure 15:
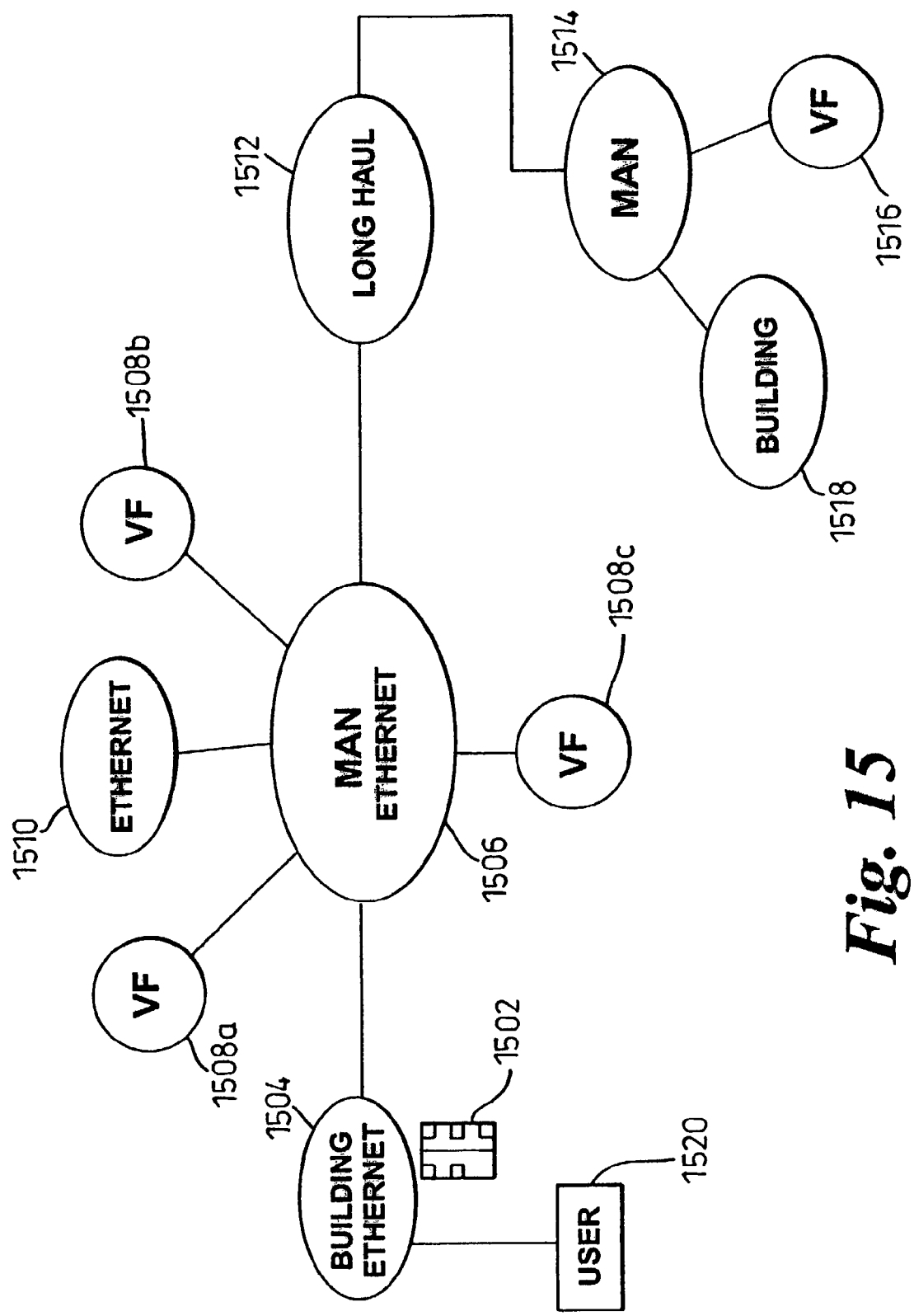
FIG. 15 is a schematic representation of a long haul video serving arrangement incorporating an embodiment of the present invention.

Referring now to FIG. 15, in a second embodiment of a federated video serving arrangement a long haul data transfer arrangement 1500 comprises a building 1502 having its own Ethernet LAN 1504 that is connected to an Ethernet MAN 1506. The MAN 1506 has a plurality of video server farms 1508a-c, as described hereinbefore, and another Ethernet LAN 1510 connected thereto. The MAN 1506 is also connected to a long haul digital network 1512, for example SONET, a synchronous digital hierarchy (SDH) network or a frame based fast packet-switched network typically based on asynchronous transfer mode (ATM). A second Ethernet MAN 514 is also connected to the long haul network 1512 and has a video server farm 1516 and a building Ethernet 1518 connected thereto.

A user 1520, located in the building 1502 requests a video. This request is passed-via the building LAN 1504 onto the MAN 1506. The request will either be addressed to one of the farms 1508a-c or it will circulate about the MAN 1506 until it identifies a video farm 1508b which is capable of serving out the desired video. Once the request is received by the farm 1508b the master server within the farm 1508b consults the table 1400 to ascertain which server has the requested file and the available bandwidths to service the request.

Additionally, the table 1400 holds details of the data content stored upon servers of the other farms 1508a,c connected to the MAN 1506, it may also retain the details of the data content stored on the server if the video server farm 1516. Thus, if necessary, the request can be forwarded to the video server farm 1516 via the long haul digital network 1512 and the requested video can be served to the user 1520 using both MANs 1506, 1514, the long haul digital network 1512 and thus to LAN 504.

Conversely, should a user on the building Ethernet 1518 request a video that is present in one of the server farms 1508a-c this can be served in a manner similar to that hereinbefore described.

Figure 16:
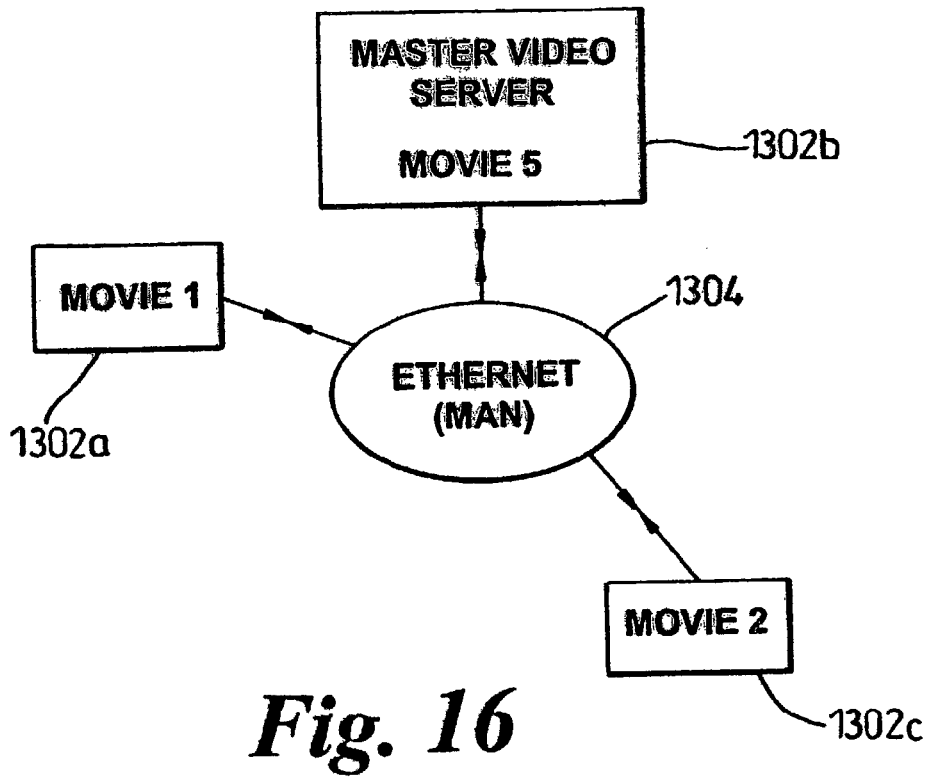
FIG. 16 is a schematic representation of the video serving arrangement of FIG. 13 including the 'master'/'slave' video server relationship.
Figure 17:
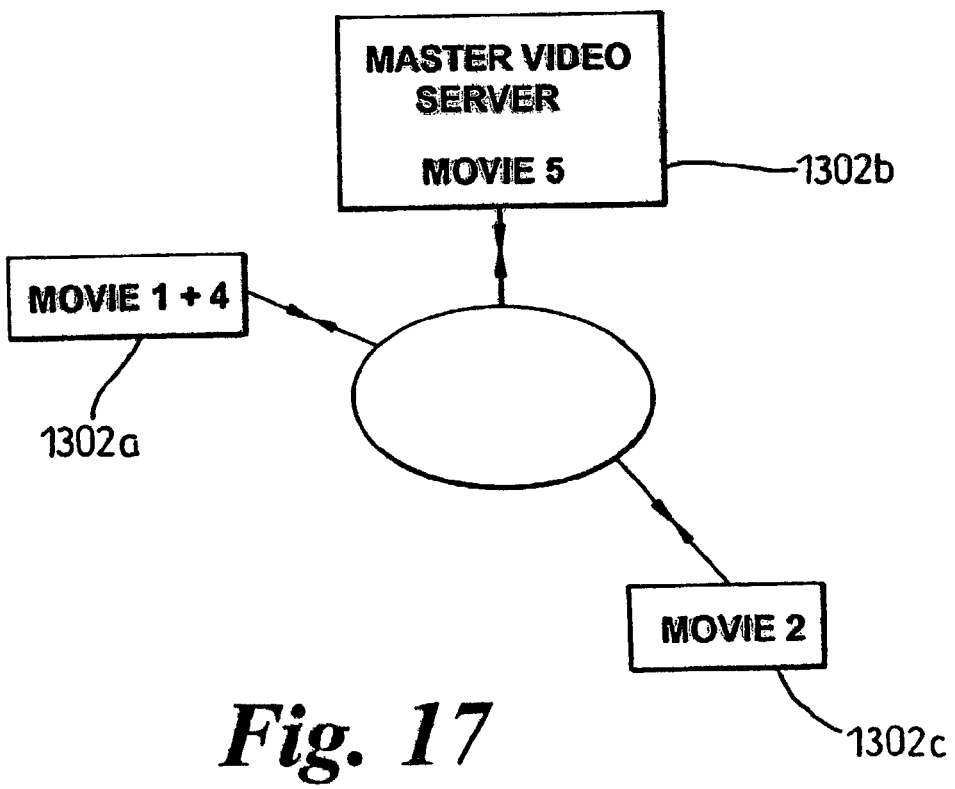
FIG. 17 is a schematic representation of a master-slave video serving arrangement of FIG. 16 with a redistribution of files between servers.
Figure 18:
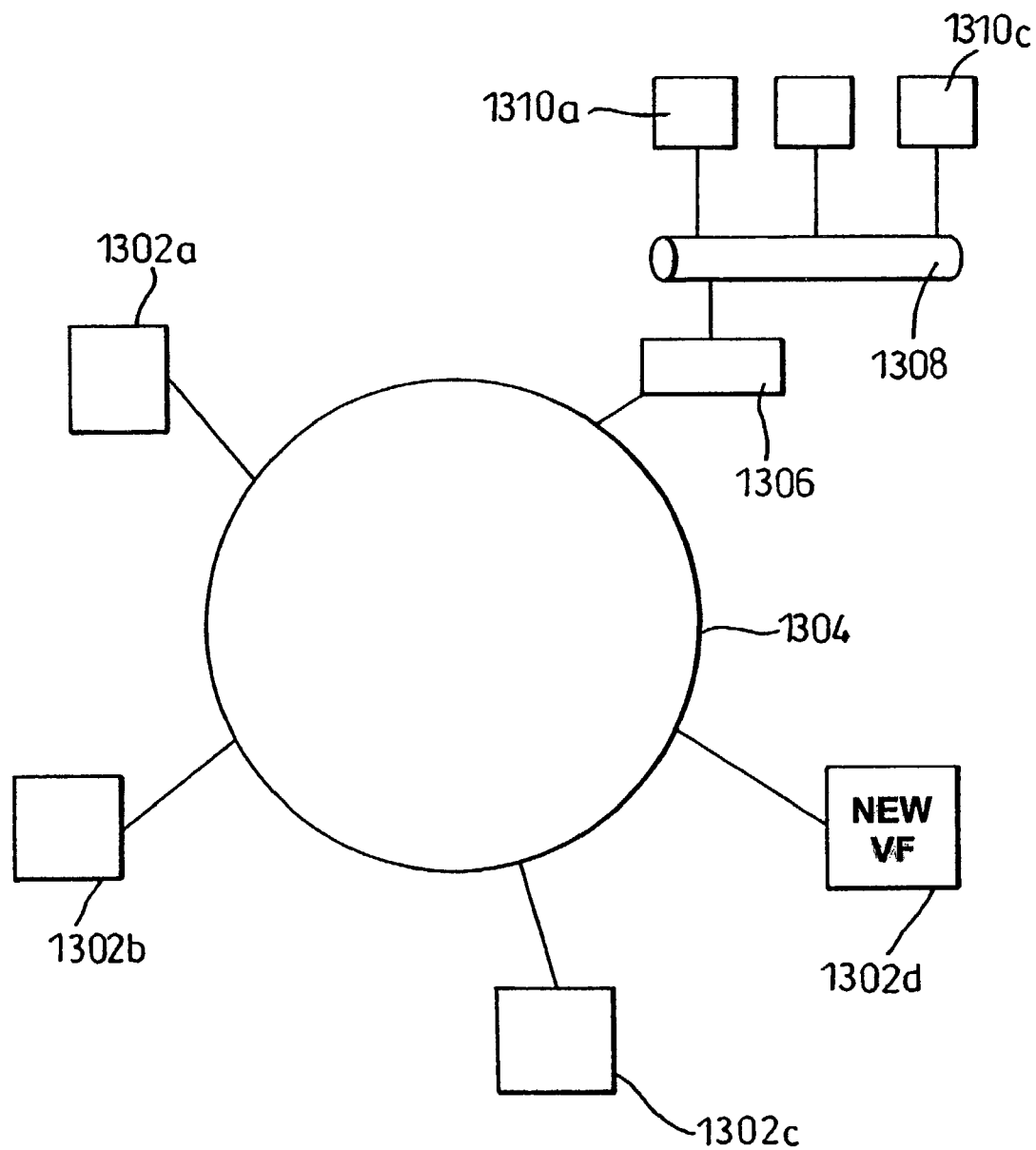
FIG. 18 is a schematic representation of the video serving arrangement of FIG. 13 incorporating an additional data content server.

Referring now to FIGS. 16, 17 and 18, these show federated servers as described in FIG. 13 and similar parts will be accorded similar reference numerals. As described hereinbefore the master server 1304b receives a request from one of the terminals 1310c for a video. The master server 1304b accesses the database 1400 to ascertain if one of the servers 1304a-c has the video data content upon it and if such a server 1304a has spare bandwidth available to stream the video to the terminal 1310c. If the server 1304a has the data content thereupon but does not have the bandwidths available for streaming purposes, e.g. all streaming ports are at or near the capacity, but has bandwidth and or ports available for, for example, file transfer protocol (FTP) transactions or for RSYNC, the master server 1304b instructs the server 1304a to copy the requested data file to another server 1304c within the farm 1300 with available streaming capacity.

Alternatively, typically if there are no servers currently within the farm 1300 with ports available for streaming or no available streaming capacity the master server can connect an additional server 1304d to the farm 1300 and transfer the requested file to the additional server 1340d in order to service the request.

However, if subsequently demand is seen to fall significantly, the data content can be consolidated on the original servers 1304a-c and the additional server 1304d can be returned from the farm 1300 by the master server 1304b.

In order to carry out a suitable method of data management upon the arrangements detailed hereinbefore it is necessary to define a data management protocol.

Figure 19:
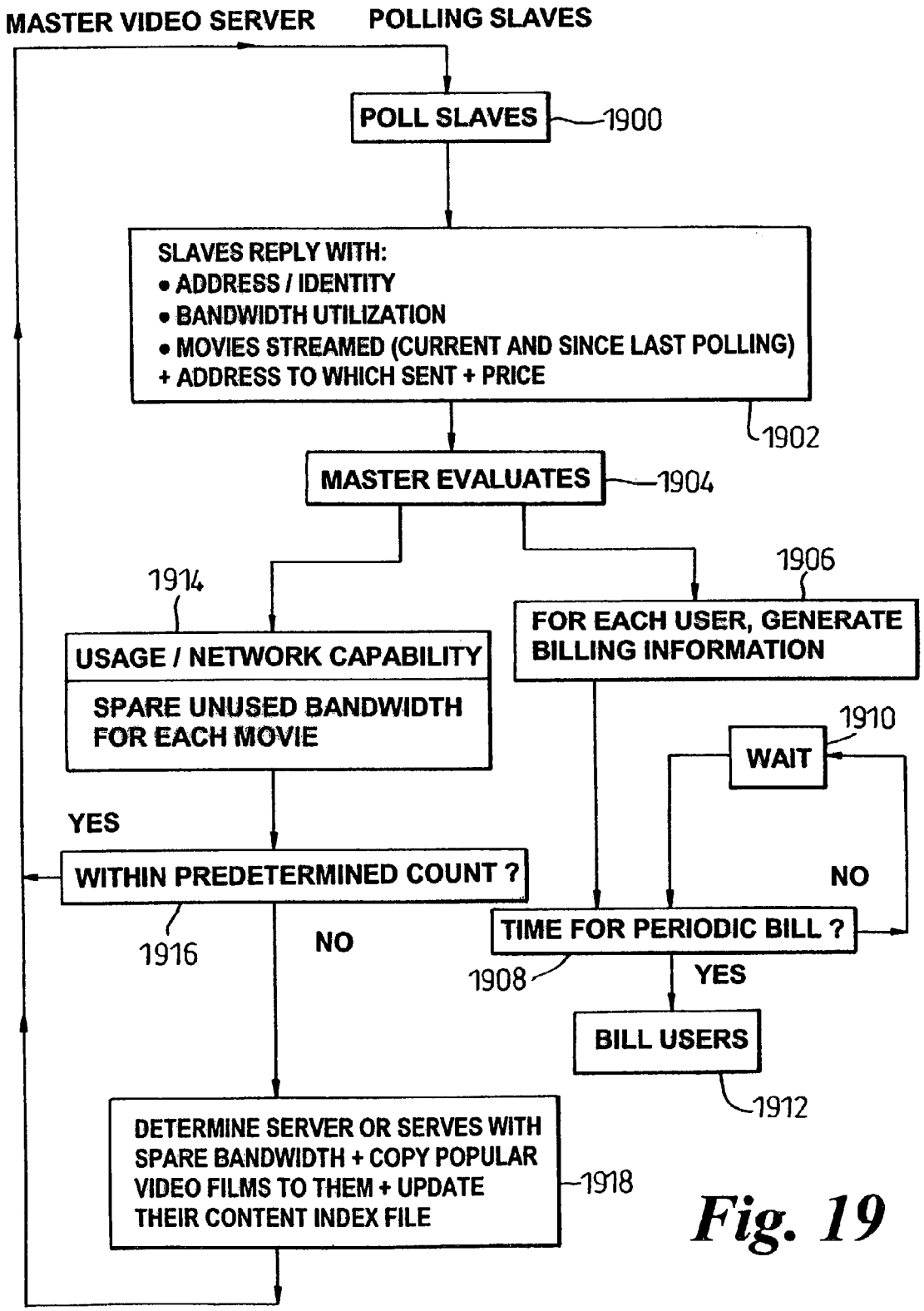
FIG. 19 is a flow chart of a method of data management according to an aspect of the present invention.

Referring now to FIG. 19, the master server (demand director) polls the slave servers (resource servers) periodically, typically every few seconds (Step 1900) in order to ascertain their bandwidth and port utilisation. The slave servers respond with details of their network address, bandwidth utilisation, the videos streamed (both currently and since the last polling), the address to which the streamed movies were sent and their price (Step 1902). If a server streaming data content to a user is polled for billing information the master server checks to see if it has already received the information for that particular streaming of data from a previous polling in order to prevent multiple billing occurring (Step 1903).

The master server evaluates the responses from the slave servers (Step 1904) and generates billing information for each user (Step 1906). The master server then checks to see if it is time to generate the periodic bill for the user (Step 1908). If it is not time to issue the bill the master server waits a set time, typically a few days, (Step 1910) before again checking to see if it is time to bill. If it is time to issue the bill to the user the master server generates an aggregate bill for the user for their data access wherever upon the network it originated and issues the bill (Step 1912).

In parallel with the billing function the master server evaluates the bandwidth usage and capabilities of each of the servers, i.e. which servers have spare ports and bandwidth to output further videos (Step 1914). The master server determines whether the usage of each of the servers, and possibly even each of the ports of IO devices of each server, are within a predetermined limit. (Step 1916). If the usage is within the predetermined limit the master server returns to polling the slave servers. Alternatively or additionally each server may evaluate its own bandwidth usage and capability to serve out.

Should the usage fall outside of the predetermined limit the master server determines which server or servers have an appropriate port, or ports, and spare bandwidth to service the required file types and copies the most heavily used video data file to a server or server with the appropriate port and spare bandwidth (Step 1918).

Once the master server has received an acknowledgement that the data has been transferred to the appropriate slave server (content server) and has updated the database of distribution of content and network address of content servers the master server returns to polling the slave servers.

Figure 20:
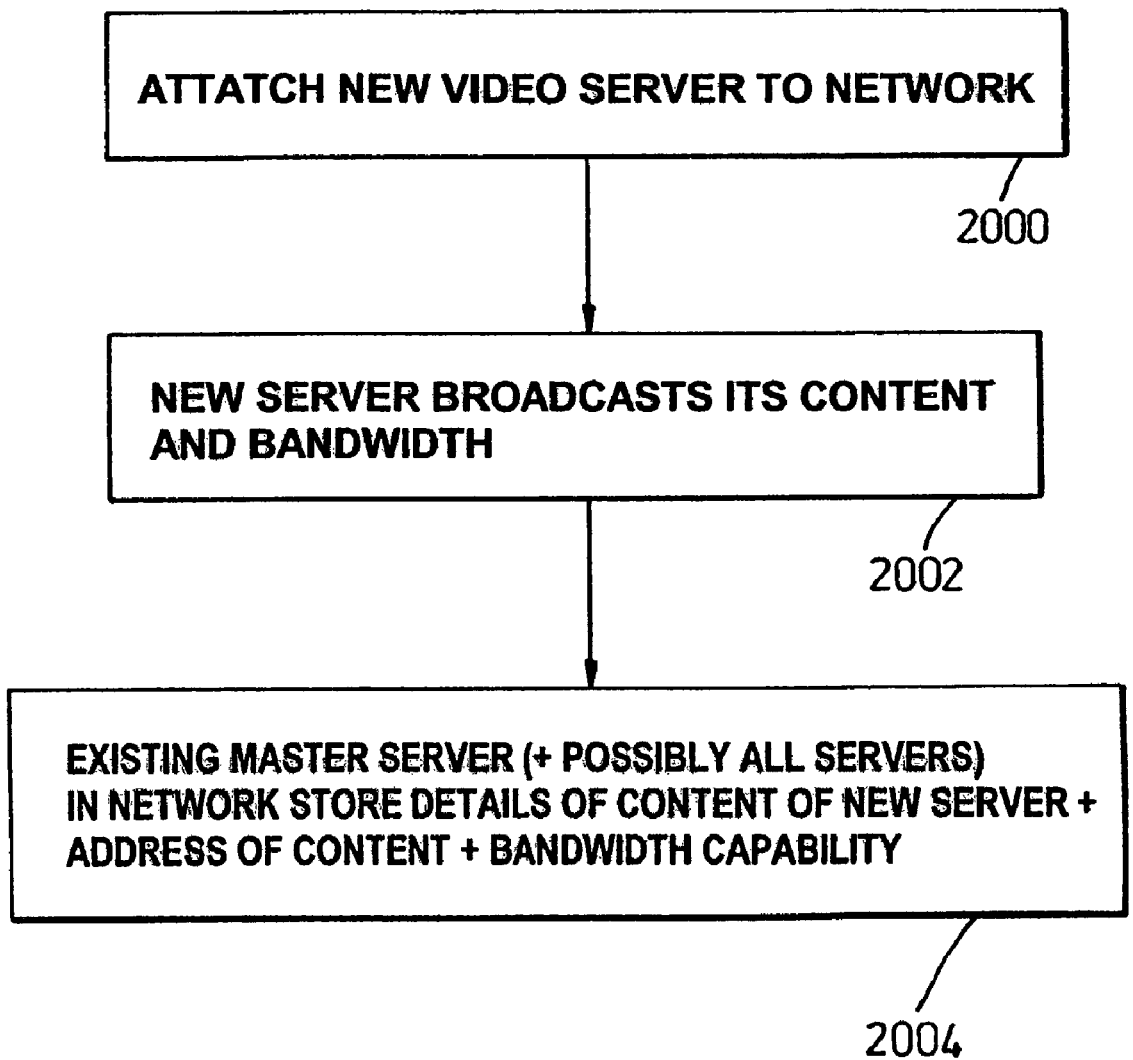
FIG. 20 is a flow chart of a functional step according to at least part of an aspect of the present invention.

One command associated with such an Internet video streaming protocol (IVSP) is a "joining" command (IVSP-OP-JOIN) in which an additional server is added to a server farm. Referring to FIG. 20 IVSP-OP-JOIN comprises connecting a video content dataserver to the network, (Step 2000). Once connected to the network the new video server broadcasts its data content and bandwidth available for streaming, and typically also other types of data transfer, (Step 2002) in order that the master server can capture them and add them to the database that retains details of which network address has which data content and available bandwidth (Step 2004). It is possible that servers other than the master server may also retain such tables and they too will auto-update on receiving the new video servers network address, data content and available bandwidths.

As server bandwidth usage increases it is necessary to compensate for this for example by starting up additional application servers software on existing video data content servers, migrating content between video data content servers or connecting new video servers to the video server farm.

Figure 21:
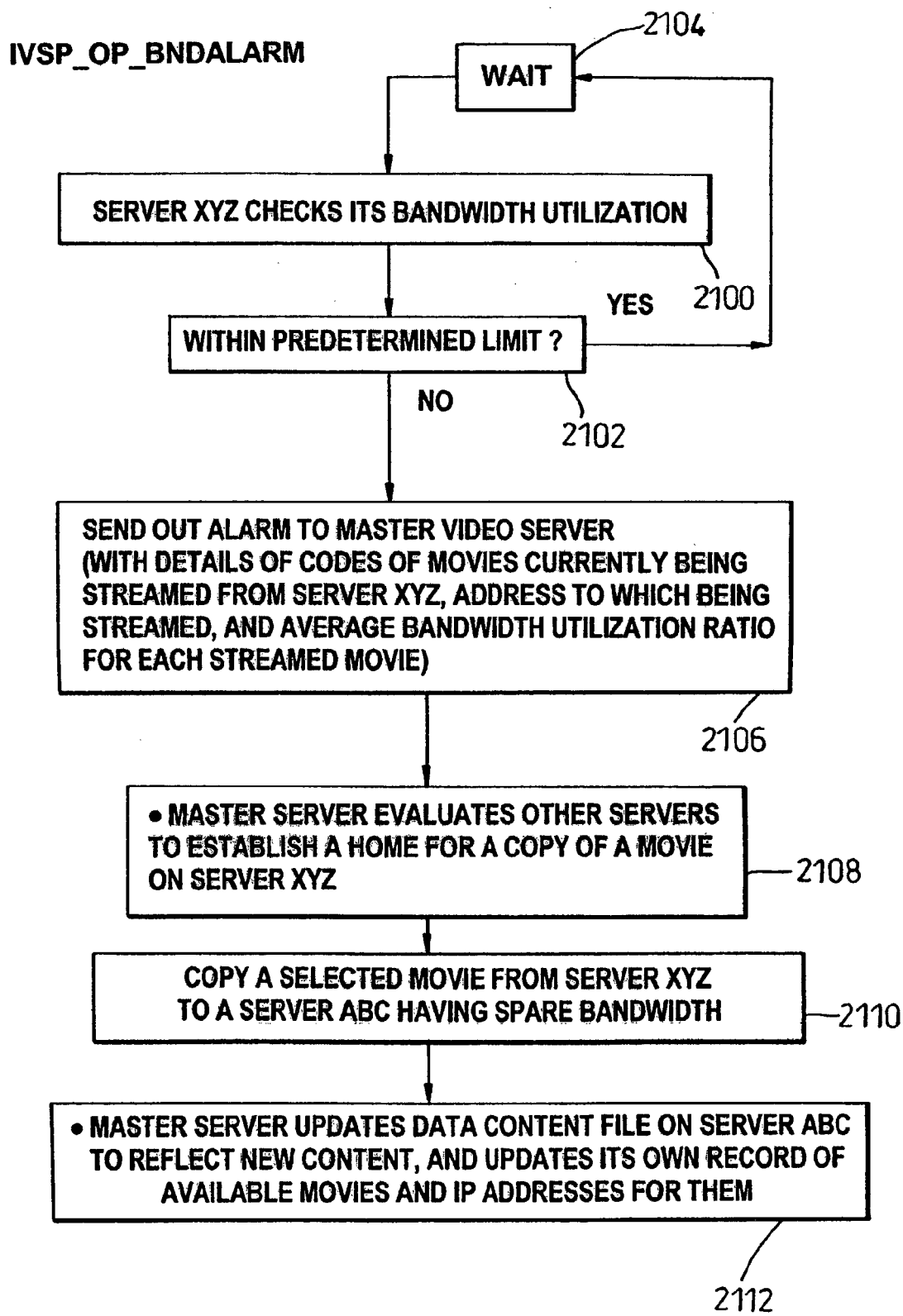
FIG. 21 is a flowchart of a yet further functional step according to at least part of an aspect of the present invention.

This requires a trigger, or alarm, command (IVSP-OP-BNDALARM). IVSP-OP-BNDALARM, shown in FIG. 21, comprises a server monitoring either its own or another servers bandwidth utilisation (Step 2100). The server checks to see if the bandwidth utilisation is within a predetermined threshold limit (Step 2102). If the bandwidth utilisation is within the threshold limit the server waits for a period (Step 2104), typically a few minutes before checking the servers bandwidth utilisation again. Waiting a few minutes between checking bandwidth utilisation prevents the network and/or CPU of the servers being swamped with protocol execution and transport.

If this bandwidth utilisation is above the threshold limit indicating high usage, or below the threshold limit possibly indicating a problem with the server, the server sends out an alarm message to the master server (Step 2106). The alarm message will typically include details of the codes of videos currently being streamed from the server, the address to which they are bring streamed, the average bandwidth utilised by each movie being streamed and details of codes of videos in the server that are not being streamed.

The master server accesses the database and evaluates which of the other available servers within the farm is suitable and has spare bandwidth, if any, for serving the data content of the heavily utilised server (Step 2108). The master server facilitates the copying of the data content from to available, suitable server from the heavily utilised server (Step 2110). The master server thus updates the database entries relating to the suitable servers content and the address for the copied data content (Step 2112).

Figure 22:
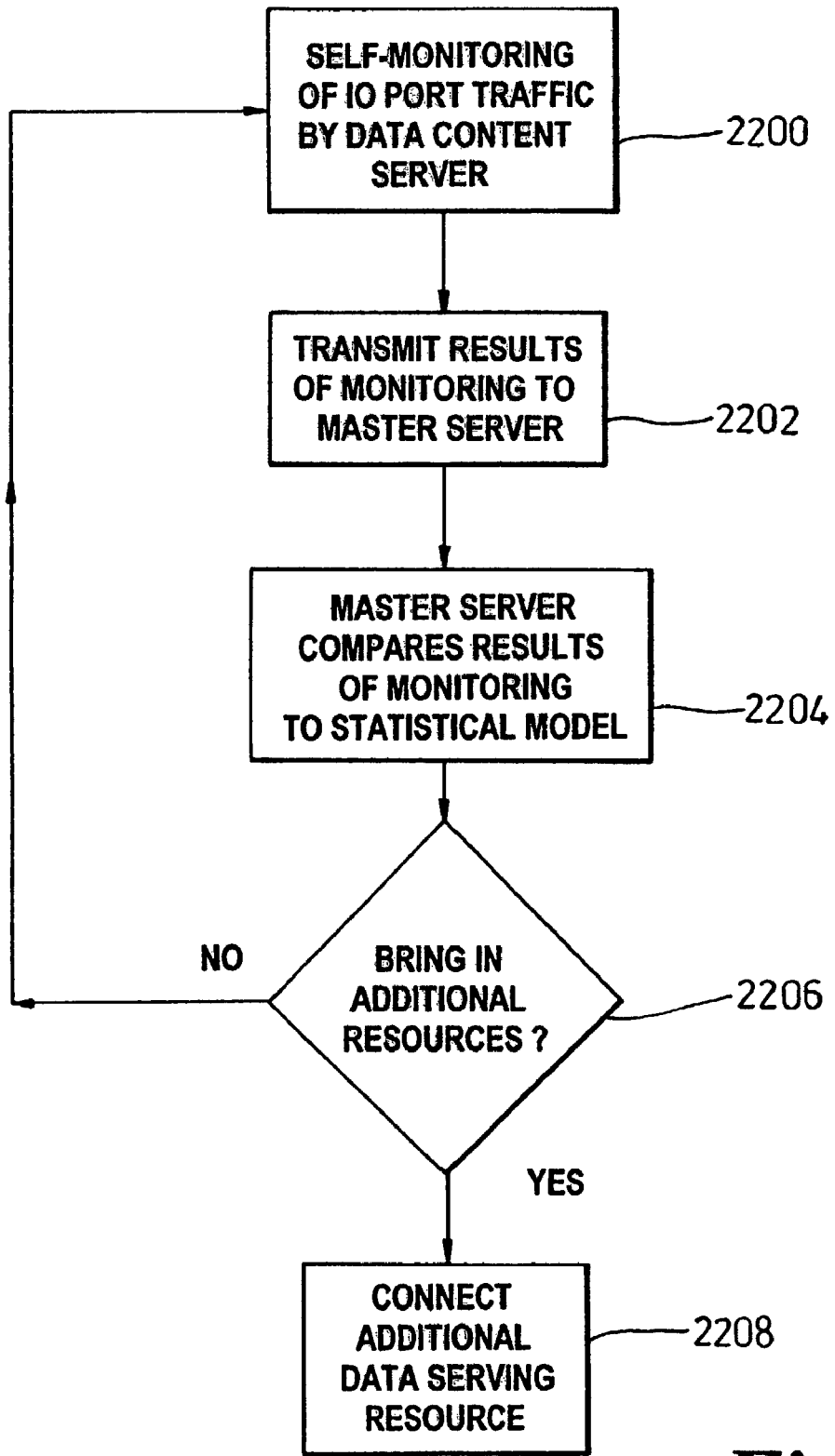
FIG. 22 is a flowchart of a still further step functional step according to at least part of an aspect of the present invention.
Figure 23:
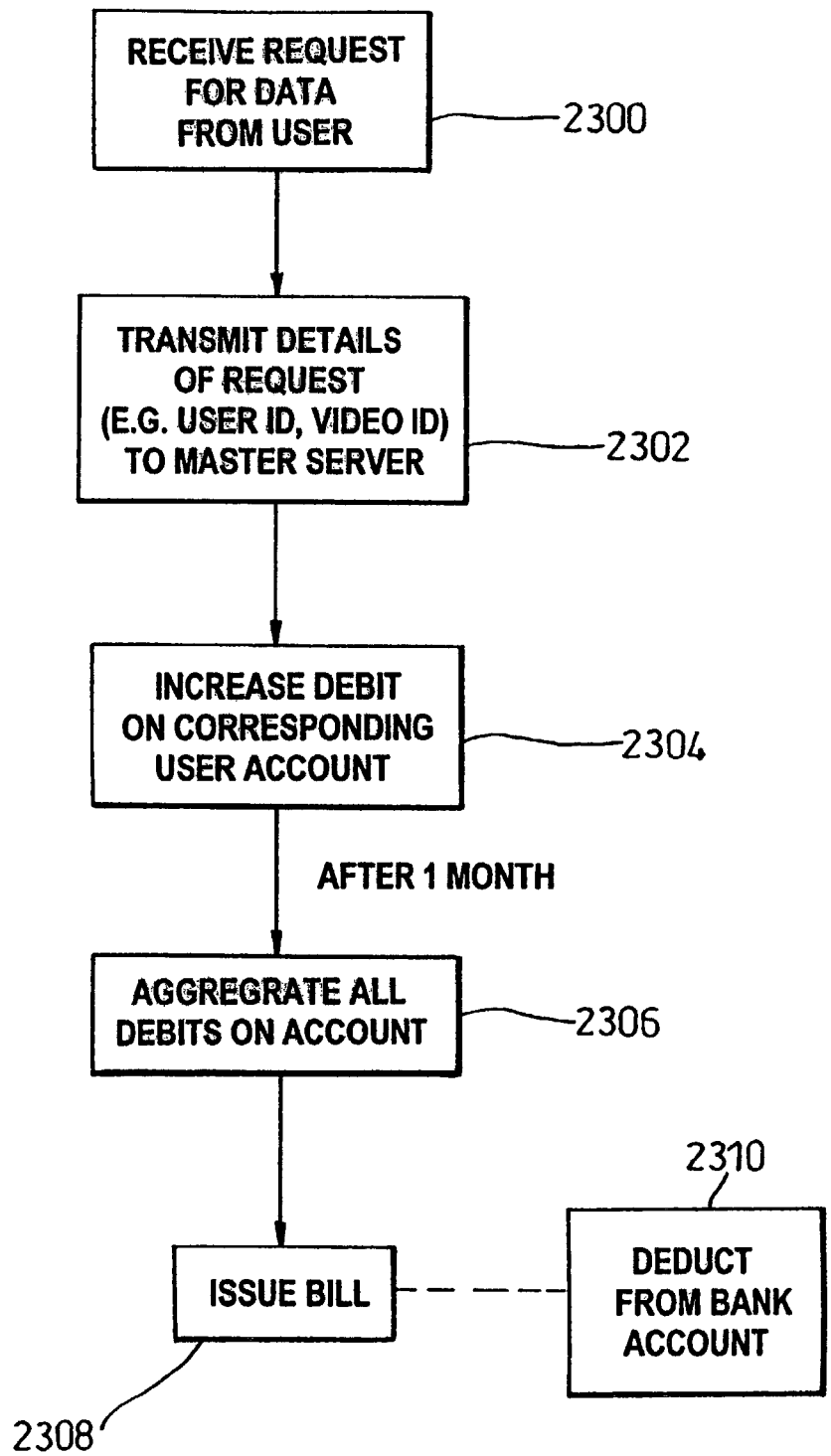
FIG. 23 is a flowchart of a yet still further step functional step according to at least part of an aspect of the present invention.

Referring now to FIG. 22, a message is sent from each server to the master server detailing their respective usages (IVSP-OP-USAGE).

IVSP-OP-USAGE comprises each data server self-monitoring its own input output ports traffic (Step 2200). These results are transmitted to the master server (Step 2202) which compares the results to a statistical model of network traffic (Step 2204) in order to determine whether or not to bring in additional data serving resources in the server farm (Step 2206). If there is no need to bring in additional resources the data content server returns to self-monitoring. Should the master server determine that additional data serving resource is required the resource is connected (Step 2208). The additional resource may be either, or both, of server application software or an additional data content server.

In order to produce an aggregated bill for a user it is necessary for the master server to be aware of what data content is accessed from the slave servers by the user therefore a message must be transmitted to the master server each time a user accesses the data (IVSP_OP_BILL).

IVSP_OP_BILL comprises the data content server receiving a request for data from a user (Step 2300). A message containing details of the request are transmitted, via the network, to the master server (Step 2302). Typically, the details contained within the message include what video has been requested, or has been streamed, the network address to which they were streamed, a user identifier and the price charged for streaming the video.

Each user of the video farm will have an account which is established via the network, in a manner well known in network business services. The balance of a user account is debited each time the master server receives an access message with a user identifier corresponding to that account (Step 2304). The user account will typically be password protected in order to prevent unauthorised access of files, for example access of 18 certificate videos by minors.

After one month an aggregate bill for all of the data accessed, from whatever source on the network, by a user is produced by the master server (Step 2306) and is sent to the user, either electronically or manually (Step 2308). Although shown as occurring monthly the aggregate billing can occur at any convenient interval, e.g. daily, weekly, fortnightly, etc. If a user gives their consent the master server retains their bank account details and the aggregate bill is deducted directly from their bank account (Step 2310).

There are also message relating to a request for a copy of a video to be sent to a data content server (IVSP_OP_COPY) and acknowledgement of such a request (IVSP_OP_ACK).

IVSP_OP_COPY request payload will typically include details of the video required, the coding format, e.g. MPEG, REAL MEDIA, encoding rates and file size.

IVSP_OP_ACK contains details of whether the server can service the request i.e. whether it has sufficient bandwidth available and whether the server already has a copy of the data resident upon. If the server does not already have a copy of the data resident upon the fact that it requires a copy to be sent to it in order to service the request.

It will be appreciated that whilst the present invention has been described with reference to video data it is equally applicable to any file based data type, for example audio data or computer based training modules, and to non-file based situations.

There may be a counter which is arranged to increment each time data is accessed. The farm may be part of a (Metropolitan area network) MAN. The farm may be situated in a residential building, typically a multiple occupancy dwelling (e.g. block of flats, condominium, office block). The farm may be an element in a video and/or audio rental or pay per view system. The farm may include an automatic billing unit for said rental or pay per view system. The billing unit may be arranged to generate and/or distribute bills to a user of the rental/pay per view system for content that they have accessed.

There now follows a description of another embodiment of the invention, with an emphasis on a monitor server monitoring the available capacity of resource servers and/or traffic levels, and varying the capacity of the network to serve out requested resource in response to the level of demand of the resource in question. The monitor server may be the same server as the demand director server referred to earlier, or it may not be.

Figure 24:
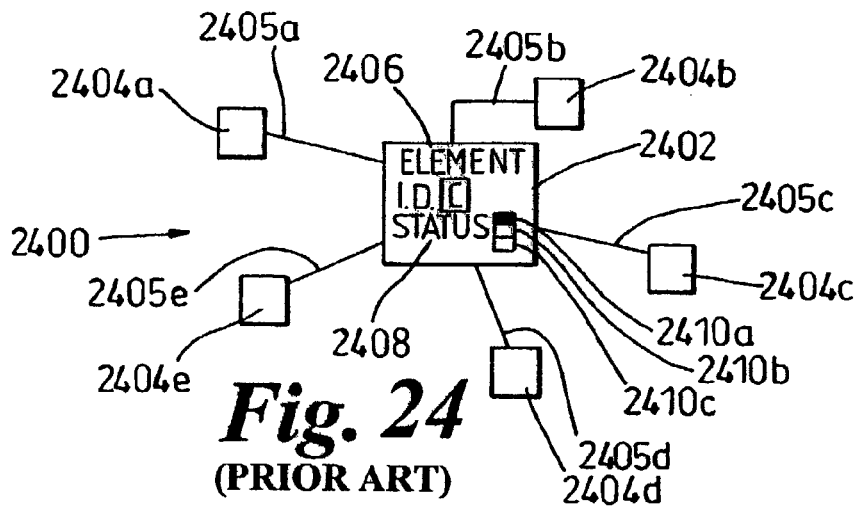
FIG. 24 is a schematic representation of a prior art simple network management protocol (SNMP) network management system.

It will be helpful to discuss the embodiment after a brief discussion of how prior art networks manage demand for resources. FIG. 24 shows a prior art network management system 2400 comprising a management console 2402 and a plurality of network elements 2404a-e. The network element 2404a-e are typically PC's, servers, disc arrays, tape drives and/or printers. The network elements 2404a-e are connected to the management console 2402 via network connections 2405a-e. These connections need not, of course, be directly to the console 2402—so long as the network exists.

The management console 2402 typically displays a network element identifier (I.D) 2406 and its status 2408. The status display 2408 usually takes the form of a series of colour coded screen regions 2410a-c. One of the regions 2410a is highlighted to indicate the status of the network element 2404c whose identifier 2406 is displayed. Typically a red region indicates a faulty condition such as a server failure, a yellow region indicates a warning condition, for example high network traffic and a green region indicates normal operating conditions. In an alternative embodiment the management console may display a map of the network and each network element is displayed in a colour appropriate to its operational status.

The above arrangement is limited in its functionality and does not remedy problems within the network as they arise: rather it alerts a person, the network administrator, to the existence of the problem. Thus, the network still requires a great deal of slow, possibly flawed, human intervention in order to remedy any fault.

Figure 25A:
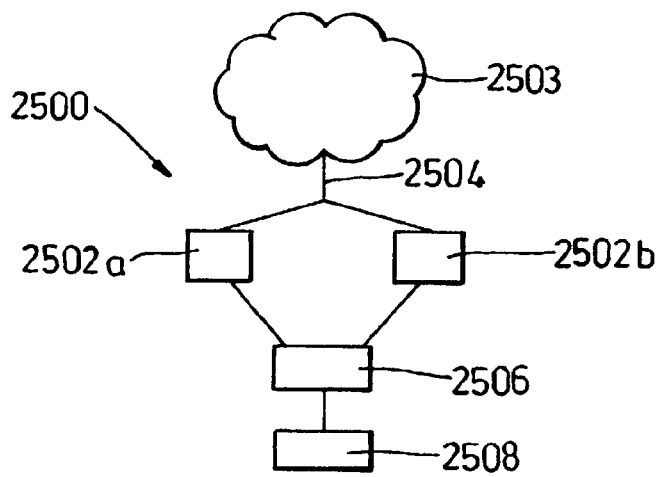
FIGS. 25a and 25b are diagrams of prior art cluster arrangements for data management.

Referring now to FIG. 25a, this shows a prior art shared everything clustered (SEC) server arrangement 2500 in which two servers 2502a,b are connected to a network 2503 via a shared network connection 2504. Both of the servers 2502a,b share a common network switch 2506 that connects them to a common storage device 2508. Any fault of the network connection 2504, the network switch 2506, or the storage device 2508, renders the arrangement 2500 inoperable. This is one of the reasons that clustered server arrangements require expensive, cluster certified components. Whilst increasing fault tolerance for the servers this SEC arrangement does not increase tolerance to faults in the network, storage or switches.

Figure 25B:
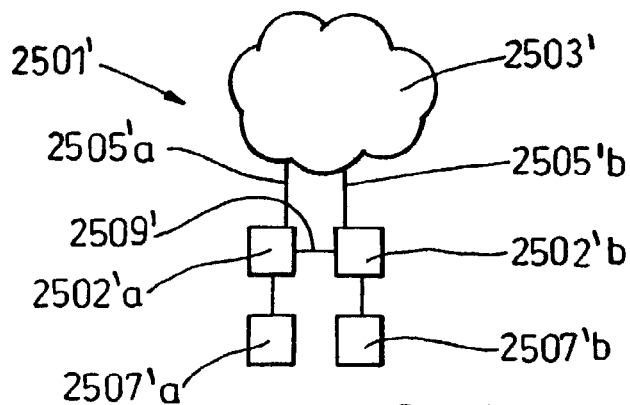

FIG. 25b shows a shared nothing clustered (SNC) server arrangement 2501' in which two servers 2502'a,b are connected to a network 2503' via respective, independent network connections 2505'a,b. Each of the servers 2502'a,b are connected to respective, independent storage devices 2507'a,b that have mirrored data contents. A link 2509' between the servers 2502'a,b enables the servers 2502'a,b to monitor each others operational status. This arrangement requires expensive, cluster certified components and also there is a requirement to replicate infrastructure in this arrangement thereby increasing costs above those of the SEC server arrangements 2500 of FIG. 25a. Additionally, half of the infrastructure and data storage capacity may remain idle at any one time. Thus, this is a highly inefficient arrangement.

Figure 26:
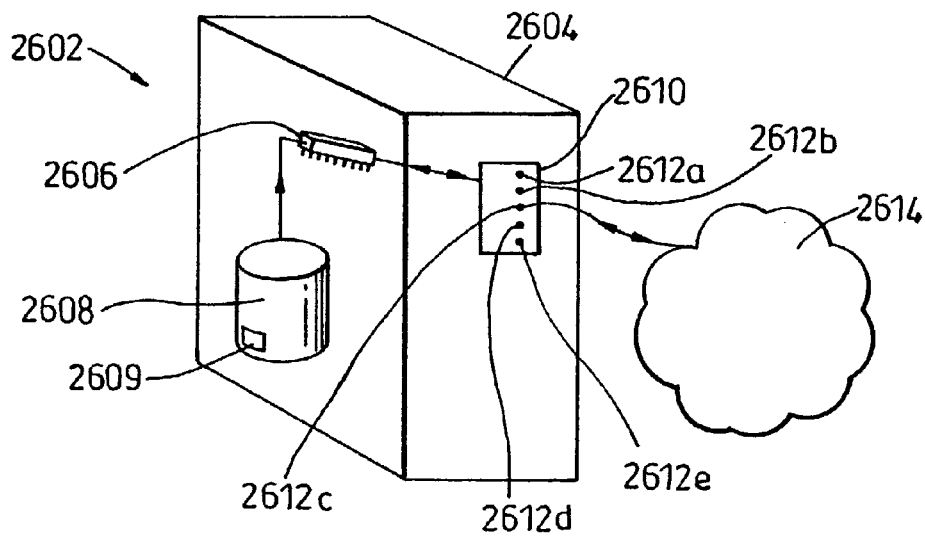
FIG. 26 is a schematic representation of a data management device according to an aspect of the present invention.

Referring now to the new arrangement of FIG. 26, a data content, or resource, server 2602 in accordance with the present invention comprises a housing 2604, a processor 2606, a storage device 2608 and a network interface card (NIC) 2610. The NIC has a plurality of input/output (IO) ports 2612a-e. Typically, the ports 2612a-e is configured to deliver a particular type of data content, or resource, that is stored on the storage device 2608, for example HTTP (hytertext transfer protocol), RTSP (real time streaming protocol) or FTP (file transfer protocol), to a network 2614.

The storage device 2608, which is typically a hard disc, has an NIC monitoring programme 2609 stored upon it that is passed to, and executed by the processor 2606 when running the programme. The processor 2606 interrupts the NIC 2610 at regular intervals, typically every few seconds and samples either or both of the outgoing bitrate or/and the incoming bitrate of the NIC. (Alternatively or additionally the programme may sample metrics previously collected by the operating system). The processor 2606 compares the sampled bitrate to a reference, or threshold, bitrate stored within the programme. This reference bitrate can be varied in accordance with the type of NIC used and is typically a percentage of the ratio of the theoretical/actually deliverable bitrate capacity of the NIC. The interrupt frequency and the reference bitrate are usually set as default settings at the time of production of the program but can be altered by a network administrator.

Should the sampled bitrate exceed, or alternatively fall, below the threshold reference bitrate the processor 2606 executes a pre-programmed action. For example, when the server 2602 is serving video content the server 2602 is capable of serving a certain amount of such requests. The processor 2606 samples the outgoing bitrate of the NIC 2610. As the NIC 2610 approaches its saturation level, typically 60-75% of the theoretical/actual deliverable ratio, the reference bitrate threshold is passed and the server 2602 copies the content, or resource, that is needed to serve the requested video content to a further server via the network 2614. The content copying is executed in order to maintain the availability of the content (resource) to users who may request it as a later point in time. The processor 2606 then supplies the network address of the further server to load balancing/routing control, e.g. content-location director or tables for the network, which may be held on the server 2602 or elsewhere on the network (e.g. on a demand director server). Alternatively, or additionally, the further server may update the load balancing/routing tables, wherever they may be held.

It will be appreciated that the monitoring performed by monitoring programs need not be NIC usage level monitoring (or not only NIC monitoring), but could also be one or more of: local disc capacity, rate of local disc capacity growth/reduction over past set period (e.g. N seconds), NIC bandwidth growth/reduction over past set period.

Figure 27A:
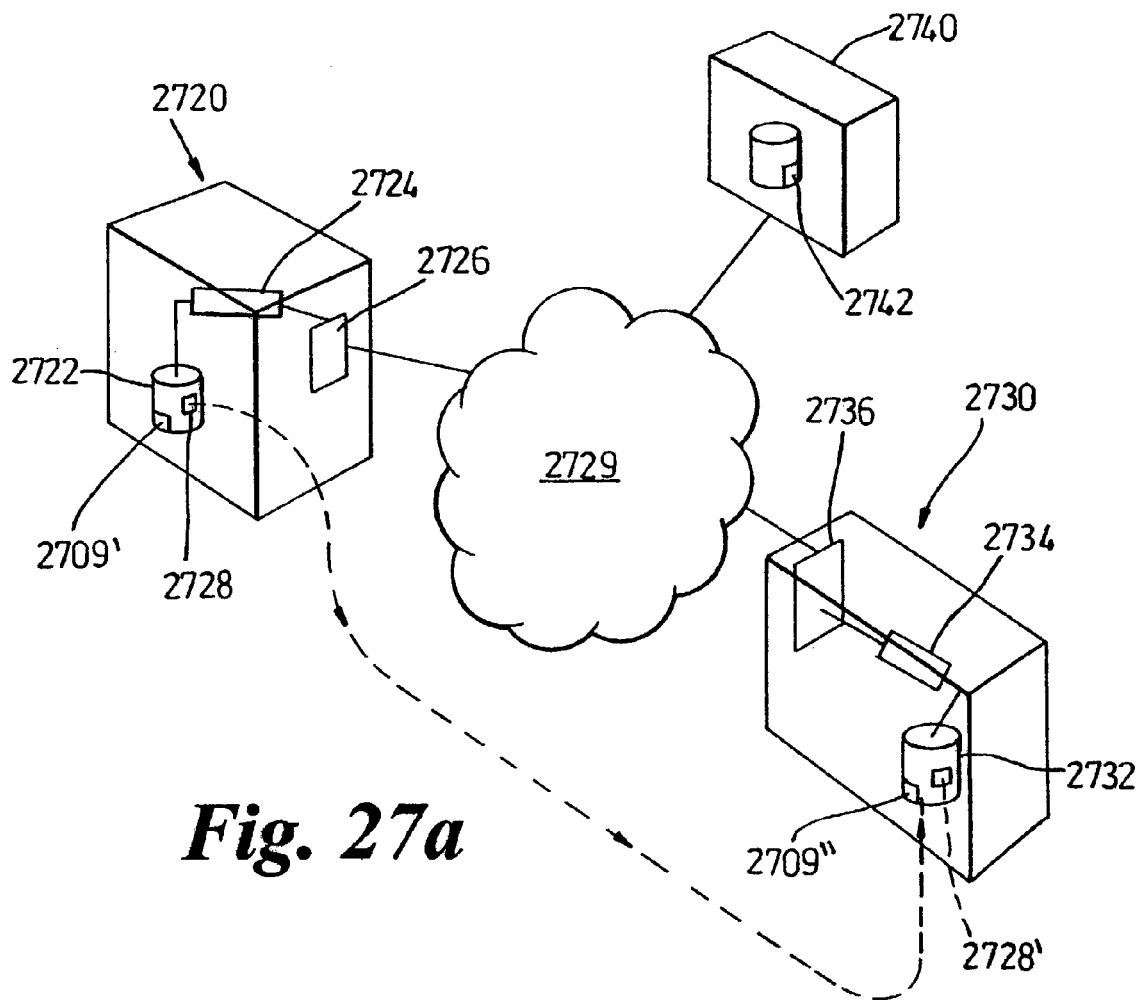
FIGS. 27a and 27b are schematic representations of other examples similar to that of FIG. 26.

As an even more concrete example, see FIG. 27a. This shows a first server 2720 having a hard disc 2722, a processor 2724 and a NIC card 2726, and a second server 2730 network connectable to the first server 2720 via a network 2729, and also having similar components (which have been given similar reference numerals). Server 2720 is running load monitoring software 2709' which notices when demand for a particular application 2728, stored in server 2720 or on network attached storage (NAS) accessed by server 2720, reaches a threshold level. If demand for the application 2728 were to rise above the threshold level the server 2720 would struggle to cope to serve out the application to meet higher levels of demand. The processor 2724 reacts to the demand for application 2728 reaching the threshold level by copying the application 2728 to server 2730, via the network 2729, or just starts it (the application) if the content is there already. Similarly, application software necessary to serve out a video may already reside on a server having the desired video file, in which case the application software can be brought up to serve out the video, or to reduce the load on the server's CPU if the application software is not needed at any particular time. If application software is not available on a server it may need to be telecommunicated to it.

In this example, the server 2720 also updates a routing, directing, or load balancing directory/database 2742 in a director server 2740 attached to network 2729 to inform the director server that application 2728 is now available on both server 2720 and server 2730. Thus, when a request to serve out application 2728 is received by the director server 2740, it now can choose to direct the request to server 2720 or server 2730, depending upon which it believes can serve out the requested application satisfactorily.

The application 2728 could, for example, be a video performance, say purely for example the latest James Bond film. The dynamic generation of extra resource (or application) serving capacity, in real time, without human intervention, allows a network to be dynamically horizontally scaleable. That is to say, simply by attaching extra servers to the network and moving around and/or creating extra copies of requested resource/applications (which need not involve attaching extra servers), it is possible to increase the ability of the network as a whole to serve out particular resources or applications.

It will be appreciated that the threshold, or trigger, level of demand on server 2720 could be one or more of: a certain level of processing power capacity required; a certain level of access of telecommunications channels to serve out the application; a certain level of bandwidth availability in the telecommunications channels. Thus the application may be copied to another server (or run on a further port (logical network address) on the same server) because the processor 2724 cannot cope with too much additional demand, or because the telecommunications network relating to server 2720 is under strain (e.g. NIC and 2726 may be approaching capacity).

It will also be appreciated that although the above discusses copying application 2728 to another server, server 2730, it could be copied or otherwise made available internally of the server 2720 (and any NAS linked to server 2720) so as to increase the capability of the server 2720 to serve out additional application 2728. For example, application 2728 could be originally served out of only one NIC port (in the sense of part of a logical network address), but later, at increased levels of demand for application 2728, it could be served out of two, or more, ports on the NIC of server 2720.

In cases where particular applications, for example data files, are associated with a particular port 2612a the processor can monitor the particular port 2612a and copy the application data to an appropriate port on a further server, i.e. one that is configured to deliver that particular type of data, if the port on the first server is reaching saturation.

The server 2602 may also be configured to spawn an appropriate application programme on the further server (e.g. server 2630) in order to allow the copied data content to be delivered, should the further server not already be configured to deliver the data content. That is to say if the further server already has the software necessary to serve out data content that is copied to it, it is unnecessary to copy operating software, but if it does not have the requisite operating software that will have to be copied as well as the subject matter data content.

The processor 2606 can also compare the sampled bitrate with a lower threshold level below which it is expected that the NIC 2610 bitrate will not drop. Should the sampled bitrate fall below this lower threshold limit the processor 2606 runs a diagnostic code in order to determine if there is a fault, if IO traffic has just decreased, or whether to use a lower serving capacity on that server. If there is a fault the diagnostic code will typically identify the likely fault source(s) and report it (them) to a system administrator.

It is possible, in an alternative embodiment, that the server 2602 may have more than one NIC. In this embodiment the processor can monitor one, some or all of the NIC's. Each NIC may have its own unique threshold limit or some, or all NIC threshold limits may be the same depending upon the types of NIC used.

Figure 27B:
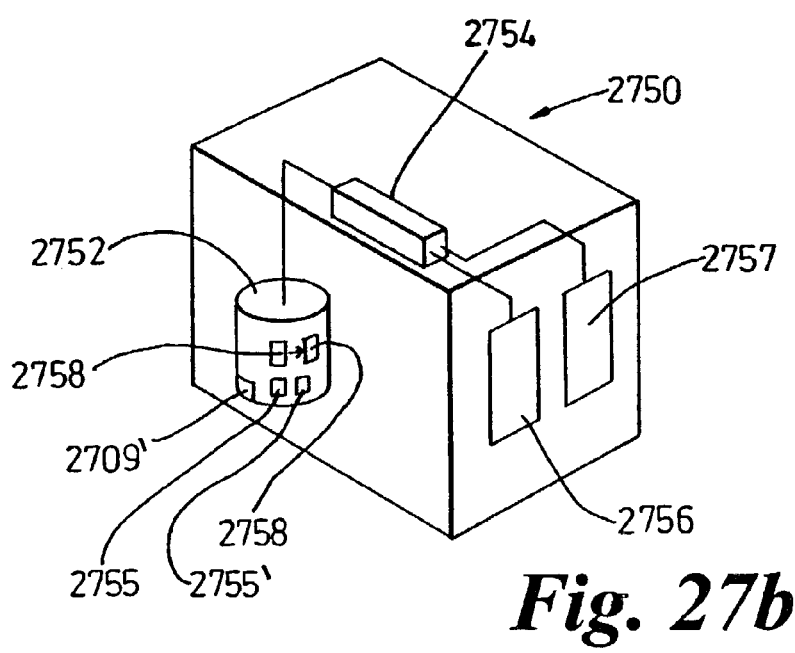

FIG. 27b shows a server 2750 having a hard disc 2752, a processor 2754, a first NIC 2756 and a second NIC 2757. An application 2758, in this case a video movie, resides on the hard disc 2752. Self-monitoring "capacity to serve out" software 2709' is running on server 2758 to monitor when the server is likely to encounter difficulty in serving out application 2758 via original NIC 2756. When a threshold level of demand/serving capacity is reached the software 2709' causes application 2758 to be copied again in the hard drive 2752 and the copy, referenced 2758', is used to serve out the same application 2758, but via the second NIC card 2757. Thus, the server 2750 now has a much greater capacity to serve out the resource that is application 2758 (possibly twice the capacity, or even more, depending upon the bandwidth and processing power allocated to NIC 2757).

FIG. 27b also illustrates the point that the disc drive 2752 does not only have the one application 2758 on it, it has others, only one of which is shown as application 2755. In a similar manner to that described above, software 2709' also monitors usage of application 2755 and if extra serving-out capacity of application 2755 is required it causes it to be copied and made available for serving out, either via an additional port on NIC 2756 or via second NIC 2757 (or both).

Figure 28:
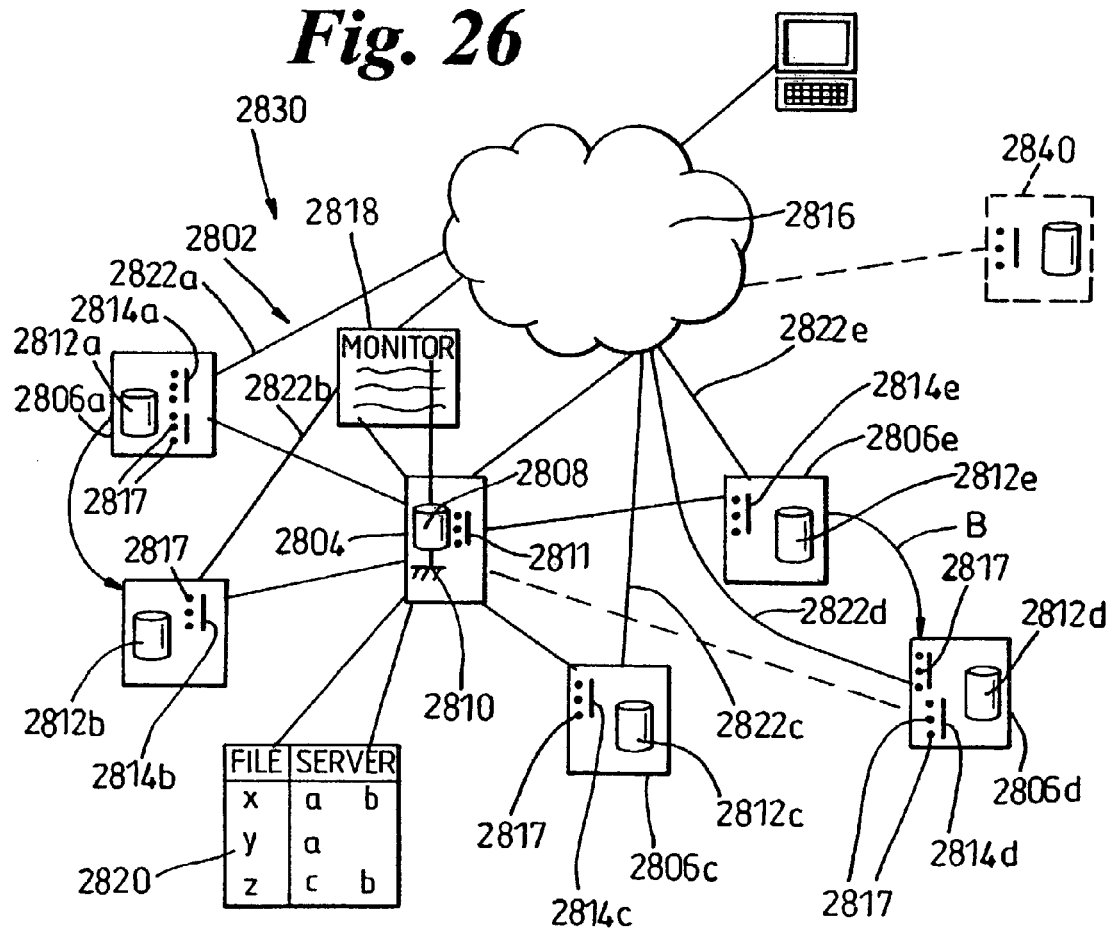
FIG. 28 is a schematic representation of a data management system according to an aspect of the present invention.

Referring now to FIG. 28, a server farm 2802 comprises a director unit 2804 and a plurality of servers 2806a-e. The director unit 2804 comprises a data storage device 2808, typically a hard disc drive, a processor 2810 and an NIC 2811.

The servers 2806a-e comprise data storage devices 2812a-e, typically hard disc drives, and NICs 2814a-e. The servers 2806a-e are connected to a network 2816 via their NICs 2814a-e, each NIC 2814a-e may have a plurality of IO ports 2817.

The director unit's storage device 2808 has a monitoring programme 2818 and a load balancing/routing table 2820 stored thereupon. When executed on the processor 2810 the monitoring programme interrupts the NIC's 2814a-e of the servers 2806a-e in order to sample their outgoing bitrate. If the sampled bitrate is above a pre-determined threshold or below a different predetermined threshold the processor executes an action, as will be described in detail hereinafter. The threshold level is typically a percentage, for example 80% of the theoretical/actual deliverable bitrate for any particular NIC 2814a. The frequency of the interrupts and the threshold levels are initially set by the vendor but are typically subsequently alterable by a user. Suitable threshold altering input devices (e.g. a keyboard) are connectable to the server, and suitable threshold-altering software resides in the server.

The monitoring programme 2818 is usually written in a scripted language that does not require recompilation prior to execution and constitutes a control language rather than an application language. This makes the programme 2818 flexible and powerful as it has direct implementational effect upon the system that it is intended to control.

The load balancing/routing table 2820 contains details of which resources or applications, e.g. portions of data, are stored on which server 2806a-e. This arrangement is of particular importance if there is dissimilar data content distributed over the individual servers 2806a-e of the server farm 2802, i.e. the data is not merely mirrored across all of the available servers 2806a-e of the farm 2802: one server can have different data on it to the other servers—indeed many or all of the servers may have largely different data on them (e.g. different video movies). The table 2820 can also include an indicator of which port 2817 a file is associated with.

In one more concrete example of FIG. 28, the network of servers 2806a to 2806e comprise a Video Farm 2830: a collection of servers networked together and all serving out the same type of resource: video movies, and all accessible by a common input address for a resource (video) requesting party. A customer, referenced 2832, enters the address of the Video Farm 2830 over the Internet, (represented as network 2816). This request is conveyed to the director unit 2804. The director unit knows which video movies are present on which servers 2806a to 2806e. The director unit knows the remaining unused resource-serving capacity of each of the servers 2806a to 2806e, and it can load balance the request. Load balancing means that the director unit decides to which server to send the request for the serving out of the requested resource weighting the current availability of resource and capability of the servers to serve it out successfully, and possibly even with a knowledge of future likely resource-serving capacity of the servers. For example, the director unit may simply direct the request to the server which has the most present, current, capacity to serve out the resource—assuming of course that there is more than one server with the requested resource/video available. However, the load balancing could possibly be more sophisticated and could take into account future availability—for example if right now server 406b had two minutes of a movie left to play, and for server 2806b to accept the request to serve out a further requested movie to a new customer would take it much closer to its saturation threshold then if server 2806c dealt with the new request, server 2806b may nevertheless still be allocated the new request to serve out if in two minutes time its available capacity will rise above the level available on server 2806c when server 2806b stops serving out the movie that has newly finished. This may be attractive if server 2806c has a popular movie on it that is likely to be requested again soon, and it is desired to keep serving capacity of server 2806c available for that eventuality.

If there comes a time when one of the servers, say server 2806a, gets to its threshold level of serving capacity the server 2806a, or the director unit 2804, causes one or more of the resources of server 2806a to be copied to another server, say server 2806e, so as to increase the capability of the Video Farm as a whole to serve out the resources/video movies that are in demand.

Copying video movies from one server to another, or from one port to another, may of course reduce the ability of the Video Farm as a whole to serve out other, less popular, videos as the memory that contains the less popular video is overwritten with more popular video, and/or as telecoms bandwidth is preferentially allocated to, or reserved for, popular videos.

Thus, the capacity of the Video Farm 2830 to serve out a particular video movie is dynamically and automatically adjustable, depending upon demand.

Furthermore, the Video Farm can co-opt another server, not in the Video Farm at a first moment in time, but networked to or communicable with, the Video Farm. It can therefore dynamically increase its overall capacity to serve out videos (or network resources). It is horizontally scalable. This is illustrated in FIG. 28 by server 2840, which is connectable to the Video Farm. The director unit 2804 knows the address of server 2840.

As resources, e.g. video moves, are moved around between serves the load balancing address list 2820 is updated to reflect the current addresses and capacity.

The director unit 2804 (or a unit that does no demand directing) can also be utilised in a fault monitoring role. For example, the director unit 2804 monitors the average data traffic within the farm 2802. Should the average data traffic fall below a threshold, below which it should never fall, the processor 2810 runs a diagnostic code in order to determine whether a fault has occurred or whether it is just an unusual lull in network activity. As well as determining if a fault has occurred the diagnostic will usually attempt to determine the source(s) of the fault and notify a systems administrator of them.

In an alternative, or additional, fault monitoring role the director unit (or a monitor unit) 2804 monitors network connections 2822a-e to the servers 2806a-e and the usage of the data content of the servers 2806a-e. This monitoring will typically be on a per-port (part of IP address) basis as each content type, for example HTTP, FTP, RTSP, typically requires an IO port (referenced as number 2817) to be configured for delivery of the content (this is not the same as a port upon which an application is running). For example, HTTP content is typically served on I/O port or connector 2880, FTP on I/O port or connector 2821 and RTSP content is served on another port or connector. Typically in the case of file based data, for example, video and/or audio data, each file is associated with a particular I/O port or connector. It is possible to have multiple instances of copies of the same file being run from multiple ports or connectors on a single server.

The director unit 2804 retrieves the utilisation information from the respective NICs 2814a-e of the servers 2806a-e. Upon noting a drop in utilisation of a network connection 2822, possibly denoting a problem with a server or a failure of a server to respond to an interrogation signal, denoting a possible server failure, the director unit 2804 instigates a transfer of the data content that is unique to the server 2806a to a secondary server 2806b (as denoted by the arrow A in FIG. 28). If the secondary server 2806b does not have the correct applications to service the data from the failed server 2806a the director unit 2804 spawns the requisite applications, subject to copyright considerations, on the secondary server 2806b. If it is not possible to copy the data from the server 406a the director unit can access the data from its original source, for example a DVD, CD or tape media. The availability of the same data that is on a failed server, or the data on a server that cannot be accessed due to a telecoms failure, is assumed. A reference data store (not shown) is provided to enable the contents of the downed server to be recreated on a "live" server.

Once the transfer of data and applications has been completed the director unit 2804 updates the load balancing/routing table 2820 with the network address of the secondary server 2806b and the identity of the files, and where applicable a port identifier.

The director unit 2804 can also be used in high level usage monitoring, in which the director unit 2804 monitors the connections to, and usage of the content on, the servers 2806a-e. This monitoring may be carried out on a per port basis as detailed hereinbefore. For example, if one of the servers 2806e is serving video data the server can only serve a certain amount of 28.8 Kbps video channels from any NIC. As one of the servers 2806e becomes busy, i.e. exceeds the predetermined threshold for its NIC 2810, or receives more requests for a file associated with any port 2817 than it can service, the director unit 2804 co-opts an additional server 2806f into the farm 2802 and facilitates the copying of part of all of the data content of the busy server 2806e to the additional server 2806f (as denoted by the arrow B in FIG. 28).

Although described as a software based implementation it will be appreciated that the 'programme' 2818 can be implemented by any suitable hardware or firmware arrangement.

Figure 28A:
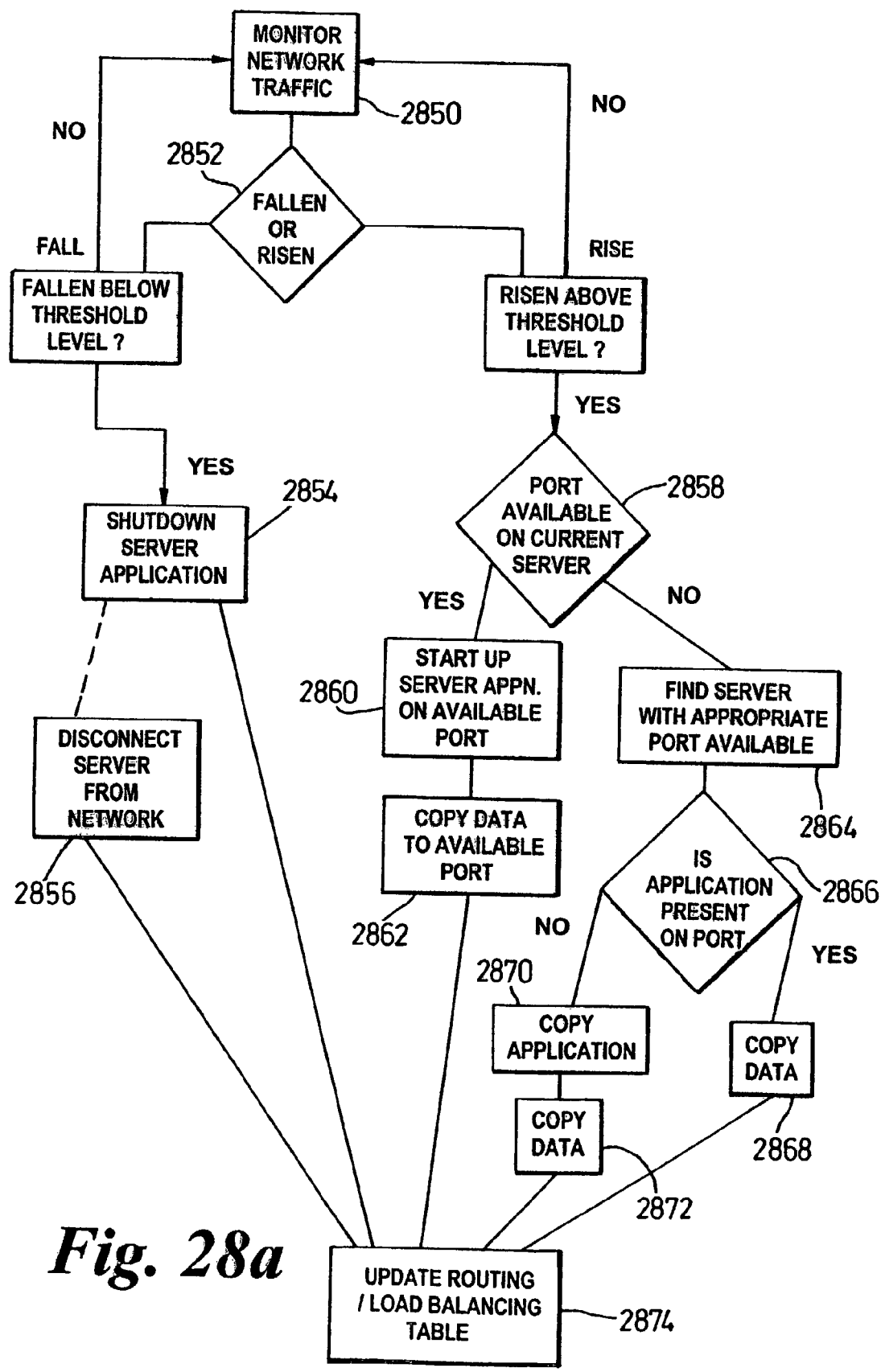
FIG. 28a is a flow chart detailing a method of data management according to the present invention.

Referring now to FIG. 28a, for a server a processor monitors the traffic output via the ports of a NIC (Step 2850). The NIC may be part of a data content server that is associated with the processor and the processor may be monitoring the status of its own NIC. Alternatively, the processor may form part of a director unit and may be arranged to monitor an NIC associated with a server that is remote from it.

The processor checks to see if the network traffic on a given port, monitored at the NIC, has risen or fallen (Step 2852). If the processor notes a fall in the network traffic below a predetermined threshold it may issue an instruction to the NIC to shutdown a data server application on the port associated with fall in network traffic (Step 2854). If the processor notes a fall in network traffic across all of the ports of a NIC the processor may issue an instruction to disconnect the server from the network (Step 2856).

If the processor notes an increase in the network traffic on a given port it checks to see if there are any available ports on the NIC that are capable of serving the same format of data as the busy port (Step 2858). If there is an available port(s) capable of serving the format with spare bandwidth the processor starts up a data server application on the available port (Step 2860). The processor facilitates the copying of the data associated with the busy server's port to the available port (Step 2862).

If there are no ports available that are capable of serving the same data format as the busy port the processor issues an instruction to find a further server on the network with an available, suitable port (Step 2864). Once the further server has been found the processor checks the further server to see if it has the required data server application present upon the suitable port (Step 2866). If the suitable port does have the required data server application thereupon the processor facilitates the copying of the data associated with the busy server's port to the suitable port (Step 2868). The processor facilitates the data copying either by direct involvement in the copying process or by issuing an instruction to the busy server to copy the data to the further server.

If the further server's suitable port does not have the required data server application the processor facilitates the copying of the data server application to the suitable port (Step 2870), again either directly or indirectly. The processor then facilitates the copying of the data to the suitable port (Step 2872) as described hereinbefore.

After completion of the above mentioned actions associated with either a fall or a rise in network traffic a database, that contains the location of data on the network, typically as a network address and a port identifier, and the results of the monitoring of the network traffic, is updated (Step 2874). The table is typically used as a routing and/or load balancing table by a director class server or load balancing switch.

Another area of use for the present invention is in data logging. The average traffic over a network should not normally fall below a certain level. A monitor server can be set up to watch the level of network traffic and have a minimum traffic level threshold entered into it (possibly an updateable/re-settable threshold). If the threshold level is ever reached this could trigger diagnostic code, based upon that threshold, to determine whether there was a problem or not. There may be reasons why traffic will reduce without there being a system problem (e.g. Christmas Eve, Christmas Day).

It will be appreciated that hitherto it has not been possible to have cheap enough scalable content layer/tier of content servers, and that by allowing dissimilar content we achieve ready scalability. Being able to bring into a network new servers, with new content (content level granularity) is attractive. Furthermore, whilst rudimentary load-balancing demand directors are known, none have content and/or application awareness: they do not know what content is where and/or how busy is a server to which a request could be directed. We can add new servers for specific functionality and content can be put onto them to alleviate demands on, for instance, a server serving a particular video stream that is requested by users frequently.

We may well wish to provide a content-type farm (a collection of servers acting together to serve out a given resource (or application) type (e.g. video streaming 1). The farm may provide a load-balanced service.

Dynamically distributing content over available networked content servers so as to maximise performance of the network to serve out the content is a broad concept. A content server may be "self-aware" and migrate content when it decides to. Alternatively, a master server, or monitor server, may be "others-aware" and may decide to migrate content from other servers (it may also be "self-aware"). The monitoring may be via NIC cards/ports. Any server, e.g. a content server, may be able to monitor groups of servers of interest (and hence be a monitor server).

Self-aware and others-aware functionality may be used to migrate data onto servers on a network and/or to look for other problems and compensate automatically for them. For example, an "impaired" server may be impaired because it is approaching capacity and will struggle to serve out further resources, or because it has a fault, or because the telecoms links to it are faulty, or themselves struggling with capacity. Whatever the reason for the impairment to the ability of a server to serve out in the future resources in response to a request for resources available on the server, some embodiments of the invention allow these "impaired" or "missing" resources to be made available from other, less impaired, servers, so as to maintain the capability of the network as a whole to serve out the resource in question. They system may monitor for failures, or high level usage, or both. Data logging may be performed to ensure usage levels are within acceptable/usual bounds.

An example of failure monitoring is: a management station/director server monitors connections to a collection of servers and usage of the content on those servers (this may be on a per port basis, for example when running multiple instances of the same server application (e.g. web serving/video streaming)). When a given server or servers fails, the management station ensures that new servers are brought into play by spawning the appropriate application processes on new servers to cope with the loss and content is replicated to the new servers from its source. In order to do this, the management station or director server monitors each of the compute elements delivering a given type of content (e.g. web serving, video serving, FTP serving) and retrieves utilisation information from each of the servers, when connections to a server fail the management station/director server instigates a replication of the contents from its original source (which is assumed to be replicated elsewhere) on to the new server and starts appropriate application services on that server to enable it to serve the new content. The director then updates appropriate load balancing technology or routing tables in use to allow that new server resource to be utilised (e.g. hardware load balancing switch) and the failed server is removed from the configuration until such time as it s repaired and can be brought into play.

An example of high level usage monitoring is:

A management station/director server monitors connections to a collection of serves and usage of the content on those serves (this may be on a per port basis, for example when running multiple instances of the same server application (e.g. web serving/video streaming). When content becomes "busy" on a given server, or servers, the management station ensures that new servers are brought into play by spawning the appropriate application processes on new servers to cope with the demand and content is replicated to the new servers from its source.

The management station or director monitors each of the servers delivering a given type of content (e.g. web serving, video serving, FTP serving) and retrieves utilisation information from each of the servers. When connections to a server increase over a given threshold the management station/director instigates a replication of the content onto the new server and starts appropriate application services on that server to enable it to serve the new content. The director then updates appropriate load balancing technology or routing tables in use to allow that new server resource to be utilised (e.g. hardware load balancing switch).

It will be appreciated that a demand director/monitor server, or other processor, can evaluate whether a current level of servers and a current distribution of resources on those servers is capable of meeting expected reasonable levels of future demand, and if not to take appropriate action to increase the chance of such future demand being met satisfactorily.

Although in principle the network benefits of aspects of the invention can be obtained with two content servers (and a demand director or master server, with perhaps one of the content servers being a demand director and/or master server as well), there will be many times when the benefits show more clearly when there are 3, 4, 5, 6, 7, 8, 9, 10, 20, or more content servers. There may be of the order of at least half a dozen content servers. By having a large number of content servers (e.g. 6 or more), or a very large number of content servers (e.g. 10-15 or more), it is possible to have significantly different content on different servers, possibly even sub classes of content of the same general kind on different servers. (for example, it may be possible to have action movies on one server, comedy on another, science fiction on another, romantic on another, drama on another, etc.)

It will be appreciated that a significant advantage of many embodiments of the invention is that the level of service available on a network accurately reflects consumption of the resources. We believe that it may not be desirable to replicate data and application software services endlessly such that capacity is only ever over-provided. The amount of application serving that the collection of resource servers can provide at any one time may, in some embodiments, accurately reflect consumption of those resources by users. There may be a "low water mark" that ensures that there is never complete cessation of application serving in the event of consumers appearing, possibly suddenly appearing, not to want to resource anymore. It may well be undesirable to make the user wait until a resource can be copied and an application server brought up to service a request for that resource. It may therefore be desirable always to have at least one copy of all potentially available resources available for serving, or at least one copy of all potentially available resources present in the memory of a resource server (or accessible to the resource server), and appropriate application software for serving out any specific resource.

Figure 29:
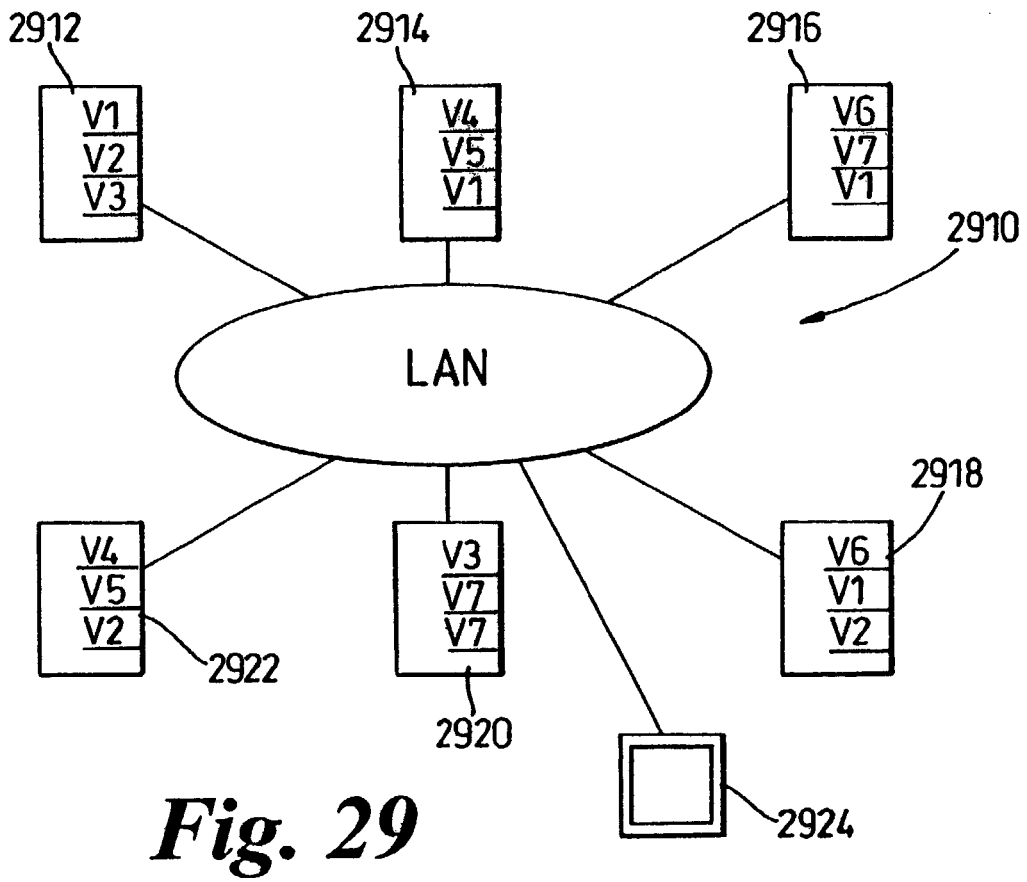
FIG. 29 is a block design of a video farm including a LAN of video servers.
Figure 30:
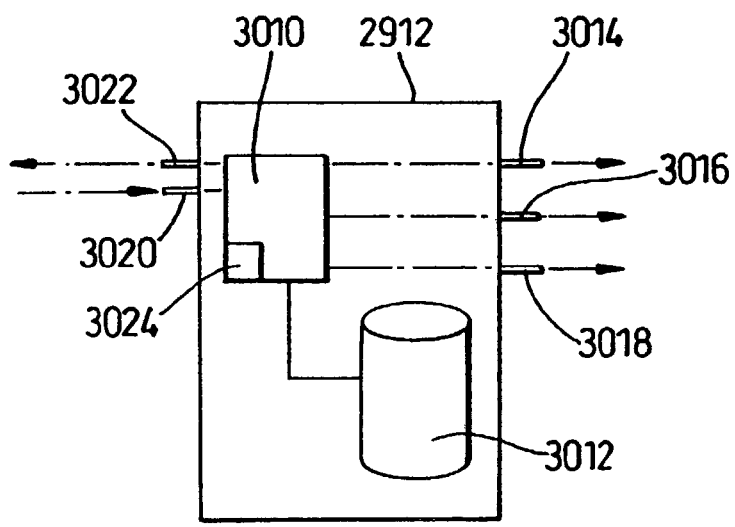
FIG. 30 is a block diagram of a video server of FIG. 29.

FIG. 29 shows a further example of a Video Farm 2910. Video Farm 2910 comprising video servers 2912, 2914, 2916, 2918, 2920, 2922 connected in a local area network 2924, and FIG. 29 also shows a user 2926 connected to the network 2924 (possibly via the Internet). Each video server has a number of video movies on it, say about 100 to 500 movies on each, with each movie being of about 1½ hours-2 hours direction. FIG. 29 shows schematically each video server with 3 movies. In the case of video server 2912 they are movie V1, movie V2, and movie V3. In the case of video server 2914 they are movie V4, movie V5, and another copy of movie V1. It will be seen that some movies are present on more than one video server. Furthermore, sometimes more than one copy of a movie is present in the same video server (see video 2920 which has two copies of movie V7).

As shown in FIG. 20, each video server has a central processor 3010, a memory 3012 containing the video movies, a number of video streaming output ports 3014, 3016, 3018 or connections, a monitoring input port or connection 3020, and a control signal output port or connection 3022. Control software 3024 resides on the processor 3010 of each video server.

The control software 3024 makes each server capable of being "self-aware" and of being "others aware", in the sense of being able to determine the performance abilities and/or characteristics of each video server in the farm 2910.

This enables the video server to self manage and execute remedial actions based upon their visibility of video content usage on the network, and upon the ability of each video server to deliver video content. It also enables an individual server to contribute to managing the performance as a whole. The video farm 2910 is able to distribute video content dynamically, in response to changing conditions, over the video servers of the farm, and to bring up a new serving processes when it is determined appropriate to do so. For example, if one video server failed, e.g. server 2916, the video farm can create extra copies of those videos that were capable of being served out from server 2916 on the other servers, so that the overall capacity of the farm to serve out videos stored upon (or accessed via) a faulty server is not significantly changed. FIG. 29 also illustrates fault tolerance for video files: for each server having certain videos, or video items, stored on it there is another copy of each of its video items stored on at least one other server. This means that if one server is faulty, or the telecommunications lines to it are faulty, its content is still accessible from elsewhere on the farm, available to be copied/brought into service.

In the video farm 2910 one of the video servers, say server 2912, takes the role of master video content servability monitor and is aware of its own operational conditions and parameters and has the operational conditions and parameters of the other servers 2914 to 2922 communicated to it via its port 3020.

If for any reason the current master video server, server 2912, is unable to perform its role properly (e.g. it develops a fault or its telecommunication links to the rest of the farm become impaired) another of the video servers can take over as the master video server.

Figure 31:
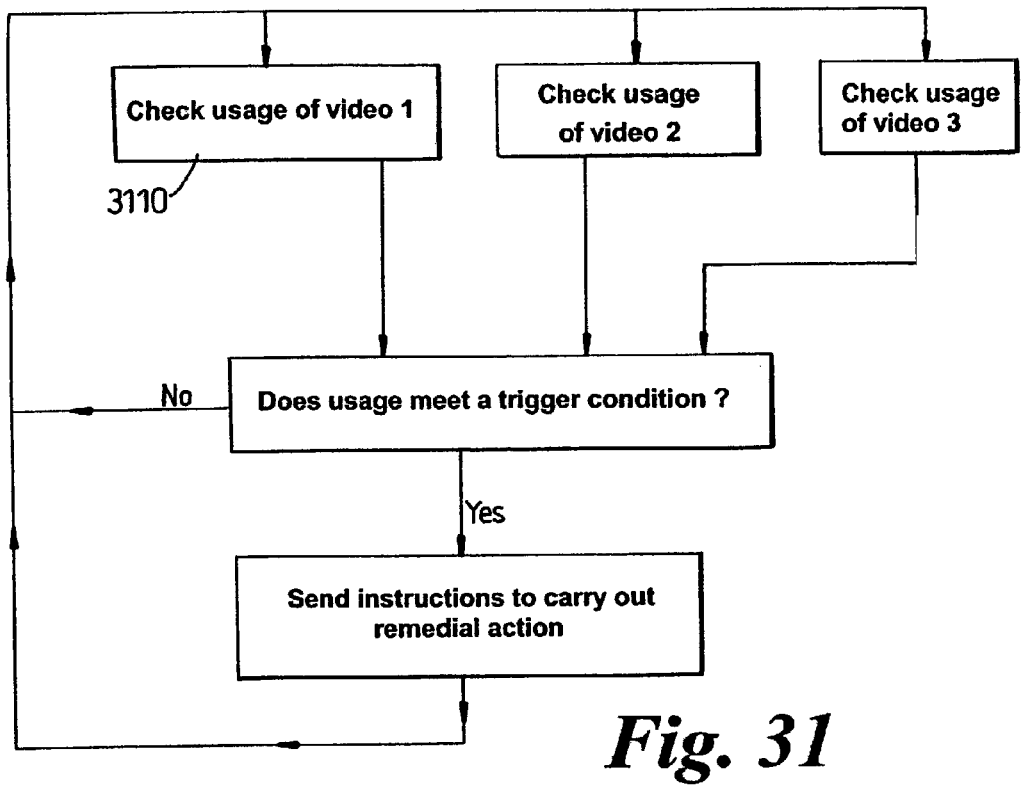
FIG. 31 is a flow diagram of a monitoring routine of the video farm of FIG. 29.

FIG. 31 illustrates one of the software process that is happening on the processor 3010 of the master video server, e.g. server 2912.

There are gating thresholds programmed in for performance parameters, possibly by a system manager (person) and generally they are alterable/reprogrammable (a generic fixed threshold would not be able to adapt to the usage conditions experienced). In FIG. 31 the performance parameter is to the level of usage of each video item (e.g. video movie) capable of being served out by the video farm. Usage levels for video items are checked in parallel, rather than sequentially, as illustrated.

The master video processor determines how many video items of each specific video item is being served out (e.g. how many video V1s are being streamed out, how many video V2s are being played, how many V3s are being played etc). The number of video items being played currently is checked, for each video item (movie) against an evaluated known, total capacity of the farm to serve out each specific video item. It is desired to have the level of resources in the farm such that it is possible to serve out another specified number of each video item, in addition to those currently being served out. This additional, reserve capacity, number of servable video items may be the same for each video item (i.e. the farm is capable of serving out 3 more V1s, 3 more V2s, 3 more V3s etc), or it may be different for at least one of the servable video items (e.g. 5 more V1s in reserve, 2 more V2s, one more V3, etc). It may be desirable to have a higher reserve capacity to serve out a popular video movie than a relatively unpopular movie. For example a newly released movie may be in more demand by users and it may be appropriate to have more reserve capacity to serve out that movie than an older "classic" movie (such as Gone with the Wind). More users are likely to want to access a new release in a short time.

Thus upon checking the usage of video, referred 3110 in FIG. 31, the processor 3010 compares the actual number of videos of each specific title being served (reference 3310 in FIG. 33) out with the potential capable of currently being served out (reference 3312) and establishes a reserve capacity 3314 to serve out video V1 in the short-term future. This reserve capacity 3314 is compared with a maximum threshold level, 3316, and with a minimum threshold level 3318 and the capacity of the farm to serve out extra additional copies of V1 in the future is increased, reference 3320, or decreased, reference 3322, depending upon whether the minimum or maximum threshold is met or exceeded.

The capability of the farm 2910 to serve out a specific video V1 can be increased by starting up appropriate video serving application software on a video server that already has the specific video V1, or by creating extra copies of it on the servers 2912 to 2922, and/or making available greater telecommunications capacity for V1, e.g. by opening up video serving applications on ports (parts of the network address space) of the video server that were previously used for something else (e.g. voice telecomms or text communications). Similarly, capacity to serve out V1 can be reduced, freeing up capacity to serve out other videos, by shutting down software applications that access V1 in the memory of one or more servers and/or by overwriting or deleting V1 in the memory of one or more servers. It is probably best as a first measure simply to disable the ability of the server to serve out V1 (still retaining V1 in memory of the server, e.g. in disc storage accessible by the server). This is easier to reverse in the future and often it is the processing power of a server's CPU, or the telecoms availability at its connecting ports, that restricts serving capacity rather than absolute lack of memory accessible by the server for extra copies of popular videos.

Figure 32:
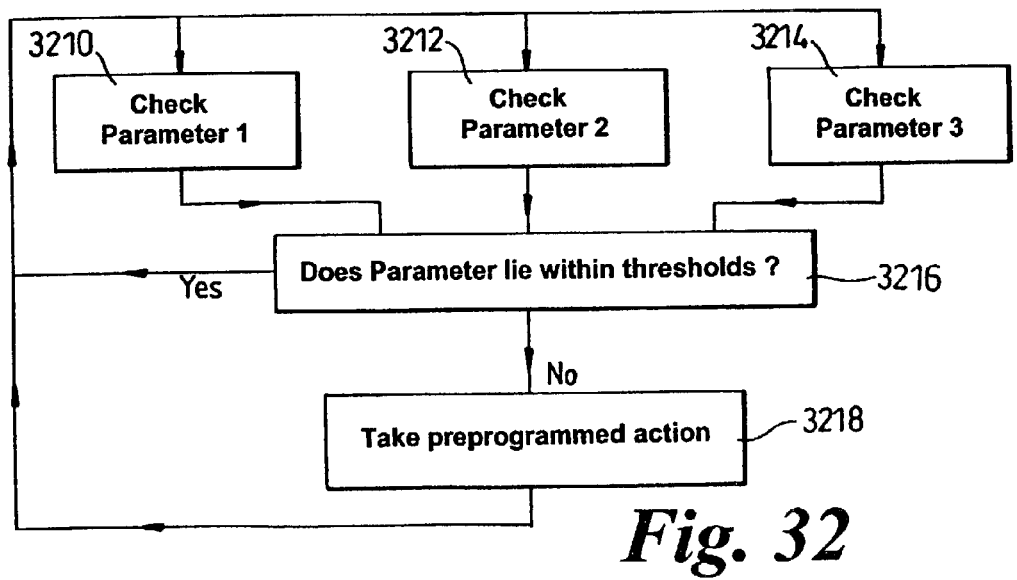
FIG. 32 is a flow diagram of another monitoring routine of the video farm of FIG. 29.

FIG. 32 schematically illustrates software on the processor 3010 checking other parameters which can effect the overall ability of the farm to serve out content. Boxes 3210, 3212, 3214 show the processor checking a number of different parameters (in this case 3) for each of the servers in the network (in this case 6). The parameters are checked in separate threads of execution (i.e. in parallel). Box 3216 shows a comparison of each parameter with one or more respective thresholds (e.g. parameter/with maximum threshold 1 and minimum threshold 1, and parameter 2 with maximum threshold 2 and minimum threshold 2). Box 3218 shows the processor sending out control signals in response to threshold conditions being true. The actions initiated by the control signals are pre-programmed, typically by a system administrator (person), and can typically be amended and new different actions, or new different threshold conditions can typically be input (again typically by a systems administrator).

Figure 34:
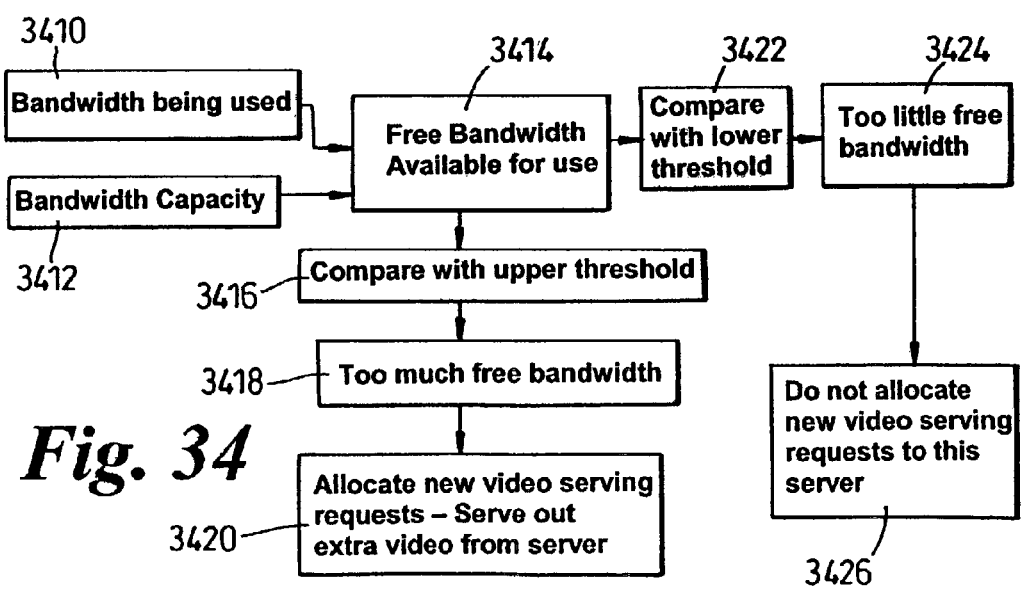
FIG. 34 is a schematic diagram of checking bandwidth usage.

FIG. 34 illustrates one parameter being monitored: bandwidth available for new users at a specific video server, say server 2922. The master server 3022 polls each of the other servers 2914-2918 in the network to ask them how much bandwidth they are using. Each server runs a routine on its external network communications NIC card which monitors an appropriate parameter and reports to the master server. Thus bandwidth being used is established for each server, referenced 3410. The potential available bandwidth to each server is known to the master server (referenced 3412), or to each server itself. This enables a bandwidth free for future use FIG. 3414, to be established. This is compared with an upper threshold 3416 and if it is above that (too much bandwidth available 3418) then remedial action is taken. In this case box 3420 illustrates the allocation to a video server (e.g. server 2922) which is adjudged to have too much free bandwidth of additional requests to serve out new videos. That is to say, in a load balancing routine controlled by the master server 2912 requests to be served a video item can be allocated to whichever video server is adjudged to have sufficient, or best, telecommunication availability. This can at least be one of the factors in deciding to which video server a request for a video is sent (assuming more than one server has the video available for serving).

FIG. 34 also shows a comparison 3422 of the free bandwidth available for use, for each server, with a lower threshold. If it is established that there is too little free bandwidth, 3424, then remedial action is taken. This action could be, as shown in 3426, the decision not to direct new requests for videos to be served out to the particular server that is getting close to its bandwidth capacity.

The actions 3470 and 3426 need not be as described. For example, a video actually being served out of the server that is adjudged to be too busy (too great a strain on telecommunications links) may be started up on another server, and (optionally) shut down on the busy server with an arrangement so that a user currently receiving the video from the busy server does not notice the transfer of the source of the video to the less busy server.

The thresholds may be adaptive, in the sense that a threshold for a specific server may go up or down depending upon what is happening elsewhere in the network. For example, whilst it may normally be undesirable to start up more videos on a server that is using 80% of its telecomms bandwidth, the master server may not have any choice if that server is the only server to have a copy of the requested video available for serving to a new user.

As a further example, the network may have a control database that maintains network-wide global, serving state details for each server. This may be held in the master server, or elsewhere.

A guide to what might be appropriate code is:

Example 1

```
Database (vf0,vf, vf, vf) {
query ("select * from showing")}
(.inactive<3): 'cool'+titleID
(.inactive>3): 'heat'+titleID
} every 2 seconds
```

Example 2

```
exec ('bandwidth vf2'){
<1024 k: 'bringup vf3'
>2048 k: 'mover vf2'
every 10 seconds
}
```

The wrapper whole database ( . . . ) { } specifies a database to run queries against, within that, queries are of the 'exec' or 'query' form. The fist example here specifies that is a title that is currently showing has more than three inactive connections, it should reduce that serving capacity for that title by calling an external process called 'cool' with an argument specifying which title to cool. Conversely, if there are less than three inactive connections for a given title, then more serving processes for that title should be started up, by calling an external process called 'heat' with an argument specifying which title needs more serving capacity from the farm. In both cases, cool and heat then run queries against serving capacity of the farm and make judgements based on appropriate serving loads on resource servers to determine where those new serving processes are started up.

The case of example 1 illustrates the desire that a given video title served should never have too many active processes able to serve it: hence if more than three active connections, reduce the ability to serve that title—in this case it is assumed that this would be the result of running the external process 'cool' with the title to cool as a specified argument (i.e. title 12 would be 'cooled').

The second case illustrates the desire to check the available bandwidth from a video server called vf2—the separate code called "bandwidth" can be run up on either the server vf2 or upon a remote server connected to vf2 via a network. When run upon vf2 "bandwidth" returns the data transfer rates from vf2, typically obtained from the network card of vf2. If vf2's transfer rate is above an upper threshold value, for example 2 MB/sec, another server is brought into use in order to reduce the load on vf2. If vf2's transfer rate is below a lower threshold, for example 1MB/sec, it will typically be allocated more content to serve as it is not fully utilising its data transfer capacity.

When run upon a remote server "bandwidth" samples the data transfer rate that is available from vf2. In this case if the sampled available transfer rate is below a threshold value, for example 1MB/sec, vf2 is using a significant faction of its available data transfer capacity and therefore another serve is brought in. Conversely, if the sampled available transfer rate is above a threshold value, for example 2 MB/sec this indicates a significant fraction of vf2's data transfer capacity is unused. Therefore vf2 can be allocated more content to serve.

In either case, it is assumed that the external processes "bring up" or "move" will cause those events to occur.

All of the items within the database ( ) { } block are run in separate threads, i.e. not sequentially—so in this manner as soon as the condition become true remedial action is taken. The condition can also be set for various times. (see the 'every N seconds'). This ensures that the monitoring process does not swamp the CPU upon which it is being executed and also that if measuring statistics, they are measured over an appropriate time period—i.e. in the case of network statistics it is not burst capacity that is being measured.

Figure 33:
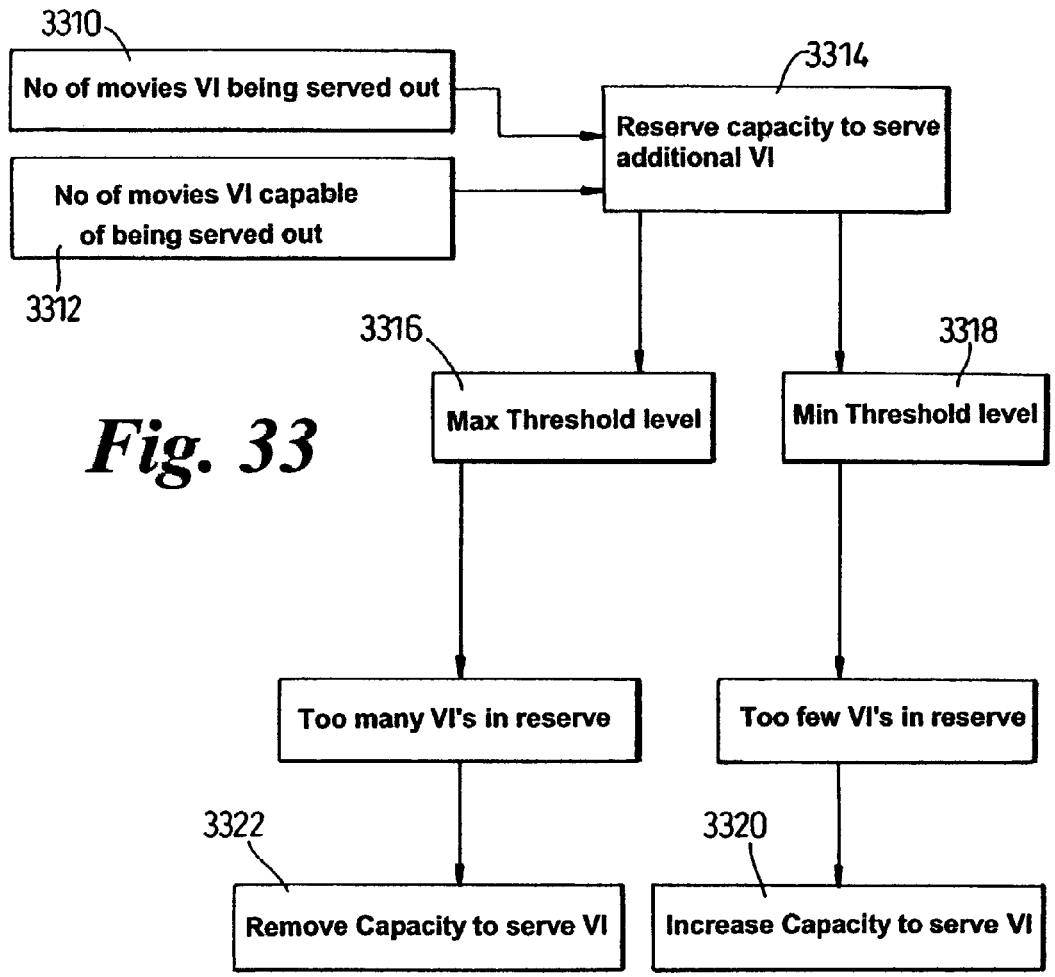
FIG. 33 is a schematic diagram of checking movie usage.

It will be appreciated that although FIGS. 33 and 34 used capacity was monitored and unused capacity evaluated from that, it may be possible to monitor unused capacity directly.

The master server is typically aware of its own activities as a video server. If it is not actually a video server then clearly it need not know of its own serving activities/capabilities.

There are at least three things which can impair the ability of a video server to serve out a video to a user. Firstly, the telecommunication capability from the server's output port or connection to the user; secondly, the internal telecommunication within the server from the server's memory to its output port or connection (the video has to get from memory to I/O port); and thirdly the CPU performance (the CPU has to control, manage, and perhaps format or encode the datastream, and call it from memory). All three of these can be parameters to be monitored. We have already discussed the first. It is possible to monitor the I/O streaming performance of the disc substream (disc to I/O port)—the storage I/O performance. It is also possible to monitor CPU performance (e.g. how many of its clock cycles per second are actually being used).

By "memory" of the server is meant fast access chip memory, disc (non-volatile) memory inside the server, and memory attached to the server, but not necessarily physically in its housing.

It will be appreciated that each video server could run its own diagnostic on itself and communicate the results to the master server. Alternatively the master server could interrogate each server for their self-performed diagnostic result. Alternatively the master server could perform the diagnostic routines on the other servers.

When a server is completely cut off from the remainder of the network, or completely "dead" it cannot communicate anything to the master server. The absence of information/an appropriate response to a query can itself serve as information to the master server to be acted upon.

Performance/capacity information may be obtained for each video item: each video movie may be evaluated as a separate thread of enquiry.

It will be appreciated that a demand director/load balancing server could take into account not only the question of whether a particular video server has a particular video content upon it, but also whether its telecommunications, CPU, and memory access were capable of serving out a requested video effectively, and could allocate requests with this capacity in mind. Furthermore, if it seemed appropriate to redistribute video content over the video servers in the network this could be done automatically. For example, if a particularly busy video server had one copy of movie 101, and only one other quieter video server had a copy of movie 101, the master server could cause movie 101 to be copied as a precaution, e.g. from the "quieter" server, to another server so that there was an increased spare capacity to serve out movie 101.

Similarly, if a specific server developed a fault and was inoperative, or could not be communicated with (fault in telecommunications) then the master server could take that into account whilst dynamically controlling the distribution of video content over the receiving servers and/or whilst allocating requests for videos to be served out to specific ones of the remaining video servers.

The master video server 2912 checks parameters beyond usage levels of specific video movies.

It is desirable to load balance telecommunications over the video farm so as to avoid bottlenecks in data transfer/video streaming.

Other parameters which could be monitored, and used to control overall network performance—affecting things include:—

Memory usage

Latency (response time to "pings")

CPU utilisation

Average I/O rate per second

Other performance indicative statistics.

The above could be per server (and usually will be), but could also be evaluated for the network as a whole. For example, it may be possible to determine that nothing is wrong with any server but that nevertheless the network is struggling to meet demand and that more servers and/or better telecoms and/or better CPU's are needed. The remedial action may be automatic (e.g. co-opting in another server), or it may comprise the automatic generation of a report or alert to be acted upon by a human.

The response to monitored parameters meeting pre-programmed conditions could be based upon existing demand, or could be policy-based to take into account projected future demand. For example, greater free reserve bandwidth may be required at a time of day when it is known people like to watch video movies (e.g. 8.00 pm) and the acceptable thresholds may be adjusted, automatically or manually (e.g. by altering a program) to allow for that. The software allows programmable specification of network and serving conditions that require remedial action and the action(s) to be taken based upon those conditions becoming true.

The memory of a video, or resource, server typically includes non-volatile disc memory.

It will be appreciated that the inventions described can be used with each other, in any combination.

It will be appreciated that in some embodiments the invention uses a local area network, rather than a wide area network, and some embodiments involve rich media (e.g. video) farms of servers (very local servers—local to each other, often in the same room). For WAN arrangements, especially those involving the Internet, and possibly involving thousands of miles of telecoms cables, the speed of light (for optical cables) can still not be fast enough to avoid issues associated with large distances between client and server, especially for time dependent consumable resources, such as streamed video files.

Many embodiments of the invention allow a resource (e.g. video) to be streamed out/delivered from a server using a particular application software on that server to cause the data representing the video movie to be streamed out properly. The same video may be servable out of a server using different application software, e.g. capable of handling/formatting the video data differently for different client requests. For example Real Player, Windows Media Play, and Quick Time, are three known, and different video serving application software which can operate on the same video data/file (or different video data (file) records) to serve out a video to a user/client in different protocols or formats.

A particular server may have the video file, or other data record of the video, in its memory, or in local attached memory. Said server may have first application software capable of serving out the video file present in local memory in the server, or in a server farm to which said server belongs, or it may not.

The first application software may be adapted to serve out the video file in a first way to comply with a first protocol. The first application software, when presented on the said server, may be installed on the server, or it may not actually be installed: it could simply creatable by said server using "first application installation" software that is installed on the server. Or, the application software may need to be telecommunicated to said server (or the first application installation software telecommunicated) to enable said server to have the capability of serving out the video file.

The first application software may be running on the said server, or it may be installed but not running: it may need to be brought up to a running condition. The first application software even when running on the server may be engaged in actually serving out the video file or it may not: it still may be capable of serving out a further video when instructed to do so.

Thus, to cause said server to serve out said video a migrator controller may or may not have to migrate the video file itself to the server, depending upon whether the server already has a video file available or use in serving out the video. The first application software, necessary to serve out the video in the first way, may need to be migrated to said server, or it may not, depending upon whether it already exists and whether, this currently fully utilised in serving out video.

The first application software may need to be installed if it already exists on the server, or it may not, depending upon whether there is already installed first application software free for use (not otherwise occupied). Or first application installation software may or may not need to be migrated to the said server, depending upon whether it already exists on the server in a useable form.

An instruction to said first server to install the first application software may need to be transmitted to said server.

An instruction to run installed first application software may need to be transmitted to the said server.

Similar points apply to second, and further, application software capable of serving out the video file in second, and further, ways that comply with second, and subsequent protocols.

Which of a plurality of video-serving application software it is necessary to have running on the server to satisfy a request for the video depends upon the format of the video requested by the client.

Just as different data software/software may or may not need to be transmitted to a server to enable it to serve out an additional video at any particular time, when a specific server stops serving out a video in a particular format it may be appropriate to bring down the running of a specific video serving application software in order to reduce demand on the processing unit of the server. This may involve leaving the application software installed, but not running, or de-installing it. Usually the application-installation software would be left on the server, but it might also be de-installed. Usually the video file would be left on the server, but it also might be de-installed/removed from memory there.

Many embodiments of the invention determine whether it is necessary to transmit to a selected server that is to serve out a specific video in response to a specific demand for the video by a client the particular kind of video serving application software necessary to serve the video out in a way that will meet the demanded format, and will migrate/transmit to the selected server the minimum data/software necessary for it to achieve the serving out of the requested video into the requested format (i.e. they will not automatically transmit to the server everything it might conceivably need (application software and video file), just what it does not already have free for use, or that it cannot create itself). This tailoring of the migrated software and data to the specific needs (present or future) of the server reduces the utilisation of bandwidth in the migration process, leaving more bandwidth free for the actual satisfying of client requests for videos.

Also, in a system where the resources that are servable out are of different kinds (e.g. different kinds of video formats, and/or web pages, and/or audio only media, and/or other rich media), there may be other serving out application software necessary to serve out the actual data representative of those different kinds of resources.

In determining which servers are capable of satisfying a particular demand a demand server has to establish what application software it is necessary to have running on the chosen resource server, and that the selected resource server not only has access to the data contact of the resource to the served out but also to the appropriate serving-out application software necessary to serve the data out in the required way.

It will be appreciated that a signal from a demand director to use video serving application software that is already running on a video server to serve out a particular video title, and a signal to bring up to a running condition installed video serving application software, or to use application-installing software to install and run a video serving application, has fewer bits in it than actually transmitting a video serving application-installing software to a server, which in turn has fewer bits than actually transmitting video serving application software itself to the server, which in turn has fewer bits than transmitting a video file data record itself.

When moving data around a farm, or local area network, or indeed around a wide area network, many embodiments of the invention assess the need to move video data records, e.g. files, (for example), or whether it is possible to move something that has fewer bits. For example migrating or copying a particular video-serving application software program to a specific server that already has video data ready for serving may enable that specific server to serve out an additional copy of that video. This may consume less network resource than automatically, without consideration, migrating the desired video file and the necessary application software to serve it out in a specific format.

Similarly, migrating or copying video-serving application installation software, a condensed packaged software program which can be used by the recipient server to create the required format/protocol of video serving software, can reduce the network resources consumed in enabling a new server to have the capacity to run video serving application software of the desired format/protocol. This may be done in advance, before there is an actual demand for a video (or other rich media or other resource) to be served out, so as to maintain capacity to respond to a future request to serve out video in that format/protocol. For example, if a particular video server has a plurality of unused video serving application software of a first format/protocol running or installed, but no unused video serving application software of a second, different, kind of format/protocol, running or installed it may be desirable to have that server run or install an appropriate software program of the second format in place of one of the application software programs of the first format (so that there is reserve capacity of video serving application software of both formats on the video server).

The second format of video serving application software may be copied, installed or brought up running from within the server in question, or it may be migrated to the server in question from another server. Distributing ready-for-use, unallocated, running or installed (or installation) video serving application software over a farm, or local area network, or of video servers, without necessarily migrating video files themselves, in order to be ready to serve out videos from the servers in a variety of formats/protocols is what is achieved by some embodiments of the invention.

The invention claimed is:

1. A method of satisfying a demand on a server farm or local area network, the farm or network including a demand director server, a first resource server having a first resource thereon, and a second resource server having a second, different, resource thereon, said demand director server having knowledge of what resources are held on said first and second resource servers, the method comprising:
responding to a request for one of said first and second resources by (a) selecting one of said first and second resource servers to serve out said requested resource and (b) directing said request to said selected one of said first and second resource servers,
wherein said selecting comprises using the demand director server's knowledge of where the requested resource is located; and
the selected resource server serving up a reply to said request by inserting into said reply an address of the demand director server, wherein inserting into said reply the address of the demand director server causes said reply to appear to a requestor who made said request as coming from said demand director server, wherein serving said reply comprises sending said reply to the requestor over a network while bypassing the demand director server, wherein inserting into said reply the address of the demand director server causes establishment of a virtual connection between the requestor and the demand director server for serving content from the first and second resource servers to the requestor while hiding an identity of the first and second resource servers, the content including said reply, wherein the virtual connection is a temporary connection that when maintained allows the requestor to receive the content from the first and second resource servers and wherein, when the temporary connection is broken, the requestor is prevented from receiving the content without first accessing the demand director server.

2. A method according to claim 1, wherein the method is applied to a world-wide web farm of networked servers that include the first and second resource servers.

3. A method according to claim 1 wherein at least one of said first and second resources comprises one from among the group:
   (1) video,
   (2) partitionable data,
   (3) data files,
   (4) data objects.

4. A method according to claim 1 wherein said request is serviced by whichever resource server is adjudged to be most able to serve out said requested resource.

5. A method according to claim 1 wherein said demand director server is configured to communicate with an additional resource server that previously was not making the additional resource server's resources available for serving requests received by said demand director server, and to arrange for said additional resource server to make the additional resource server's resources available for serving requests received by said demand director server.

6. A system comprising:
a demand director server including a computer, a first resource server having a first resource, and a second resource server having a second resource, the second resource being different from said first resource, said demand director server being aware of where said first and second resources are located, and said demand director server being configured to receive a request for a selected one of said first or second resource to be served out of a network, and to direct said request to a selected one of the first and second resource servers determined to have said requested resource;
wherein the selected resource server is configured to serve up a reply to said request by inserting into said reply an address of the demand director server, wherein the insertion of the address of the demand director server into said reply is to cause said reply to appear to a requestor who made said request as coming from said demand director server, wherein the insertion of the address of the demand director server into said reply causes establishment of a virtual connection between the requestor and the demand director server for serving content from the first and second resource servers to the requestor while hiding an identity of the first and second resource servers, the content including said reply, wherein the virtual connection is a temporary connection that when maintained allows the requestor to receive the content from the first and second resource servers, and wherein, when the temporary connection is broken, the requestor is prevented from receiving the content without first accessing the demand director server.

7. A system according to claim 6 wherein said first and second resources comprise partitionable data.

8. A system according to claim 6 wherein said demand director server is configured to add another resource server to said network if additional capacity to serve out resources is required.

9. A memory storing a program for managing the distribution of resources over a plurality of resource servers, the program when running causing the method of claim 1 to be performed.

10. A method of operating a system having a demand director server and resource servers, comprising:
receiving at the demand director server a request for a resource from a requestor;
determining an availability of the resource servers that are capable of serving said requested resource;
selecting a resource server from among the resource servers that is capable of serving said requested resource and sending said request to the selected resource server;
establishing a connection between said requestor and said selected resource server; and
serving out a reply to the request from said selected resource server to said requestor in such a way that said reply appears to the requestor as coming from said demand director server, wherein said reply bypasses the demand director server and is sent from the selected resource server to said requestor; and
the selected resource server inserting an address of the demand director server into said reply instead of an address of the selected resource server, wherein inserting the address of the demand director server instead of the address of the selected resource server into said reply causes the address of the selected resource server to be hidden from the requestor, wherein inserting into said reply the address of the demand director server causes establishment of a virtual connection between the requestor and the demand director server for serving content from the selected resource server to the requestor while hiding an identity of the selected resource server, the content including said reply, wherein the virtual connection is a temporary connection that when maintained allows the requestor to receive the content from the selected resource server and wherein, when the temporary connection is broken, the requestor is prevented from receiving the content without first accessing the demand director server.

11. A method according to claim 10 wherein said requested resource comprises a rich media product from a group consisting:
(i) video,
(ii) audio,
(ii) visual,
(iv) multimedia,
(v) other rich media.

12. A method according to claim 11 further comprising connecting to said system an additional server having said additional resource available thereon to provide additional serving-out capacity.

13. A method of satisfying a demand on an Internet wide area network for a server farm or local area network resource, the method being performed by a demand director server for the server farm or local area network with a first resource server having a first resource including one of a video file and a data file thereon, and a second resource server having a second, different, resource including one of a video file and a data file thereon; said demand director server having knowledge of what resources are held on said first and second resource servers, the method comprising:
responding to a request for one of said first and second resources by selecting one of said first and second resource servers to serve out said requested resource and directing said request to said selected one of said first and second resource servers;
wherein said selecting comprises using the demand director server's knowledge of where the requested resource is located;
the selected resource server serving up a reply to said request in such a way that said reply appears to a requestor who made said request to be coming from said demand director server, wherein said reply is sent from the selected resource server to the requestor while bypassing the demand director server;
the selected resource server rewriting a header of said reply to include an address of said demand director server rather than an address of the selected resource server to hide the address of the selected resource server from the requestor, wherein inserting into said reply the address of the demand director server causes establishment of a virtual connection between the requestor and the demand director server for serving content from the selected resource server to the requestor while hiding an identity of the selected resource server, the content including said reply, wherein the virtual connection is a temporary connection that when maintained allows the requestor to receive the content from the selected resource server and wherein, when the temporary connection is broken, the requestor is prevented from receiving the content without first accessing the demand director server.

14. A server farm or local area network comprising:
a plurality of content servers configured to serve out content of a particular kind stored upon the content servers; and
a demand manager comprising a computer and configured to allocate a request for specific content to an appropriate content server for serving said request, said content servers having dissimilar servable content of said particular kind stored upon said content servers and said demand manager having a mapping source for mapping content with corresponding content servers, wherein said demand manager is arranged to use said mapping source to allocate said request to a selected one of said content servers having said specific content;
wherein the selected content server is configured to serve up a reply to said request in such a way that said reply appears to a requestor who made said request to be coming from said demand manager, wherein the selected content server is configured to send said reply to the requestor while bypassing said demand manager,
wherein the selected content server is configured to modify a header of said reply to include an address of said demand manager instead of an address of the selected content server to hide the address of the selected content server from the requestor, wherein inserting into said reply the address of the demand manager causes establishment of a virtual connection between the requestor and the demand manager for serving content from the selected content server to the requestor while hiding an identity of the selected content server, the content including said reply, wherein the virtual connection is a temporary connection that when maintained allows the requestor to receive the content from the selected content server and wherein, when the temporary connection is broken, the requestor is prevented from receiving the content without first accessing the demand manager.

15. A method according to claim 13 wherein said Internet wide area network comprises a metropolitan area network.

16. A method of satisfying a demand on a local area network for a network resource, the network including a demand director server, a first resource server having a first resource thereon, and a second resource server having a second, different, resource thereon; said director server being aware of what resources are held on said first and second resource servers, the method comprising:

responding to a request for one of said first and second resources by selecting one of said first and second resource servers to serve out said requested resource and directing said request to said selected one of said first and second resource servers, said demand director server selecting an appropriate one of said first and second resource servers to receive said request using the demand director server's knowledge of where the requested resource is located, and wherein said demand director server is capable of communicating with an additional resource server that previously was not making its resources available for serving requests received by said demand director server, and arranging for said additional resource server to make its resources available for serving requests received by said demand director server;

serving, by the selected resource server to a requestor, a reply to the request;

the selected resource server inserting an address of the demand director server into said reply instead of an address of the selected resource server, wherein inserting the address of the demand director server instead of the address of the selected resource server into said reply causes the address of the selected resource server to be hidden from the requestor, wherein inserting into said reply the address of the demand director server causes establishment of a virtual connection between the requestor and the demand director server for serving content from the selected resource server to the requestor while hiding an identity of the selected resource server, the content including said reply, wherein the virtual connection is a temporary connection that when maintained allows the requestor to receive the content from the selected resource server and wherein, when the temporary connection is broken, the requestor is prevented from receiving the content without first accessing the demand director server.

17. A method according to claim 1, wherein inserting into said reply the address of the demand director server comprises rewriting a Transmission Control Protocol/Internet Protocol header of said reply to include the address of the demand director server.

18. A system according to claim 6, wherein the selected resource server is configured to insert the address of the demand director server into said reply by rewriting a Transmission Control Protocol/Internet Protocol header of said reply to include the address of the demand director server.

* * * * *

UNITED STATES PATENT AND TRADEMARK OFFICE
CERTIFICATE OF CORRECTION

| | | |
|---|---|---|
| PATENT NO. | : 7,822,862 B2 | Page 1 of 1 |
| APPLICATION NO. | : 10/457021 | |
| DATED | : October 26, 2010 | |
| INVENTOR(S) | : Alastair Michael Slater et al. | |

It is certified that error appears in the above-identified patent and that said Letters Patent is hereby corrected as shown below:

In column 65, line 15, in Claim 10, after "server;" delete "and".

In column 66, line 9, in Claim 13, after "server;" insert -- and --.

Signed and Sealed this
Eighth Day of March, 2011

David J. Kappos
*Director of the United States Patent and Trademark Office*